US009801261B2

(12) United States Patent
Lurie et al.

(10) Patent No.: US 9,801,261 B2
(45) Date of Patent: Oct. 24, 2017

(54) SYSTEMS AND METHODS FOR PROVIDING HIGH-MAST LIGHTING

(71) Applicant: Bright Light Systems, Inc., Alpheretta, GA (US)

(72) Inventors: Bradley D. Lurie, Cumming, GA (US); John Parker Chalmers, Alpharetta, GA (US); Phillip Daniel Graham, Atlanta, GA (US)

(73) Assignee: BRIGHT LIGHT SYSTEMS, INC., Alpharetta, GA (US)

( * ) Notice: Subject to any disclaimer, the term of this patent is extended or adjusted under 35 U.S.C. 154(b) by 0 days.

(21) Appl. No.: 14/323,967

(22) Filed: Jul. 3, 2014

(65) Prior Publication Data

US 2015/0008829 A1     Jan. 8, 2015

Related U.S. Application Data

(63) Continuation-in-part of application No. 13/734,891, filed on Jan. 4, 2013.
(Continued)

(51) Int. Cl.
*H05B 37/00* (2006.01)
*H05B 37/02* (2006.01)
(Continued)

(52) U.S. Cl.
CPC .......... *H05B 37/0245* (2013.01); *F21S 8/086* (2013.01); *F21W 2131/103* (2013.01);
(Continued)

(58) Field of Classification Search
CPC ................ H05B 37/02; H05B 37/0245; H05B 37/0272; Y02B 20/46; Y02B 20/72
See application file for complete search history.

(56) References Cited

U.S. PATENT DOCUMENTS

| | | | |
|---|---|---|---|
| 3,660,650 A | 5/1972 | Van Dusen, Jr. | |
| 3,686,498 A | 8/1972 | Meyer | |

(Continued)

FOREIGN PATENT DOCUMENTS

| | | |
|---|---|---|
| KR | 10-0693178 B1 | 3/2007 |
| KR | 10-2011-0006239 A | 1/2011 |

OTHER PUBLICATIONS

International search report and written opinion dated Oct. 20, 2014 for PCT Application No. US2014/045493.
(Continued)

*Primary Examiner* — Alexander H Taningco
*Assistant Examiner* — Kurtis R Bahr
(74) *Attorney, Agent, or Firm* — Wilson Sonsini Goodrich & Rosati

(57) ABSTRACT

Systems and methods of providing illumination may be provided in accordance with the invention. A lighting unit may be provided comprising a plurality of light sources, each light source of the plurality being at least partially surrounded by an optical element, and a support assembly configured to support the light source above a surface. The light sources may be radio frequency (RF) coupled electrodeless plasma sources, and the support assembly may be a high-mast support assembly. In some embodiments, the optical element directs light toward the surface. In some configurations, each light source of the plurality may have one or more independently controllable and/or adjustable lighting characteristics. A lighting unit may communicate with a controller, which may provide instructions for controlling the light sources. A lighting system may be provided with a host controlling a plurality of lighting units, which may be organized into networks, and/or zones. The networks, zones, lighting units, and/or light sources may be independently controllable and/or adjustable. In some
(Continued)

embodiments, management software may provide functionality for monitoring, reporting, controlling and/or interacting with the lighting system.

17 Claims, 29 Drawing Sheets

Related U.S. Application Data

(60) Provisional application No. 61/842,786, filed on Jul. 3, 2013, provisional application No. 61/583,496, filed on Jan. 5, 2012.

(51) Int. Cl.
  *F21S 8/08* (2006.01)
  *F21W 131/103* (2006.01)

(52) U.S. Cl.
  CPC .......... *H05B 37/02* (2013.01); *H05B 37/0272* (2013.01); *Y02B 20/46* (2013.01); *Y02B 20/72* (2013.01)

(56) References Cited

U.S. PATENT DOCUMENTS

| | | | | |
|---|---|---|---|---|
| 4,002,944 | A * | 1/1977 | McNeill | H01J 65/046 315/248 |
| 4,994,718 | A | 2/1991 | Gordin | |
| 5,313,378 | A * | 5/1994 | Gordin | F21V 21/30 362/396 |
| 5,816,691 | A | 10/1998 | Gordin et al. | |
| 6,036,338 | A | 3/2000 | Gordin | |
| 6,203,176 | B1 | 3/2001 | Gordin | |
| 6,464,196 | B1 | 10/2002 | Crookham et al. | |
| 6,676,279 | B1 | 1/2004 | Hubbell et al. | |
| 6,681,110 | B1 | 1/2004 | Crookham et al. | |
| 6,692,142 | B1 | 2/2004 | Gordin et al. | |
| 6,948,826 | B2 | 9/2005 | Fogerlie | |
| 7,059,745 | B2 | 6/2006 | Gordin et al. | |
| 7,067,992 | B2 | 6/2006 | Leong et al. | |
| 7,209,958 | B2 | 4/2007 | Crookham et al. | |
| 7,246,918 | B2 | 7/2007 | Ginsburg | |
| 7,284,879 | B2 | 10/2007 | Gordin et al. | |
| 7,350,936 | B2 | 4/2008 | Ducharme et al. | |
| 7,731,383 | B2 | 6/2010 | Myer | |
| 7,740,381 | B2 | 6/2010 | Gordin et al. | |
| 7,778,635 | B2 | 8/2010 | Crookham et al. | |
| 7,862,213 | B2 | 1/2011 | Gordin et al. | |
| 7,940,007 | B2 * | 5/2011 | Chang | H01J 7/46 315/248 |
| 8,007,137 | B2 | 8/2011 | Gordin et al. | |
| 8,029,154 | B2 | 10/2011 | Myer | |
| 8,123,383 | B2 | 2/2012 | Gordin et al. | |
| 8,162,511 | B1 | 4/2012 | Gordin et al. | |
| 8,163,993 | B2 | 4/2012 | Gordin et al. | |
| 8,206,011 | B2 | 6/2012 | Gordin et al. | |
| 8,217,763 | B2 * | 7/2012 | Elferich | H05B 37/0227 340/10.5 |
| 8,247,990 | B1 | 8/2012 | Gordin et al. | |
| 8,282,435 | B2 * | 10/2012 | Espiau | H01J 65/044 313/161 |
| 8,439,534 | B1 * | 5/2013 | Roe | F21V 11/183 362/285 |
| 8,545,067 | B2 * | 10/2013 | Espiau | F21S 8/086 362/431 |
| 8,651,693 | B2 | 2/2014 | Josefowicz et al. | |
| 8,690,391 | B2 * | 4/2014 | Drake | F21V 11/183 362/247 |
| 9,363,861 | B2 | 6/2016 | Chalmers et al. | |
| 2003/0151918 | A1 * | 8/2003 | Gordin | F21V 19/008 362/261 |
| 2004/0056775 | A1 | 3/2004 | Crookham et al. | |
| 2005/0057158 | A1 | 3/2005 | Chang et al. | |
| 2005/0231955 | A1 | 10/2005 | Gordin et al. | |
| 2006/0158887 | A1 * | 7/2006 | Holder | F21V 14/02 362/341 |
| 2006/0176695 | A1 | 8/2006 | Gordin et al. | |
| 2006/0176708 | A1 * | 8/2006 | Gordin | F21V 21/116 362/427 |
| 2006/0181875 | A1 | 8/2006 | Gordin et al. | |
| 2006/0198145 | A1 | 9/2006 | Gordin | |
| 2006/0203500 | A1 * | 9/2006 | Lee | F21V 17/18 362/382 |
| 2006/0274532 | A1 | 12/2006 | Gordin et al. | |
| 2006/0279952 | A1 | 12/2006 | Gordin et al. | |
| 2008/0143493 | A1 | 6/2008 | Nam et al. | |
| 2008/0273335 | A1 | 11/2008 | Gordin et al. | |
| 2009/0129081 | A1 | 5/2009 | Gordin | |
| 2010/0029268 | A1 * | 2/2010 | Myer | F21S 2/00 455/426.1 |
| 2010/0073504 | A1 | 3/2010 | Park et al. | |
| 2010/0103668 | A1 | 4/2010 | Lueken et al. | |
| 2010/0214784 | A1 * | 8/2010 | Stauffer | B64F 1/20 362/257 |
| 2010/0264853 | A1 * | 10/2010 | Amutham | H05B 37/0227 315/313 |
| 2010/0283390 | A1 | 11/2010 | Brandt et al. | |
| 2010/0315252 | A1 | 12/2010 | Desphande et al. | |
| 2011/0121734 | A1 | 5/2011 | Pape | |
| 2011/0133655 | A1 * | 6/2011 | Recker | H02J 9/02 315/159 |
| 2011/0149582 | A1 | 6/2011 | McKee | |
| 2011/0205746 | A1 * | 8/2011 | Lundin | H05B 41/2806 362/373 |
| 2011/0215735 | A1 * | 9/2011 | Herbst | H04L 41/0803 315/297 |
| 2011/0285287 | A1 * | 11/2011 | Neate | H01J 65/044 315/34 |
| 2012/0014118 | A1 * | 1/2012 | Espiau | H01J 5/48 362/382 |
| 2012/0098445 | A1 * | 4/2012 | Park | H05B 37/0272 315/193 |
| 2012/0154239 | A1 * | 6/2012 | Bar-Sade | H01Q 1/1242 343/839 |
| 2012/0201016 | A1 * | 8/2012 | Robertson | F21L 4/08 362/183 |
| 2012/0217897 | A1 | 8/2012 | Gordin et al. | |
| 2013/0193856 | A1 | 8/2013 | Chalmer et al. | |

OTHER PUBLICATIONS

Office action dated Jan. 16, 2015 for U.S. Appl. No. 13/734,891.
Jennic. JN51xx Integrated Peripherals API User Guider. JN-UG-3066. Revision 2.1. Jun. 30, 2011.
GovEnergy Slides—Introduction to Light Emitting Plasma. Dallas Convention Center. Dallas, Texas. Aug. 15-18, 2010.
Hubbell Industrial Lightning. Complete product and reference guide. 2007. http://www.hubbellindustrial.com/content/products/literature/literature_files/hicatalog_full.pdf.
VLED. Series Brochure. 2013. http://www.usaltg.com/Series-VLED.html.
Philips Radiant Generation 2 Brochure. 2011. http://www.lightingproducts.philips.com/Documents/webdb2/Gardco/pdf/g_radiant_broc.pdf.
Sytepro area lighting brochure. 2013. http://www.stonco.com/sytepro/PDF/sytepro4color.pdf.
Saemisch. AGi32 Knowledgebase. Info: Definitions of IES Roadway Luminaire Classifications (Types I, II, III, IV, V and VS) . Created Aug. 15, 2006, modified Jan. 5, 2011. http://www.agi32.com/kb/index.php?article=77.
International search report and written opinion dated Apr. 23, 2013 for PCT/US2013/020402.
Jennic. JenNet Stack User Guide. JN-UG-3041. Revision 2.0. Sep. 28, 2010.
Jennic. IEEE802.15.4 Wireless Networks User Guide. JN-UG-3024. Revision 1.1. Oct. 6, 2006.

(56) References Cited

OTHER PUBLICATIONS 802.15.4d-2009 IEEE Standard for Information technology—Telecommunications and information exchange between systems—Local and metropolitan area networks—Specific requirements Part 15.4: Wireless Medium Access Control (MAC) and Physical Layer (PHY) Specifications for Low-Rate Wireless Personal Area Networks (WPANs) Amendment 3: Alternative Physical Layer Extension to support the Japanese 950 MHz bands. Apr. 17, 2009; c1-27. http://ieeexplore.ieee.org/xpl/freeabs_all.jsp?arnumber=4840354.
Office action dated Nov. 6, 2015 for U.S. Appl. No. 13/734,891.
European search report and search opinion dated Jul. 20, 2015 for EP Application No. 13733777.0.
Co-pending U.S. Appl. No. 15/145,475, filed May 3, 2016.
Notice of allowance dated Feb. 23, 2016 for U.S. Appl. No. 13/734,891.

\* cited by examiner

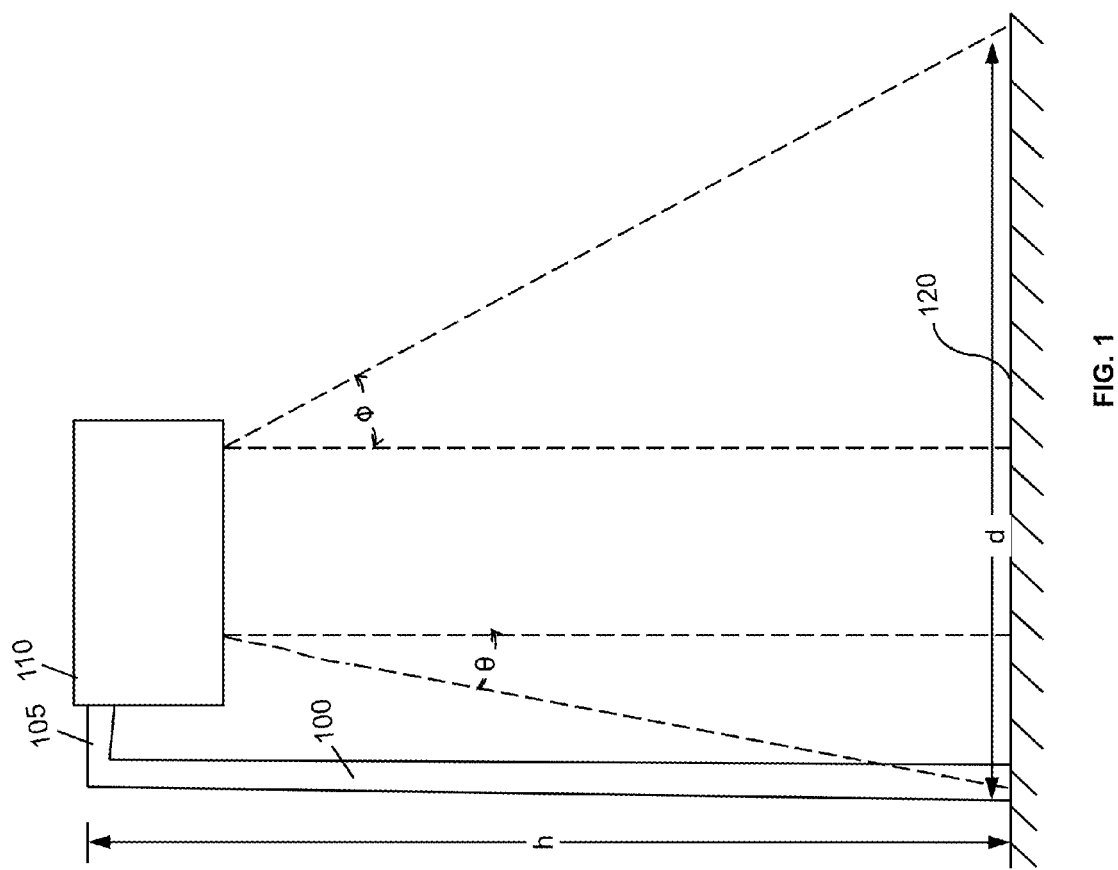

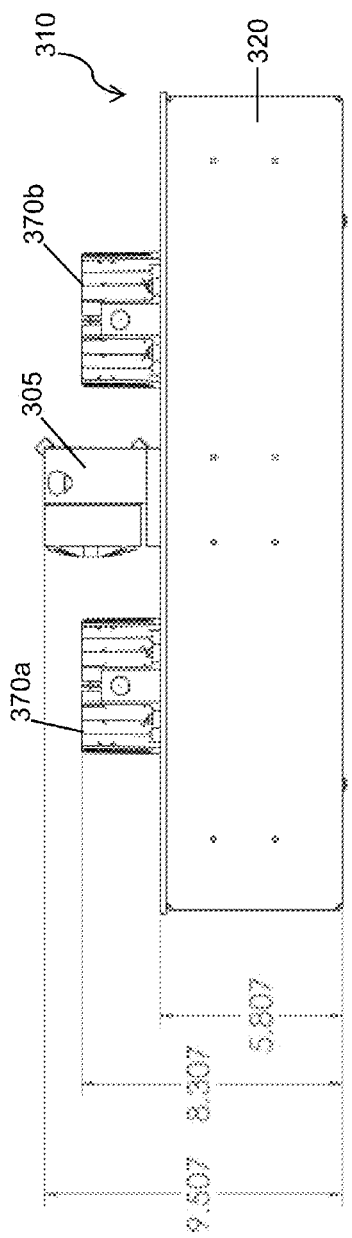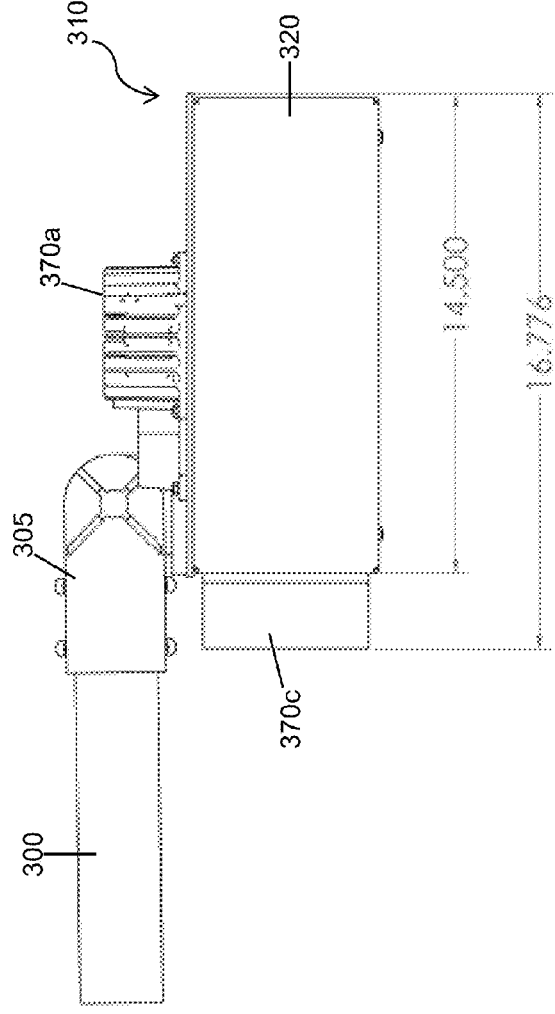
FIG. 3A
FIG. 3B

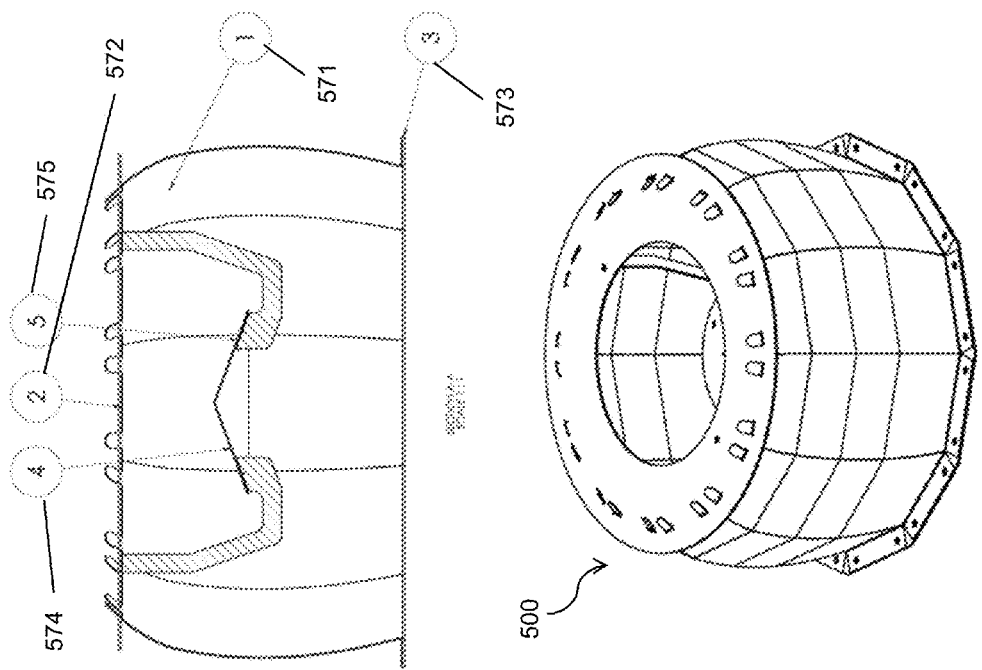
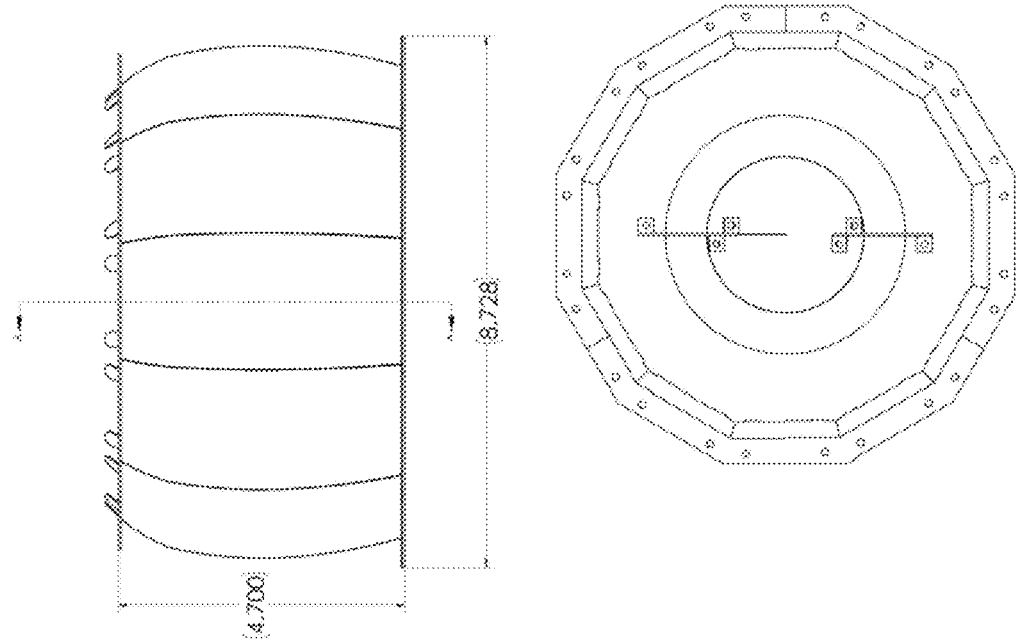
FIG. 5D

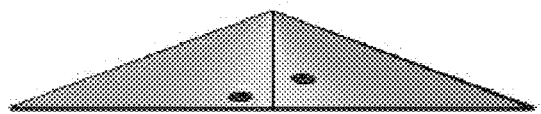
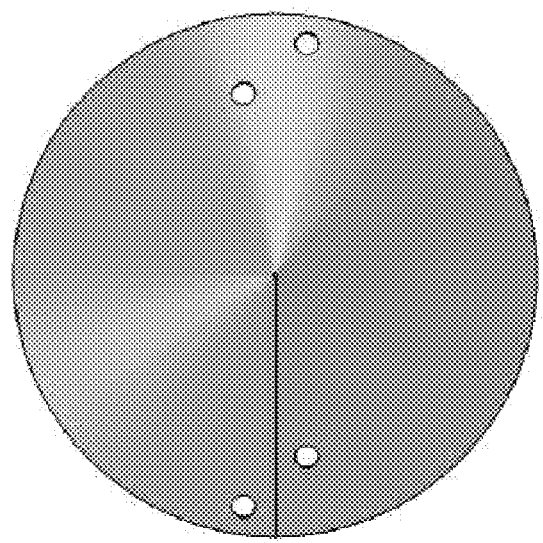
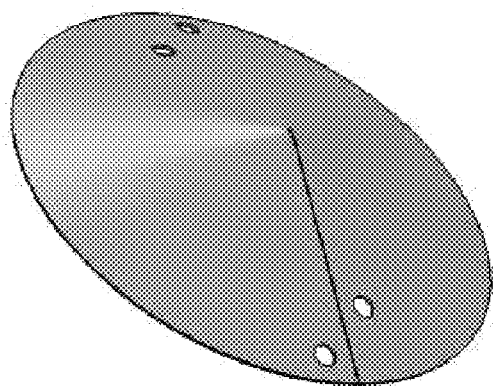
FIG. 5H

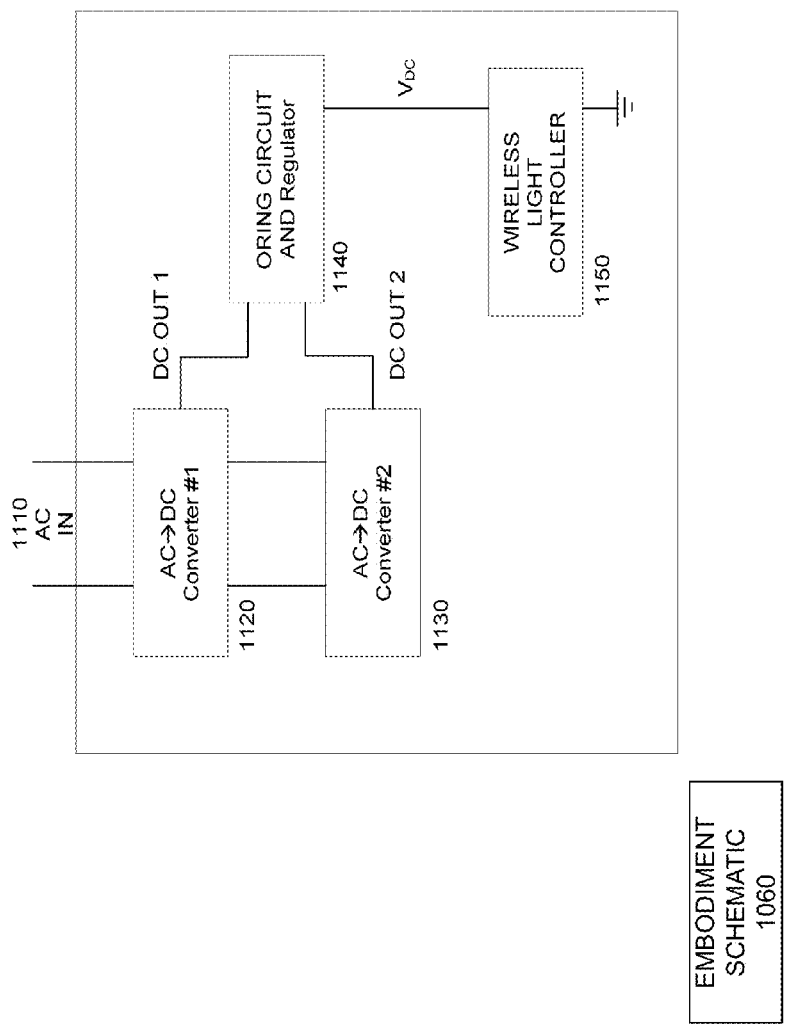
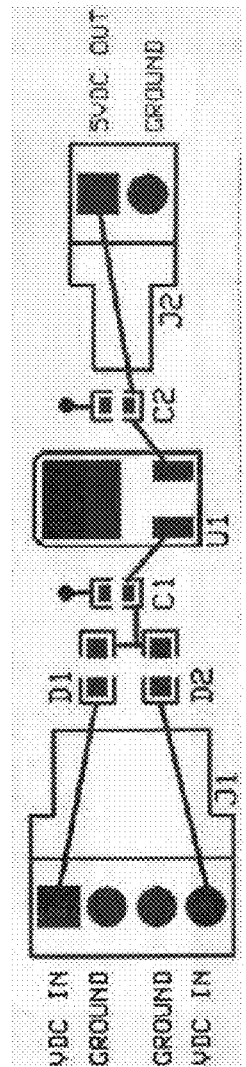
FIG. 11

SYSTEMS AND METHODS FOR PROVIDING HIGH-MAST LIGHTING

CROSS-REFERENCE

This application claims priority to U.S. Provisional Patent Application Ser. No. 61/842,786, filed Jul. 3, 2013, which is entirely incorporated herein by reference. This application is also a continuation-in-part of U.S. patent application Ser. No. 13/734,891, filed Jan. 4, 2013, which claims priority to U.S. Provisional Patent Application Ser. No. 61/583,496, filed Jan. 5, 2012, each of which is entirely incorporated herein by reference.

BACKGROUND OF THE INVENTION

Large area lighting systems, such as high-mast systems provide various levels of illumination for a variety of applications. Large area lighting systems are often used to illuminate large areas such as highways, airports, maritime ports, or railroad yards. In densely populated areas, such large area lighting systems may result in light spillage, which may contribute to light pollution and sky glow.

Previously attempts to reduce light spillage have included placing shields or baffles on the lighting fixtures. Challenges may be faced with wind loads, especially for high-mast systems. Furthermore, traditional high mast systems also result in energy inefficiencies. Depending on the circumstances, different amounts or types of light may be needed for a particular application.

Thus, a need exists for systems and methods of providing lighting which may result in greater energy efficiency and/or illumination control.

SUMMARY OF THE INVENTION

An aspect of the invention may be directed to a lighting unit comprising a singular or plurality of light sources (such as radio frequency (RF) coupled electrodeless plasma light sources), each light source of the singular or plurality being at least partially surrounded by an optical element; and a high-mast support assembly configured to support the light source above a surface. In some embodiments, the optical element may be a reflector containing one or more facets, directing the light toward the surface. In some embodiments, each light source of the plurality is partially surrounded by a separate optical element. In some configurations, each light source of the singular or plurality may be independently dimmable. A lighting unit may have a communication unit capable of communicating with an external controller. One or more lighting characteristic of the light sources may be adjustable based on instructions from the external controller.

A lighting system may be provided in accordance with another aspect of the invention. The lighting system may comprise a plurality of lighting units, an individual lighting unit of the plurality having a light source at least partially surrounded by an optical element configured to direct light toward a surface; a high-mast support assembly configured to support the light source above the surface; and a communication unit capable of wireless communications; and a host capable of determining a desired status for a light source of each of the plurality of lighting units, and sending instructions, via a gateway linking a plurality of lighting units, to the communication unit to an individual lighting unit of the plurality, thereby effecting the desired status for the light source of the individual lighting unit.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 shows an example of a high-mast lighting unit provided in accordance with an embodiment of the invention.

FIG. 2A shows a schematic of a lighting unit provided in accordance with an embodiment of the invention. FIG. 2B shows an example of cooling via a venturi and/or orifice plate. FIG. 2C shows an example of an external light control element that has been mounted to a light fixture. FIG. 2D shows an example of a bird deterrent mechanism. FIG. 2E shows an example of a light fixture with an external electronic indicator. FIG. 2F shows an example of an asymmetric optical element.

FIGS. 3A-3D show an example of a lighting unit provided. FIG. 3A shows a front view of the lighting unit. FIG. 3B shows an exemplary side view of the lighting unit. FIG. 3C shows a top view of the lighting unit. FIG. 3D provides a perspective view of the lighting unit.

FIG. 4A shows an exploded view of the lighting unit. FIG. 4B shows a perspective view of the lighting unit.

FIGS. 5A-5J show optical elements in accordance with an embodiment of the invention. FIG. 5A shows an example of optical elements provided for the lighting unit. FIG. 5B shows an additional of an optical element that may be provided for the lighting unit. FIG. 5C provides a possible schematic of an optical element used in a lighting unit. FIG. 5D shows an example of a reflector used in a lighting unit. FIG. 5E is an example of a reflector top assembly. FIG. 5F is an example of a reflector bottom assembly. FIG. 5G is an example of a main reflector assembly. FIG. 5H is an example of a reflector cone. FIG. 5I is an example of a bracket meeting a cone reflector. FIG. 5J is an example of an optical element with open holes.

FIG. 11 shows an example of a redundant wireless lighting control power supply.

DETAILED DESCRIPTION OF THE INVENTION

Figure 2A:
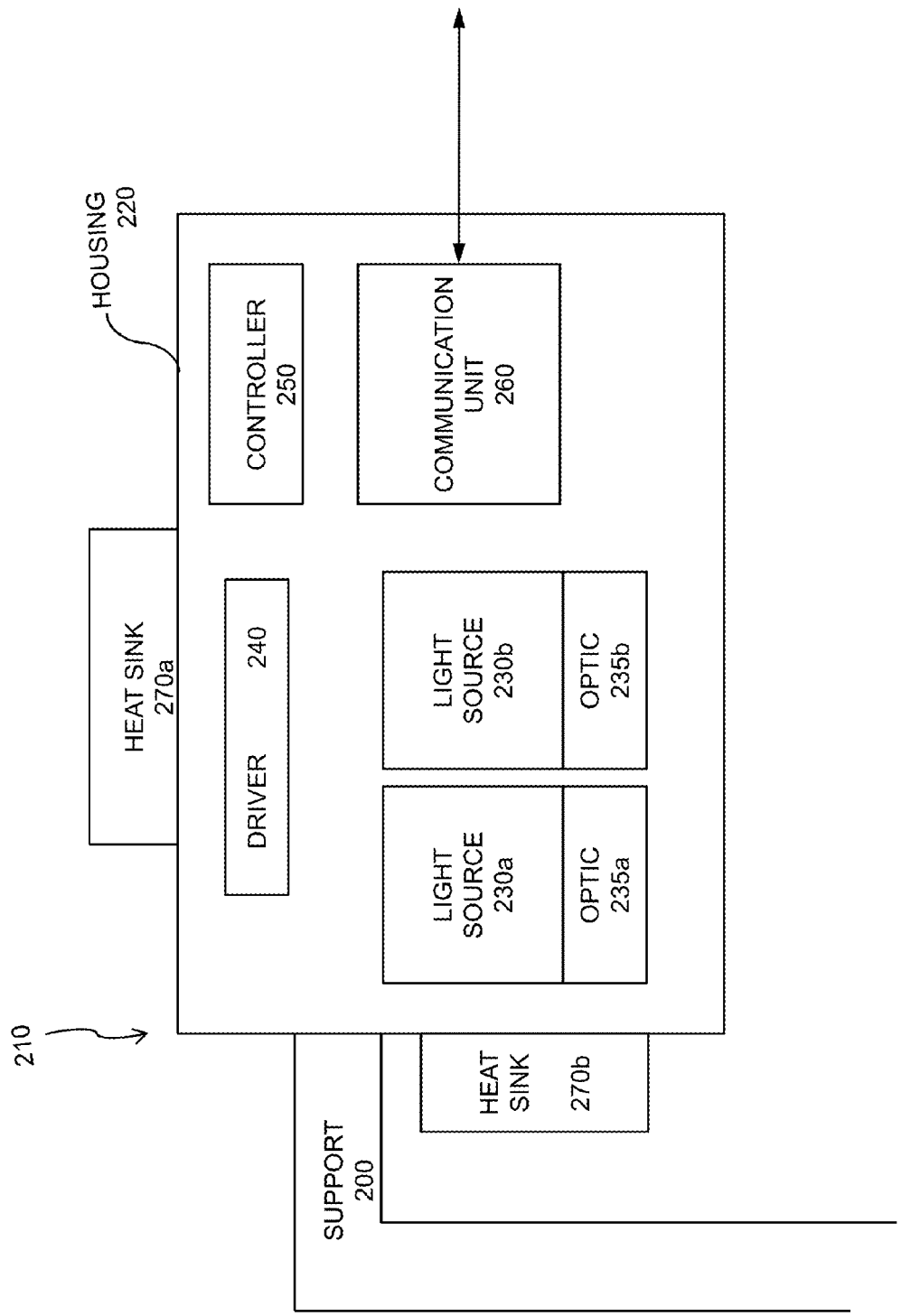
FIGS. 2A-2F provide examples of lighting units in accordance with various embodiments of the invention.

While preferred embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for providing illumination in accordance with aspects of the invention. Various aspects of the invention described herein may be applied to any of the particular applications set forth below or for any other types of high-mast or lighting applications. The invention may be applied as a standalone system or method, or as part of an energy-saving package, or software. It shall be understood that different aspects of the invention can be appreciated individually, collectively, or in combination with each other.

FIG. 1 shows an example of a high-mast lighting unit provided in accordance with an embodiment of the invention. The lighting unit may be a high-mast luminaire providing illumination to an area. A lighting unit may have a support assembly or support 100 which may hold up a lighting fixture 110. The support assembly may include a bend or an arm 105 which may connect the support assembly to the lighting fixture.

The support assembly 100 may support the lighting fixture so that it is elevated above a surface 120. For example, a surface may be the ground, water, a structure, or any other surface that may receive illumination from the lighting unit. The surface may be flat, curved, tilted, rough, smooth, or have any features. The surface may be a naturally occurring surface or may be man-made. The surface may include a road, highway, stadium, parking lot, fields, park, farms, land, forest, runway, warehouse, port, refinery, rig, ship, gas station, railway, interchanges, toll plazas, container yards, truck stops, correctional facilities, airports, security areas, sports locations, or any other surface. The lighting units may be provided indoors or outdoors. In some instances, the lighting units may be used in indoor high bay applications.

The support assembly may be or may include a pole, beam, mast, tower, structure, wall, building, or any other type of mount. In some instances, the support assembly may be provided below the lighting fixture, and/or to the side of the lighting fixture. In some instances, the support assembly may be provided partially or completely above the lighting fixture (e.g., the lighting fixture may be hanging down off the support or may be suspended by the support). The support assembly may include already existing structures for other functions, such as wind towers, broadcast towers, cellular towels, building walls or roofs, or onshore or offshore structures.

The support assembly may be arranged vertically. A longitudinal axis extending through the support assembly may have a vertical orientation. The support assembly may or may not be perpendicular to the surface. The longitudinal axis may or may not be perpendicular to the surface.

The support assembly may be a high-mast support assembly. The support assembly may elevate the lighting fixture s desired height h above the surface. In some embodiments, the height h may be greater than or equal to about 50 ft, 55 ft, 60 ft, 65 ft, 70 ft, 80 ft, 90 ft, 100 ft, 110 ft, 120 ft, 130 ft, 150 ft, 180 ft, 200 ft, 250 ft, or 300 ft. In some instances, the height may fall in the range of about 90 to 110 ft, 80 to 120 ft, or 60 to 150 ft. In some instances, the height may be less than about 150 ft, 160 ft, 180 ft, 200 ft, 250 ft, 300 ft, 400 ft, or 500 ft. In an example, the support assembly may position the lighting fixture at above the surface at a height of about 60 feet or greater.

The lighting fixture may contain one or more light source therein. The lighting fixture may be capable of distributing light. The lighting fixture may be capable of illuminating at least a portion of the surface. In some instances, the lighting fixture may be capable of illuminating a large area of the surface. For example, the lighting fixture may illuminate an area of greater than or equal to about 10 sq. ft, 20 sq. ft, 30 sq. ft, 40 sq. ft, 50 sq. ft, 75 sq. ft, 100 sq. ft, 125 sq. ft, 150 sq. ft, 175 sq. ft, 200 sq. ft, 250 sq. ft, 300 sq. ft, 350 sq. ft, 400 sq. ft, 450 sq. ft, 500 sq. ft, 600 sq. ft, 700 sq. ft, 800 sq. ft, 1000 sq. ft, 1500 sq. ft, 2000 sq. ft, 2500 sq. ft, 3000 sq. ft, 4000 sq. ft, 5000 sq. ft, 7000 sq. ft, or 10000 sq. ft. In some embodiments, the lighting fixture may illuminate an area less than any of the values described herein, or about 12000 sq. ft, 15000 sq. ft, 20000 sq. ft, 30000 sq. ft, or 50000 sq. ft.

An illuminated area may have a dimension d which may be any dimension (e.g., length, width, diameter, diagonal). For example, dimension d may be greater than, less than, or equal to one or more of the following: or may fall between two or more of the following: about 3 ft, 5 ft, 10 ft, 15 ft, 20 ft, 25 ft, 30 ft, 40 ft, 50 ft, 60 ft, 70 ft, 80 ft, 90 ft, 100 ft, 120 ft, 150 ft, 200 ft, 250 ft, 300 ft, 350 ft, 400 ft, 500 ft, 600 ft, 700 ft, 800 ft, 900 ft, or 1000 ft.

The illuminated area may refer to an area having a desired or threshold degree of light intensity per area. For example, an area may be illuminated if it has greater than or equal to about: 0.1 footcandle (fc), 0.2 fc, 0.25 fc, 0.3 fc, 0.4 fc, 0.5 fc, 0.7 fc, 1 fc, 1.5 fc, 2.0 fc, 2.5 fc, 3.0 fc, 4.0 fc, 5.0 fc, 6.0 fc, 7.0 fc, 7.5 fc, 8.0 fc, 9.0 fc, 10 fc, 12 fc, 15 fc, 20 fc, 25 fc, 30 fc, 40 fc, 50 fc, 55 fc, 60 fc, 70 fc, 80 fc, 90 fc, 100 fc, 120 fc, 140 fc, 160 fc, 180 fc, 200 fc, 220 fc, 240 fc, 260 fc, 280 fc, 300 fc, 320 fc, 340 fc, 360 fc, 380 fc, 400 fc, 420 fc, 440 fc, 460 fc, 480 fc, or 500 fc.

In some embodiments, the light may be provided to an illuminated area with a uniform or substantially uniform degree of intensity. Alternatively, the degrees of intensity of the illuminated areas may vary. In some instances, a central portion of the illuminated area may have greater intensity than an edge of the illuminated area. In some embodiments, the light intensity may be dropped off rapidly, falling to less than half the light source's value at a certain distance from the epicenter. For example, the distance may be 5 feet, 10 feet, 20 feet, 30 feet, 40 feet, 50 feet, 60 feet, 70 feet, 80 feet, 90 feet, 100 feet, 120 feet, 150 feet, 200 feet, 250 feet, 300 feet, 350 feet, 400 feet, 450 feet, or 500 feet from the epicenter.

The lighting fixture may have one or more feature, such as one or more optical element or mask that may provide a desired illumination pattern. In some instances, the desired illumination pattern may provide a desired degree or distribution of light while reducing and/or minimizing light pollution.

Light may be provided from the lighting fixture at any angle. The lighting fixture may distribute light at uniform angles all around, or at different angles. For example, the lighting fixture may distribute light at a first angle $\theta$ and at a second angle $\phi$, where $\theta$ and $\phi$ may or may not have the same values. For example, $\theta$ may be greater than or equal to $\phi$ or $\theta$ may be greater than or equal to $\phi$. In some instances, $\theta$ and/or $\phi$ may have a value falling between 0 and 90 degrees. For example, $\theta$ and/or $\phi$ may have a value greater than, less than, or equal to one or more of the following, or falling between two or more of the following: about 0 degrees, 5 degrees, 10 degrees, 15 degrees, 20 degrees, 30 degrees, 40 degrees, 45 degrees, 50 degrees, 60 degrees, 70 degrees, 75 degrees, 80 degrees, 85 degrees, or 90 degrees. In some embodiments, the overall angle provided by a lighting fixture may have any range. For example, $\theta+\phi$ may be greater than, less than, or equal to one or more of the following, or falling between two or more of the following: −15 degrees, −10 degrees, −5 degrees, 0 degrees, 5 degrees, 10 degrees, 15 degrees, 20 degrees, 30 degrees, 40 degrees, 45 degrees, 50 degrees, 60 degrees, 70 degrees, 75 degrees, 80 degrees, 85 degrees, or 90 degrees, 100 degrees, 110 degrees, 120 degrees, 130 degrees, 140 degrees, 150 degrees, 160 degrees, 170 degrees, or 180 degrees. The values for $\theta$ and/or $\phi$ may be the angles relative to a vertical direction (or parallel to the longitudinal axis).

In some instances, the light source may be oriented to optimize or increase flexibility in illumination coverage. The light source may be a radio frequency (RF) coupled electrodeless plasma light source, or any other light source as described elsewhere herein. In one example, the stability of plasma shape within the light source may be dependent on the light source's orientation. For example, in a RF coupled electrodeless plasma light source the plasma behavior within the light source may be dependent on its orientation. For instance, the most stable orientation for such a light source may be pointing directly downwards towards nadir, so that the plane of the light emitting face of the light source may be parallel with the ground. If the light source requires reorientation from this downward facing position by rotation about a bulb axis, then it may be preferable to rotate the light source along a selected axis. In some examples, the light source may be rotated about a selected axis from a plurality of possible axes. In some instances, the selected axis may be a light source (e.g., bulb's) long axis. A light source's long axis may be parallel to the length (e.g., long dimension) of the light source. An angular rotation of a light source may be about the selected axis (such as long axis of the light source) or another parallel axis over a selected range of angles. An axis parallel to a long axis of a light source may include the long axis of the light source. The light source may be configured to be rotatable about the selected axis while providing illumination. In some instances, the light source may be configured to be rotatable about a restricted or selected range that includes the nadir. The light source may be rotatable in response to a manual adjustment, remote control, or automated control.

A high-mast lighting unit may be provided in accordance with an embodiment of the invention. The high-mast lighting unit may be capable of illuminating a large area. Any description herein of a high-mast lighting unit may apply to any other type of lighting unit, and vice versa.

FIG. 2A shows a schematic of a lighting unit provided in accordance with an embodiment of the invention. A support 200 may be capable of supporting a lighting fixture 210.

A lighting fixture 210 may include a housing 220 which may partially or entirely enclose the lighting fixture. The housing may have any shape or configuration. The housing may have a box-like or rectangular shape, cylindrical shape, spherical shape, hemi-spherical shape, elliptical or egg-like shape, elongated curved or flat shape, multi-faceted shape, or any other shape. The housing may partially or entirely enclose the lighting fixture. The housing may have one or more open side that may not entirely enclose the lighting fixture. In one example, the bottom side of the housing may be open. The housing may include one or more walls. The walls may be flat, faceted, and/or curved.

The housing may be formed of an opaque material. Alternatively, the housing may be formed of a transparent or translucent material. In some instances, the housing may be formed of any combination thereof. For example, the housing may include an opaque top and/or side walls, but may have a transparent bottom. The optical transmissivity and/or lack thereof may be selected to provide a desired light distribution. For example, it may be desirable to direct the light downward, without permitting light to escape upward. Alternatively, it may be desirable to direct the light to a particular side without directing the light to another side. The housing may be opaque where it is undesirable to direct light. The housing may be open, or have a transparent or translucent enclosure in a direction where it is desirable to provide light.

The housing may be formed of a material with a high thermal conductivity and/or a low thermal conductivity. The housing may include a metal (e.g., aluminum, copper, silver, nickel, iron, gold, steel, titanium, or any other metals, alloys, or combinations thereof), plastic, polymer, composite, glass, or any other material. In one example, the housing may include 6061 copper-free aluminum. In another example, the housing may include a 5000 series aluminum. The housing may be cast, formed, punched, molded, milled, or any other means of fabrication. The housing may also include a cover which may be clear tempered glass. In some embodiments, the housing may include a cover which may be tempered glass (e.g., clear, prismatic, anti-reflective, and/or high transmittance).

The lighting unit may have one or more light source 230a, 230b therein. In some embodiments, a light source may be a radio frequency (RF) coupled electrodeless plasma light source. A light source may be a plasma light source (e.g., may be a light emitting plasma (LEP) light source). Any other light sources known in the art may be used (e.g., light emitting diode (LED), high pressure sodium (HPS), or any type of gas discharge lamp (e.g., fluorescent lamp, inductive lighting, hollow cathode lamp, neon lamp, argon lamp, plasma lamp, xenon flash lamp), electron stimulated lamp (e.g., cathodoluminescence, electron stimulated luminescence (ESL), cathode ray tube (CRT), nixie tube), incandescent lamp (e.g., carbon button lamp, incandescent light bump, halogen lamp, globar, Nernst lamp), electroluminescent (EL) lamp (e.g., LED, electroluminescent sheets, electroluminescent wires), or high-intensity discharge lamps (e.g., carbon arc lamps, ceramic discharge metal halide lamps, hydragyrum medium-arc iodide lamps, mercury vapor lamps, sodium vapor lamps, sulfur lamp, or xenon arc lamp). Some examples of radio frequency (RF) coupled electrodeless plasma light sources may include a small dosing of inert gas and/or metal halide salts. In some embodiments, the system may comprise a quartz glass bulb mounted within a waveguide. The waveguide may or may not be formed from ceramic (e.g., inorganic oxide or non-oxide materials, with or without binding agents). In some instances air and/or another dielectric may be used within the waveguide assembly. RF energy may be coupled into the waveguide, and the resulting high electric field may excite the contents of the bulb to generate a sustained plasma channel. If the bulb contains metal halide salts, these may be vaporized by the plasma and broadband light emission will occur. Any description herein of any light source may include any radio frequency (RF) coupled electrodeless plasma light source, and vice versa.

A light source, such as a radio frequency (RF) coupled electrodeless plasma light source, may utilize any wattage. For example, a 560 W radio frequency (RF) coupled electrodeless plasma light source may be used. The radio frequency (RF) coupled electrodeless plasma light source may have a wattage greater than, less than, or equal to one or more of the following, or falling between two or more of the following: about 50 W, 100 W, 150 W, 200 W, 250 W, 280 W, 300 W, 350 W, 400 W, 450 W, 500 W, 530 W, 550 W, 570 W, 600 W, 650 W, 700 W, 750 W, 800 W, 850 W, 900 W, 950 W, 1000 W, 1100 W, or 1200 W. In one example, a lighting fixture may use two radio frequency (RF) coupled electrodeless plasma sources each utilizing 280 W for a total system wattage of 560 W.

In some embodiments, a single lighting fixture may have a single light source therein. For example, a single light source may be at least partially enclosed or surrounded by a housing. Alternatively, a single lighting fixture may have a plurality of light sources therein. A plurality of light sources may be at least partially enclosed or surrounded by a housing. In one example, a lighting fixture may be a single lighting fixture containing one radio frequency (RF) coupled electrodeless plasma light source therein. In another example, a lighting fixture may be a dual lighting fixture containing two radio frequency (RF) coupled electrodeless plasma light sources therein. In some cases, a single lighting may provide equivalent or nearly equivalent light output as a dual or other lighting fixture. For example, the single lighting unit may contain one improved light source while the dual lighting fixture may contain two regular light sources. The improved light sources, as defined herein, may provide a stronger light beam than the regular light sources, a differently distributed light beam than the regular light sources and/or a light beam with other characteristics that differ from the regular light sources. Components of the lighting fixture (e.g., heat sinks, optics and/or any other components described with reference to FIGS. 2A-2F or elsewhere herein) used for improved and regular light sources may or may not have the same design. In an example, an improved light source may provide a stronger light beam, and may therefore require a more efficient heat sink. In another example, an improved light source may deliver a light beam with a light distribution that may require one or more optics to be configured differently. A lighting fixture may include one, two, three, four, five, six, seven, eight, nine, ten, eleven, twelve, or more light sources therein.

A single lighting fixture may use any number of light sources while having a total wattage consumption that may be less than or equal to any level described herein. Alternatively, the single lighting fixture may have any number of light sources where each light source has a wattage consumption that may be less than or equal to any level described herein.

In some embodiments, a lighting fixture (or lighting unit) may comprise multiple light sources. In some cases, each source may be used for a specific purpose. For example, a lighting fixture (or lighting unit) may comprise a plasma light (e.g., LEP) source used for area lighting, but also an LED light source that may light up during an emergency, or when the LEP source reaches end of life or is dimmed below a certain light level. In some embodiments, other light sources (e.g., LEP or LED) may serve as reserve lumen capacity to compensate for desired light output. For example, a lighting unit may comprise one or more reserve light sources.

The light sources may have any configuration or location relative to one another. A plurality of light sources may be within the same light fixture and/or housing. The light sources may be adjacent to one another. The light fixture and/or housing may or may not be symmetrical. The light sources may or may not be disposed within the housing symmetrically.

One or more optical element $235a$, $235b$, may be provided for a light source $230a$, $230b$. An optical element may manipulate and/or modify light emitted from the light source. An optical element may be reflective, refractive, transparent, translucent, may filter or direct light, or may have any other optical property. The optical element may or may not alter the wavelength of light as emitted by the light source. The optical element may focus, concentrate, diffuse, or alter the pattern of light emitted by the light source. The optical element may include a mirror, lens, filter, or any other type of optical element. Light may or may not pass through the optical element.

The optical element may partially or completely enclose the light source. In one example, the optical element may be a reflector that may at least partially surround the light source. The optical element may have an open end at the bottom, and may surround the light source on the sides and/or top. The optical element may be located above the light source and/or behind the light source. The optical element may be on the side of the light source opposite a direction of illumination of the lighting fixture. The optical element may or may not contact the light source. The optical element may have one or more curved and/or faceted surface. The optical element may be formed of multiple parts. Additional examples or features of the optical element may be described in greater detail below.

The optical element may be designed to direct the light in a preferred direction. In one example, the optical element may be designed to direct the light downward. The optical element may be designed to direct the light to a desired surface, whether the surface be downward, sideways, upwards, or any combination thereof. The optical element may also be designed to direct the light to a desired area of illumination. For example, the optical element may focus the light to a smaller area, or may spread the light to a larger area. The optical element may also be designed to provide a desired pattern of illumination, which may include a desired pattern of light intensity. For example, the light intensity may be even over the area or may have concentrated or dispersed areas.

In some instances, the optical element may mechanically protect a light source. The optical element may limit ingress to the light source. The optical element may be formed of a shatter-resistant material. The optical element may surround the light source to prevent undesirable access to the light source.

Optionally, it may be advantageous to control the optical behavior of one or more surfaces proximate to the RF electrodeless plasma light source to enhance light output and/or control of the RF electrodeless plasma light source's directional behavior. To this end, optical elements may be utilized that are affixed to the face(s) of the RF electrodeless plasma light source that are not integral to the primary light directing optical element. This optical element may provide specular reflection. Alternatively, this optical element may provide diffuse reflection. This element may be flat and coplanar with the emitting surfaces(s). In some instances, the element is flat, coplanar, and offset from the emitting surfaces(s). In some instances, emitting surface(s) may be curved or have angles. The optical element may or may not be parallel to the curved or angled surfaces. The element's geometry may lie at some angle to the emitting faces(s). In another embodiment the element's geometry subtends the emitting surfaces(s) into one or multiple regions of controlled reflection and diffusivity. In another embodiment the subtended single or multiple regions direct light into one or multiple secondary optical assemblies for controlling light distribution.

Figure 12:
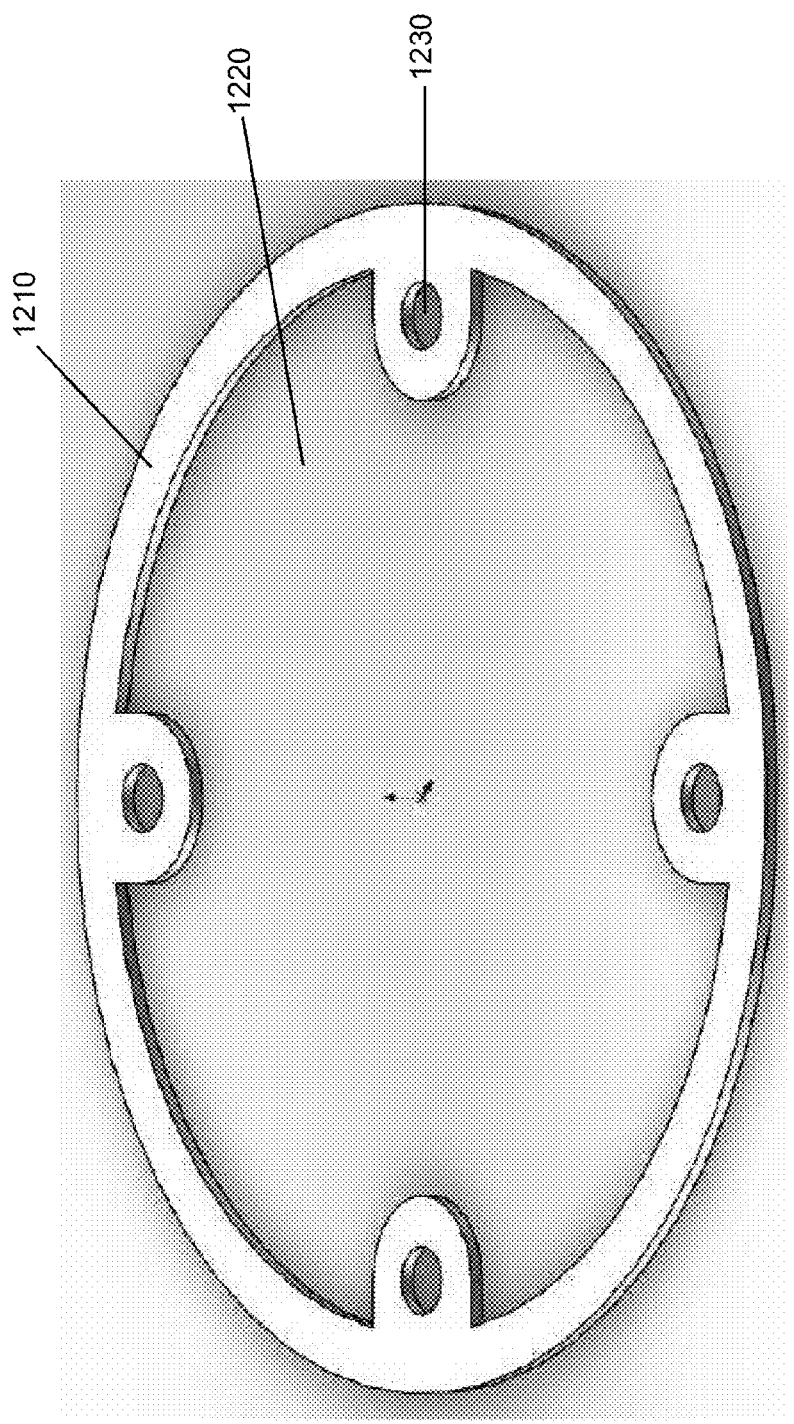
FIG. 12 shows optical elements that may be affixed to the face(s) of the light sources.

FIG. 12 shows an example of an optical element. The element may have one or more 1210 optical elements that are affixed to the face(s) of the RF electrodeless plasma light source and one or more interior portion 1220 that leave open at least a portion of an emitting surface. In some instances, one or more points of connectivity 1230 may be provided (e.g., holes through which fasteners may pass). The element may be flat and coplanar with an emitting surface. The optical element may be a diffuse reflector that may be designed to return more light to a primary optical element than the surface of a light source would.

In some instances, a light source may be in optical communication with a single optical element, such as a reflector. Alternatively, the light source may be in optical communication with a plurality of optical elements. For example, a light source may have a reflector behind it, and a lens in front of it. The lens may alter the path and/or characteristics of the light.

In some embodiments, a lighting fixture may have a plurality of light sources, and each light source of the plurality may be at least partially surrounded by an optical element. In some instances, a plurality of light sources may be surrounded by the same optical element, or each light source of a plurality may be surrounded by a separate optical element. For example, a first light source may be surrounded by a first optical element, and a second light source may be surrounded by a second optical element. In some instances, a plurality of optical elements may be provided per light source. The plurality of optical elements for a single light source may be the same or different types of optical elements. In one example, a lighting fixture may be a single lighting fixture with one light source, and one reflector. In another example, a lighting fixture may be a dual lighting fixture with two light sources, and two reflectors, each reflector corresponding to a separate light source.

The optical element may be fixed with respect to the light source. Alternatively, the optical element may be movable relative to the light source. The optical element may be movable to focus and/or direct the light as desired.

The lighting fixture 200 may also include a driver 240. The driver may be electrical communication with one or more light source 230a, 230b. In some instances, a single driver may be in communication with a single light source, or a single driver may be in plurality of light sources or vice versa. In another example, a plurality of drivers may be provided for a plurality of light sources. The driver may be used to control the output of the light source(s). The driver may cause a light source to be turned on or off. The driver may control the energy provided to provide a desired dimming level for one or more light source.

A power supply may also be provided. The power supply may be connected to one or more power source. The power supply may also be connected to the driver. The driver may be connected to the light source. In some instances, AC power may be provided to the power supply. The power may be provided by main feed lines or other sources. The power supply may convert the AC power to DC power, which may be provided to the driver. The driver may take the DC power and provide RF power to the light source. The light source may provide visible, IR and/or UV light.

A plurality of light sources may be independently controllable. For example, the plurality of light sources may be independently turned on and/or off. The plurality of light sources may be independently adjustable (e.g., independently dimmable, or have independently adjustable color). For example, each light source may be maintained at or adjusted to a desired dim level. For example, if each light source, when turned on to max capacity is outputting 100%, each light source may be dimmable so that it is outputting light at any value between 0 and 100%. In some instances, the light source may be dimmable anywhere along the scale from 0 to 100%, or at discrete steps/points along the scale. In some instances, the light source may be dimmable along the scale from 20% to 100%. The light source may be dimmable between a threshold percentage value below which a driver shuts down the communication and 100%. The light source may output light at about 0%, 20%, 25%, 30%, 40%, 45%, 50%, 55%, 60%, 65%, 70%, 75%, 80%, 85%, 90%, 95%, or 100%. If each light source is independently dimmable to different levels, and multiple light sources are provided, this may provide additional levels of overall control of light level emitted by the light fixture. For example, if each light source is a radio frequency (RF) coupled electrodeless plasma light source that is dimmable to the closest 20%, and two light sources are provided, this may provide a degree of control of up to 10% for the entire light fixture.

A lighting fixture may optionally contain a ballast assembly. In some embodiments, the driver may be a ballast assembly or may provide the same functions as a ballast assembly. The ballast assembly may or may not be thermally connected to a heat sink. The ballast may be copper wound with a desired power factor (e.g., 80%, 85%, 90%, 95%). The ballast components may be removable and may permit quick disconnect assembly for maintenance. A starter may sense an inoperative or missing light source, and may automatically shut down to prevent runaway operation, shortened life, and/or damage to secondary ballast windings.

A lighting fixture 200 may include a controller 250 (e.g., an internal controller). The controller may provide one or more instructions that may control the operation of the lighting fixture. For example, the controller may provide instructions to a driver 240 which may cause a desired light level to be output from one or more light sources 230a, 230b. For example, the controller may instruct a driver to turn a light source on and/or off, or to dim the light source to a desired level.

The lighting fixture 200 may also include a communication unit 260. The communication unit may permit communications of the lighting fixture with one or more external device. For example, the lighting fixture may communicate with one or more external controller which may provide instructions to the lighting fixture. The lighting fixture may also provide information to the external controller. One-way and/or two-way communications may be provided between the lighting fixture and the external controller. Additional details and examples are provided below.

The lighting units of the disclosure may be controlled by one or more internal and/or external controllers (also "lighting controllers" herein) based on software-generated signals or instructions (e.g., provided by management software), hardware-generated signals or instructions (e.g., from the host), or a combination thereof (e.g., host receiving sensor readings processed by the host software, wherein the host software is part of the management software). In some cases, the software-generated signals or instructions may be based on a logic-driven event (e.g., scheduling). In some cases, the hardware-generated signals or instructions may be based on real-time sensor reading(s). Optionally, the hardware-generated signals or instructions may be delayed for a time period after sensor reading(s). For instance, a sensor may detect an event and transmit data pertaining to the detected event. However, signals in response to the event may be generated after a delayed time period or may implement an action after a delayed time period. For example, a train may leave a railyard with a transponder on the front of the train triggering lights to dim. The internal and/or external controller(s) may adjust one or more lighting parameters or characteristics. In one example, the controller(s) may adjust dimming. In another example, the internal and/or external controller(s) may adjust color temperature by addressing the lighting unit via a software bus or application programming interface (API). In some embodiments, the controllers may be wireless lighting controllers.

In an example, a lighting management system may be used to control and/or adjust lighting characteristics of one or more light sources based on a calendaring feature or based on a sensor (hardware) in communication with the lighting unit. One of more lighting characteristics of each light source may be adjusted based on a logic-driven event, a real-time sensor reading, or a combination thereof.

The communication unit may be capable of wired and/or wireless communications. The communication unit may communicate over a network. For example, the communication unit may communicate over a local area network (LAN), or wide area network (WAN) such as the Internet. The communication unit may communicate over a telecommunications network, such as a cell-phone or data network. The communication unit may communicate with proximity-based interactions, such as Bluetooth, Zigbee, IR, or any other type of communications. Additional examples are provided below. See, e.g., IEEE Standard 802.15.4d-2009, (Apr. 17, 2009); IEEE 702.15.4 Wireless Networks User Guide, JN-UG-3024 (Oct. 6, 2006); JenNet Stack User Guide, JN-UG-3041 (Sep. 28, 2010); JN51xx Integrated Peripherals API User Guide, JN-UG-3066 (Jun. 30, 2011), which are hereby incorporated by reference in their entirety.

One or more heat sink 270a, 270b may be provided on a lighting fixture 200. The heat sink may be provided on the exterior of the housing. The heat sink may include one or more fins, channels, grooves, protrusions, bumps, sheets, or any other surface feature. The heat sink may be provided on a top surface, side surface, and/or bottom surface of the lighting fixture. The heat sink may be in thermal communication with one or more heat producing portion of the lighting fixture. For example, the heat sink may be in thermal communication with a driver, power supply, and/or light source of the lighting fixture.

Any thermal management system may be employed. In some instances, a buoyancy-driven cooling mechanism may be provided. Thermal energy may be dissipated into ambient air by the thermal management system. This may create a density gradient in the air that results in fluid flow driven by buoyancy. The heated air may rise upwards. By confining and directing the driven flow, convection-based cooling may be realized. The driven flow's velocity may be controlled in a defined manner to reduce the boundary layer thickness adjacent to the heat exchange surfaces (e.g., fins). In another embodiment, the flow may also be directed by elements (e.g., turbulators) that may stimulate turbulent behavior of the boundary layer to aid in conductive heat transfer and/or conductive mixing. The driven flow may be directed to perform cooling via jet based flow.

Figure 2B:
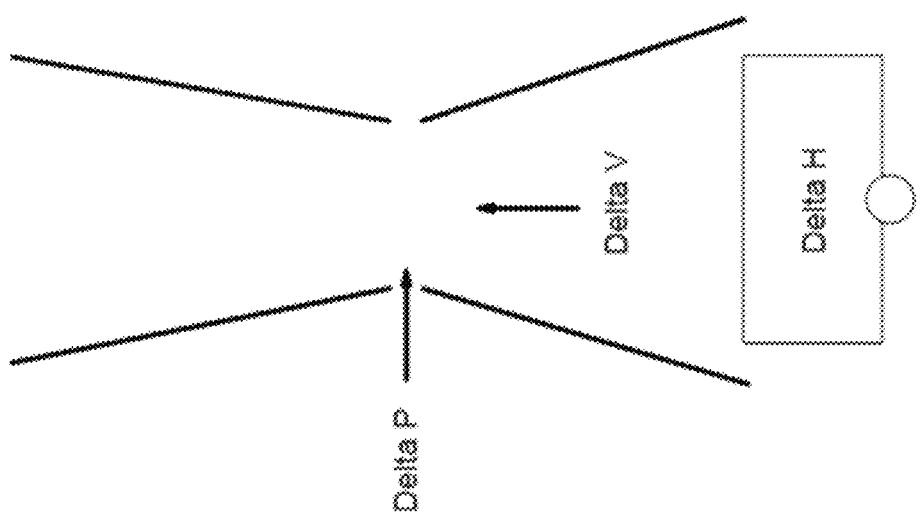

In some instances, further cooling may occur using a venturi and/or orifice plate to help draw cooler external air into the thermal management system. This may increase temperature gradients and enhance thermal dissipation. Flow through the venturi and/or orifice plate assembly can be driven via buoyancy from heat of the light source's thermal dissipation. The flow can be enhanced via confined flow methods. The venturi and/or orifice plate may direct and/or promote fluid flow driven by convection. FIG. 2B shows an example of such a configuration. A temperature gradient (Delta H) may cause heated air to rise (Delta V). In some instances, a change in the cross-sectional area of the directed air flow results in a difference in pressure (Delta P). This difference in pressure may also draw external, cooler across the pressure gradient and into the area of constrained flow.

In some embodiments, one or more light sources may be removable from the lighting fixture. In some instances, one or more RF electrodeless plasma light source may integrate lighting elements, RF elements and/or thermal management elements into one cast assembly. Alternatively, the thermal management elements may be separate from the rest of the light source. This may permit integration of the thermal management elements with a fixture housing. For instance, the thermal assembly may be attached to the housing. Alternatively, the thermal management element may be a separate assembly. The optical and/or RF components may remain thermally connected to this disjoined assembly via a heat spreader, thermal paste, heat pipe, and/or boundary layer-based heat transfer.

One or more portion of a lighting fixture may be modular and/or removable. One or more portion of a lighting fixture may be swapped out and/or exchanged for another. It may be desirable to facilitate easy field swapping of various fixture subassemblies because of their location in circumstances that may not be easily accessible (e.g., accessible via man-lift). Component groups may be bundled into discrete packages that may be removable and replaceable without compromising mechanical integrity of the overall fixture and housing. Component groups may include any components mentioned elsewhere herein (e.g., optical component groups, thermal management groups, driver, controller, communication unit). In an example, a modular and removable light control optical element capable of attaching to an external portion of the housing. In another example, one or more modular subassemblies (e.g., power supply, driver, light source, optical element, line reactor, inductor, snubber, controller, or surge protection device) that are removable from the housing may be provided. Multiple component groups may be provided within the housing. In one embodiment, the power supply and RF driver may comprise an integrated, removable module from the unit capable of field exchange. In some instances, removable subassemblies may snap, twist, or lock into the lighting fixture in a removable fashion. The modules may or may not have their own coverings or housings.

Figure 2C:
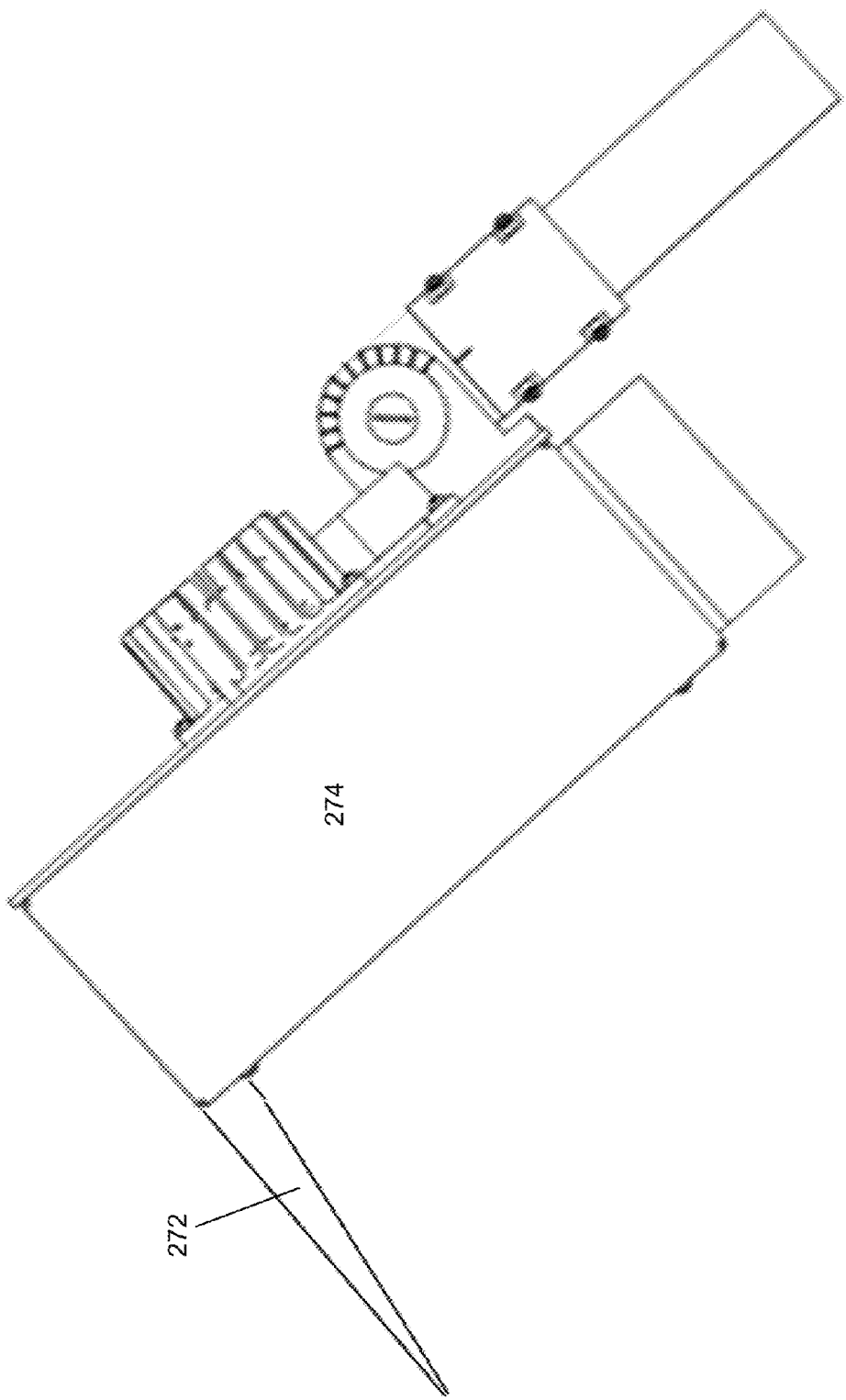

In some embodiments, an external light control element may be a subassembly that may be attached to a light fixture. The external light control element may be beneficial in the case of high-mast lighting units where it is difficult to change and/or modify a light fixture's internal optical assembly. The external light control element may provide additional direction control of lighting luminance and/or reduced light spill. In some instances, one or more external light control element may be mounted to a light fixture assembly. FIG. 2C shows an example of an external light control element 272 that has been mounted to the light fixture 274. The external light control element may facilitate additional control of light without modification to the internal optics of the light fixture. The external light control element may include one or more optical element that may modify the light being emitted from the light fixture. For example, the external light control element may be reflecting, refracting, and/or absorbing in nature. Reflecting assemblies may have specular, diffuse, or mixed reflection behavior. In some instances, the subassembly may act as an optical barrier to the propagation of light in selected directions (e.g., into adjacent residential areas). The light control element may reduce or prevent light spillage and/or pollution. The external light control element may be opaque or substantially opaque in such situations. The external light control element may redirect light, spread or concentrate light, modify wavelength of light, modify brightness of light, or have any other optical effect. The external light control element may be easily affixed to the lighting fixture without requiring a lighting fixture housing or cover be opened or detached. Various different external light control element types may be available. An individual may select one or more external light control element from different options to create a desired overall optical effect.

The external light control element may be attached to the light fixture via mechanical assembly. For example, the external light control element may click, twist, or snap-fit on the light fixture. The external light control element may be affixed to a light fixture via one or more fastener, hook and loop assembly, ties, adhesives, soldering, welding, magnets, or any other configuration or combination thereof. The external light control element may be affixed to any portion of a light fixture. For example, it may be positioned along one or more edge or surface of the light fixture.

A lighting unit may include one or more features that may assist with protection from the environment to which the lighting unit is exposed. For example, a bird deterrent mechanism may be provided. A bird deterrent mechanism may be integrated into a thermal management system or may be protecting a thermal management system. This may assist with discouraging bird excrement and/or nesting which could cause reduction of the thermal management system's performance. Passive thermal management systems rely on their surfaces to conduct heat, and certain material properties are preferable for such surfaces. Bird excrement, nests, or other items can reduce the thermal dissipation. A bird deterrent mechanism may be an assembly that deters birds from roosting on or near the lighting unit.

In one embodiment, a bird deterrent mechanism may include one or more polymeric spike that may mechanically affix to the existing thermal management system. In another example, the bird deterrent mechanism may comprise pointed metallic spikes that mechanically affix to the existing thermal management system. Alternatively, the spokes may be integrated into the thermal management cooling surfaces. In some instances, the spokes may be formed of a thermally conductive material, which may enable the spike to perform a dual function to prevent bird roosting and expelling heat from the light fixture. In some instances, cooling fins may be shaped to serve the function of deterring birds from roosting. In some instances, the bird deterrent mechanism may have a pointed end.

Figure 2D:
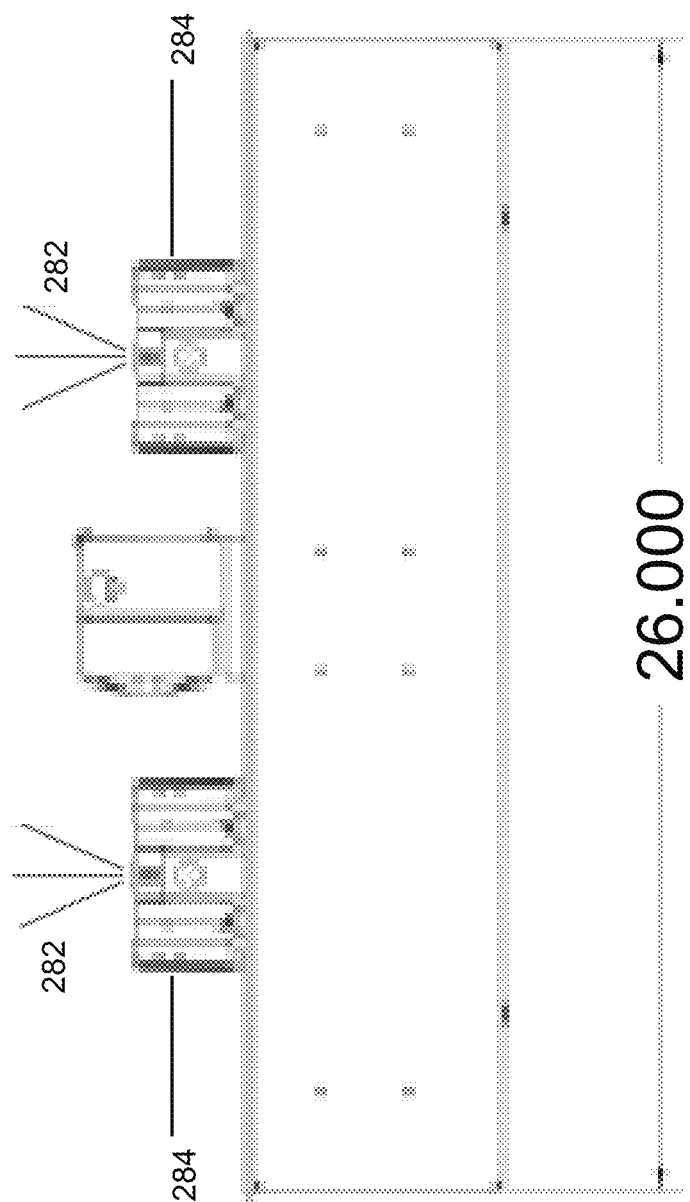
Figure 2E:
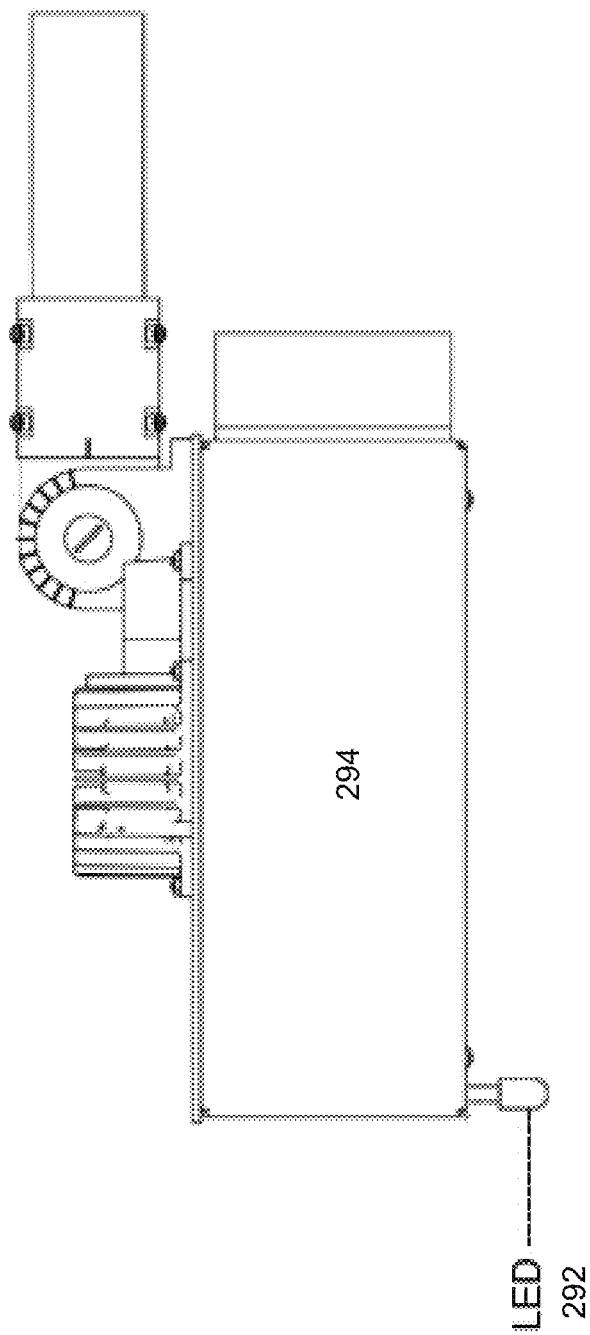
Figure 2F:
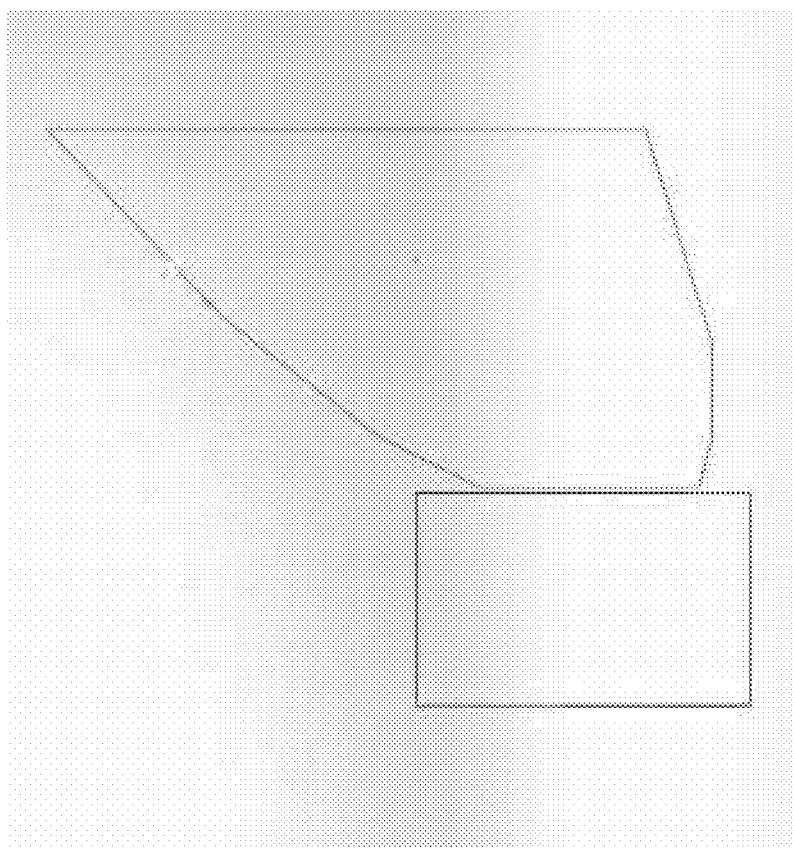

An example of a bird deterrent mechanism is provided in FIG. 2D. As shown, one or more spikes 282 may emerge from or be integrally formed with a thermal management assembly 284. In some instances, the spikes may emerge radially outward from a common location the thermal management assembly. Alternatively, spikes may emerge from different locations over the thermal management assembly. They may be oriented perpendicular to a top surface of the lighting unit, or at any angle relative to the top surface. The length of the spikes may be greater than, equal to, or less than one or more dimension of the thermal management assembly (e.g., height, length, width, diameter, diagonal). The spikes may extend from one or more assemblies having cooling fins or cooling plates. The bird deterrent mechanism may extend from an external surface of the lighting fixture. The bird deterrent mechanism may protrude outside the housing of the lighting fixture.

A lighting unit may also have a lightning protection mechanism. The lighting fixtures may rest atop tall high mast poles, as previously described. This may cause the lighting units to be vulnerable to lightning exposure. A conductive feature may be provided that is solidly grounded to form a low impedance current path to the ground. In some instances, a bird deterrent feature atop a lighting fixture may be used for a lightning protection mechanism. For example, the bird deterrent feature may be formed from a conductive material, such as a metal, and may form a low impedance current path to the Earth. The electrical conductivity of the lightning protection mechanism may be greater than the electrical conductivity of the mast, or the rest of the lighting fixture. A lightning protection assembly may extend along the support of a high-mast lighting unit. A lightning protection assembly may provide a low impedance grounding path from a top of the lighting unit to the Earth.

In some instances, an external electronic indicator or transducer may be provided on a lighting fixture. During commissioning of a lighting installation an electronic method, beyond direct operation of the RF electrodeless plasma light source, may be desirable for confirming fixture location and connection to the wireless network. One such embodiment is the presence of a secondary light source 292 (e.g., light emitting diode (LED) such as FIG. 2E) attached externally to fixture housing 294 to indicate fixture position and connectivity. In another embodiment the electronic indication method comprises an electrically driven transducer that provides acoustic identification. In another embodiment the electronic indicator also provides human-parsable identification of the light's serial number and/or MAC address to aid in identifying which unit is extant at any given installation location. A screen or other user interface may be provided which may provide an external indicator of information. Any visually or otherwise discernible indicator may be provided on the lighting fixture. In some instances, the indicator may be provided on an external surface of the housing of the lighting fixture. In some instances, the indicator may indicate status (e.g., operational status, connectivity, errors) of the lighting unit and/or provide identifying information (e.g., identifying the lighting unit itself, such as, for example, by serial number).

Figure 3C:
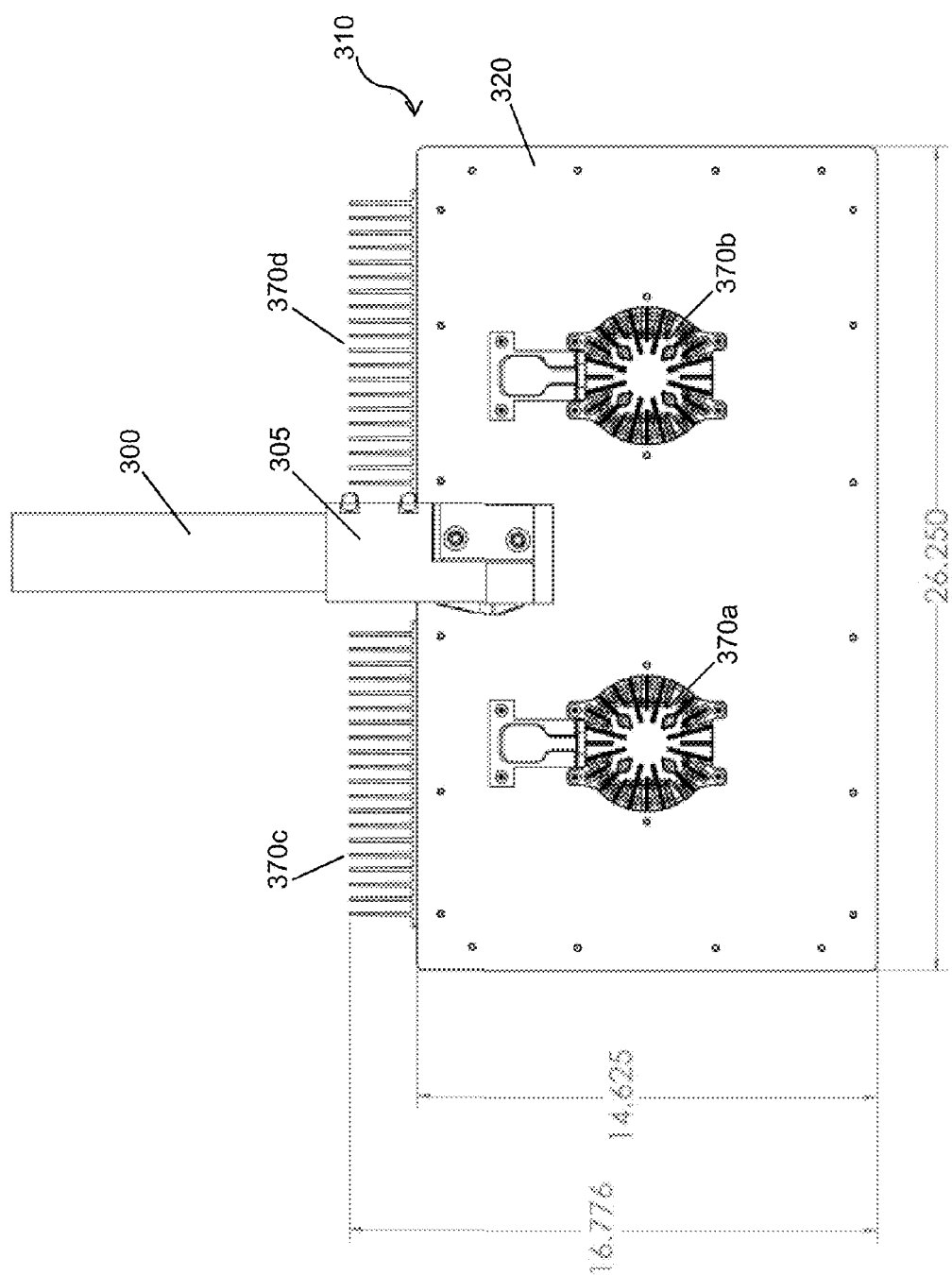

FIGS. 3A-3D show an example of a lighting unit provided. An exterior of a lighting fixture may be shown. FIG. 3A shows a front view of the lighting unit. The lighting unit may include a housing 320 for the lighting fixture 310. One or more support interface 305 may be provided, useful for connecting the lighting fixture to a support.

The housing 320 may have a rectangular shape. The housing may include one or more walls that may surround one or more portions of the lighting fixture.

One or more heat sinks 370a, 370b may be provided on the housing 320. In some instances, the heat sinks may be mounted on a top portion of the housing. The heat sinks may be in thermal communication with one or more heat-producing component therein. In some examples the heat sinks may be in thermal communication with a light source and/or driver. The heat sinks may be directly contacting the heat-producing component or may be contacting the heat-producing component through a thermally conductive material. The housing and/or heat sinks may be formed from a thermally conductive material. Examples of thermally conductive materials may include materials have a thermal conductivity of greater than or equal to about 1 W/mK, 50 W/mK, 100 W/mK, 150 W/mK, 200 W/mK, or 250 W/mK.

The heat sinks may have one or more fin or ridge. In some instances, the may be provided in a radially extending pattern.

FIG. 3B shows an exemplary side view of the lighting unit. A lighting fixture 310 may be connected to a support 300 via one or more support interface 305. The support interface may permit the lighting fixture to pivot about one or more axis, thereby adjusting an angle of the lighting fixture with respect to the support. For example, the angle of the lighting fixture may be adjustable in one, two, or three directions. Adjusting the angle of the lighting fixture may adjust the area that is illuminated by the lighting fixture. The lighting fixture may be aimed so that the area of illumination is directly below the lighting fixture. Alternatively, the lighting fixture may be angled so that the area of illumination is partially below the lighting fixture, is offset below the lighting fixture, or is any other direction.

The angle may be adjusted in response to a manual adjustment. Alternatively, the angle may be adjusted in response to one or more actuation mechanism. The actuation mechanism may cause the angle to be adjusted in response to one or more signal.

The support interface may or may not allow the lighting fixture to slide along the support. The support interface may or may not permit the lighting interface to be raised upward or downward with respect to the support.

The lighting fixture 300 may have a housing 320. The housing may have a box-like shape or any other shape. One or more heat sink 370a, 370c may be provided in accordance with an embodiment of the invention. For example, a heat sink 370a may be mounted on top of the housing, while another heat sink 370c may be mounted on a side of the housing. The heat sinks may be mounted in the proximity of a heat-producing component contained within the housing.

FIG. 3C shows a top view of the lighting unit. A lighting fixture 310 may be connected to a support 300 via a support interface 305.

The housing 320 may have a rectangular shape, or any other shape. The housing may have any size of footprint. For example, the housing may have a footprint of greater than, less than, or equal to one or more of the following, or falling between two or more of the following: 1 sq. in, 3 sq. inches, 6 sq. inches, 9 sq. inches, 12 sq. inches, 15 sq. inches, 18 sq. inches, 21 sq. inches, 24 sq. inches, 30 sq. inches, 36 sq. inches, 42 sq. inches, 50 sq. inches, 70 sq. inches, 100 sq. inches, 120 sq. inches, 150 sq. inches, 200 sq. inches, 250 sq. inches, 300 sq. inches, 400 sq. inches, 500 sq. inches, 600 sq. inches, 700 sq. inches, 800 sq. inches, 900 sq. inches, or 1000 sq. inches. One or more dimension of the housing (e.g., length, width, height, diagonal, or diameter), may be greater than, less than, or equal to one or more of the following, or falling between two or more of the following: 0.1 inches, 0.5 inches, 1 inch, 1.5 inches, 2 inches, 3 inches, 4 inches, 5 inches, 6 inches, 7 inches, 8 inches, 9 inches, 10 inches, 12 inches, 14 inches, 15 inches, 16 inches, 18 inches, 20 inches, 22 inches, 24 inches, 26 inches, 28 inches, 30 inches, 35 inches, 40 inches, 45 inches, 50 inches, 60 inches, 70 inches, or 100 inches.

A plurality of heat sinks 370a, 370b, 370c, 370d may be provided. One or more of the heat sinks 370a, 370b may be provided on a top surface of the housing. One or more heat sinks 370c, 370d may be provided on a side surface of the housing. The heat sinks may have one or more fins. The fins may be vertically oriented. In some embodiments, the fins may be radially extending. Alternatively, the fins may be provided in a parallel fashion. The fins may be oriented so that space provided between the fins open up above the heat sinks.

Figure 3D:
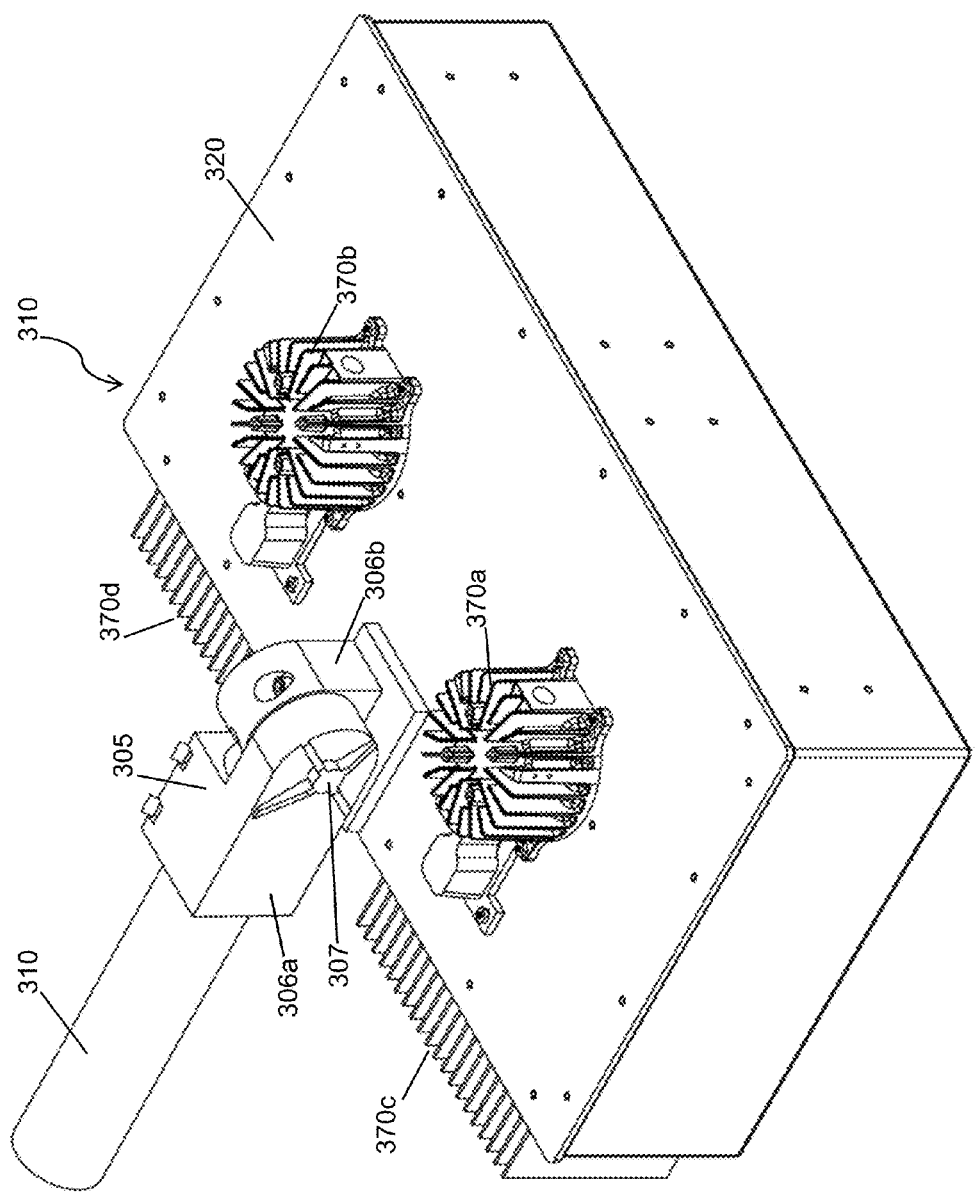

FIG. 3D provides a perspective view of the lighting unit. The lighting fixture 310 may be connected to the support 310 via a connection interface 305. The connection interface may include one or more hinge or pivoting mechanism 307 that may allow the lighting fixture to rotate about an axis passing through the pivoting mechanism. The connection interface may include two or more portions 306a, 306b that may move relative to one another. One portion 306a may be affixed to the support, while another portion 306b may be affixed to the lighting fixture.

The lighting fixture may have a housing 320. The housing may include a top surface and/or one or more side surfaces. In some instances, the housing may have a top surface and four side surfaces. The housing may enclose or at least partially surround one or more components therein. One or more heat sinks 370a, 370b, 370c, 370d may be provided on the housing. The heat sinks may be directly attached to the housing surface. The heat sinks may be in thermal communication with the housing.

Figures 4A, 4B:
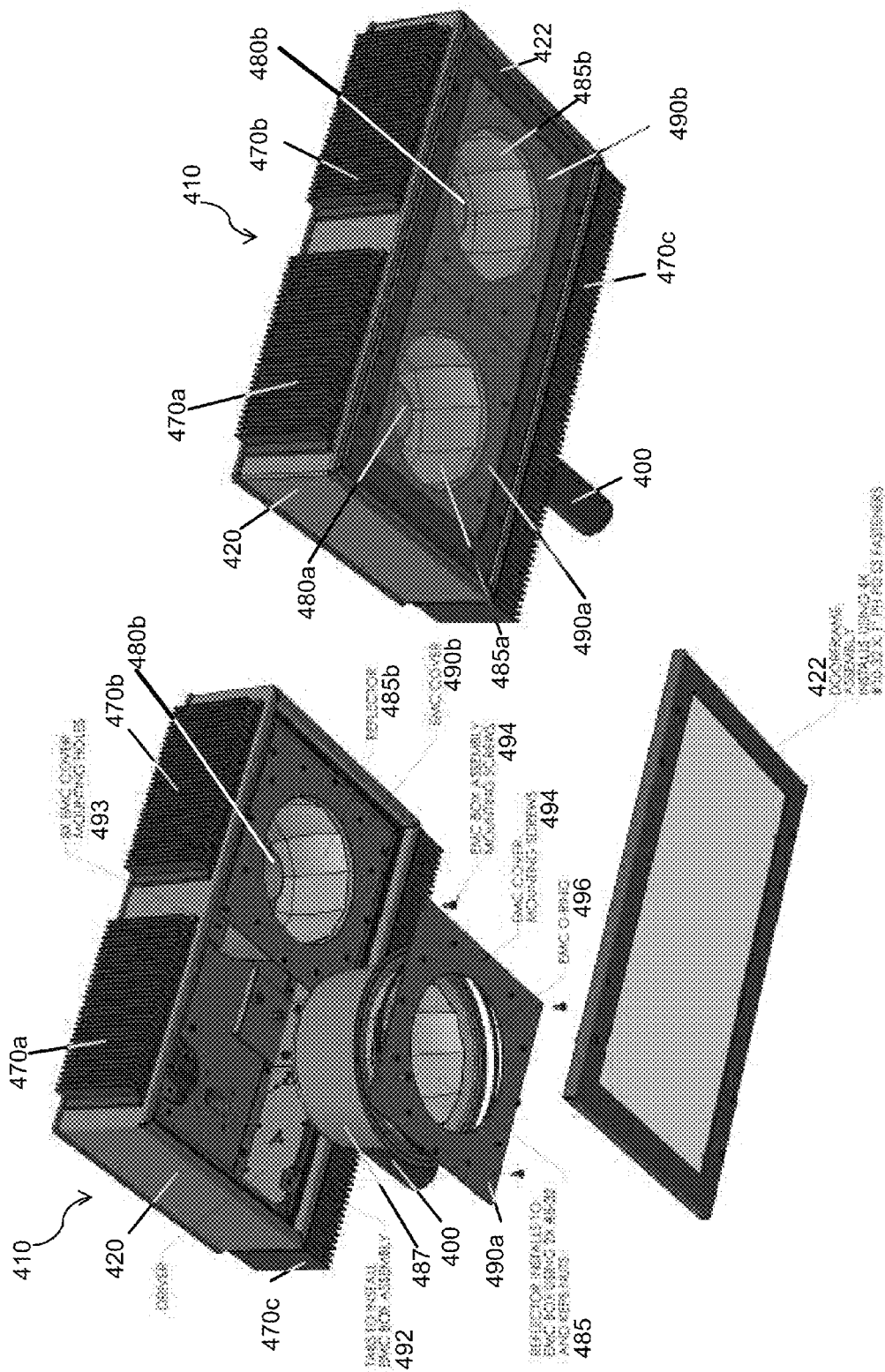
FIGS. 4A-4B show a lighting unit in accordance with another embodiment of the invention.

FIGS. 4A-4B show a lighting unit in accordance with another embodiment of the invention. The lighting unit may include a lighting fixture 410 which may be supported by a support 400. The support may or may not be a high-mast support. The lighting unit may include one or more light source, such as an radio frequency (RF) coupled electrodeless plasma light source. In some embodiments, the lighting unit may include two light sources. For example, the lighting unit may be a high-mast dual-radio frequency (RF) coupled electrodeless plasma lighting unit.

FIG. 4A shows an exploded view of the lighting unit. The lighting unit may include a lighting fixture 410 supported by a support 400. The lighting fixture may include a housing 420. The housing may have any shape, such as those described elsewhere herein. The housing may include a top surface and/or a plurality of side surfaces. The housing may at least partially enclose one or more components therein.

In some instances, a doorframe assembly 422 may be provided. The doorframe assembly may or may not be part of the housing. The doorframe may cover a bottom portion of the lighting fixture. The doorframe may have a transparent and/or translucent surface. Light may be capable of passing through the doorframe assembly. In some instances, light is not capable of passing through the rest of the housing. For example, light does not pass through the sides or the top of the lighting fixture.

In some instances, the doorframe may function as an optically transparent protective panel assembly. This panel may provide ingress protection against the elements, and may protect the lamp assembly from mechanical damage. In alternative embodiments, the doorframe may not be needed, and one or more light directing optical assemblies may provide protection against ingress and/or mechanical damage. One or more light source may be in optical communication with an optical element that may provide a protective cover for the one or more light source. This may eliminate the need for the doorframe assembly.

One or more light source 480a, 480b may be provided within the lighting fixture. In one example, two light sources are provided within the fixture, to provide a dual-source lighting unit. Any number of light sources may be provided. The light source may be a radio frequency (RF) coupled electrodeless plasma light source.

One or more optical element may be provided. For example one or more reflectors 485a, 485b may be provided. A reflector may at least partially surround a light source 480a, 480b. In some instances, a reflector may surround a light source around its sides and/or top. The reflector may or may not surround a bottom portion of the light source. A reflector may surround a single light source. Alternatively, a reflector may surround a plurality of light sources. In some instances, a plurality of reflectors may be provided, each surrounding a single light source or a plurality of light sources. A reflector may include one or more surface that may reflect light from a light source a desired direction. In some instances, the reflector may direct the light from the light source through the doorframe assembly. In some other examples, the optical element may be a lens. Any description herein of a reflector and/or lens herein may also refer to any other optical element. Both a lens and a reflector may be referred to as an optical element herein. For instance, a lens may at least partially surround one or more light source, optionally around its sides and/or top. Any combination of optical elements (e.g., lenses, prisms, waveguides, and/or reflectors) may be employed.

An optical element may surround the light source sufficiently to prevent light from traveling in an undesired direction. For example, light from a first light source surrounded by a first reflector may not reach a second light source surrounded by a second light reflector. In some instances, a reflector may not permit light to pass through the reflector.

In some instances, an additional structure, such as a cup or lighting component surface 487 may be provided. The lighting component surface may be formed of an opaque material. The lighting component surface may not permit light to pass through the lighting component surface. The lighting component surface may partially or completely surround a reflector and/or light source. The lighting component surface may keep the reflector and/or light source in a desired position within the housing.

An electromagnetic compatibility (EMC) element 490a, 490b may be provided. The EMC element ensures that equipment items or systems will not interfere with or prevent each other's correct operation through spurious emission and absorption of electromagnetic interference (EMI). An EMC element may optionally be a mesh, resonant device, optically transparent conducting film, antenna, surface acoustic wave device, or any other electromagnetically active element. In some embodiments, an EMC element may be provided for each lighting component assembly within a light fixture. For example, an EMC element may be provided for each light source. A lighting component assembly may include a lighting component surface 487, reflector 485a, light source 480a, and the EMC element 490a. An EMC element may be mounted to a tab 492 or other portion of the housing. A tab may have a mounting hole 493 which may be configured to accept one or more fastener. One or more mounting screws 494 may be used to connect the EMC element to the tab. An EMC element may be attached to a housing any other techniques or fastening mechanisms including but not limited to screws, rivets, clamps, snapping features, sliding features, locking features, adhesives, welding, soldering, hook and loop fasteners, or ties. In some instances an EMC O-ring 496 or other interfacing component may be provided. The o-ring may be provided between the EMC element and/or the lighting component surface. The o-ring may provide a resilient interface between the EMC element and the lighting component surface. The EMC element may prevent light from leaking in an undesirable manner.

One or more heat sinks 470a, 470b, 470c may be provided on a lighting fixture. The heat sinks may be provided on one or more side of the lighting fixture. The heat sinks may be provided on opposing sides of the light fixture. In some instances, heat sinks may be provided on adjacent sides of the light fixture. The heat sinks may be mounted to an exterior of the housing. Alternatively, the heat sinks may be mounted or contained within the interior of the housing. The heat sinks may be in thermal communication with the interior or exterior of the housing.

The heat sinks may be in thermal communication with one or more component within the housing. For example, the heat sinks may be in thermal communication with a light source, and/or driver for the light source. In some embodiments, one or more heat sink or groups of heat sinks may be provided per light source. For example, if two light sources 480a, 480b are provided, two heat sinks 470a, 470b may be provided. In some instances, one or more heat sinks 470c may be shared between the light sources.

The heat sink may remove heat from the lighting fixture. The heat sink may include one or more fins that may assist with the dissipation of heat from the lighting fixture. The fins may be vertically oriented. Air may pass between the fins in a vertical direction.

FIG. 4B shows a perspective view of the lighting unit. The lighting fixture 410 may be connected to the support 400. The lighting fixture may include a housing 420, with one or more heat sinks 470a, 470b, 470c disposed thereon. A doorframe assembly 422 may form a portion of the housing. The doorframe assembly may include an optically transmissive portion. The doorframe assembly may be on a side of the housing in the direction in which light is emitted by the lighting fixture. In some instances, the doorframe assembly is on a bottom of the lighting fixture. Alternatively, the lighting fixture may be angled so that the doorframe assembly is at the bottom, side, top, or any combination thereof. The housing and doorframe assembly may contain and/or enclose one or more internal components of the lighting fixture.

Examples of internal components may include one or more light source 480a, 480b. Furthermore, the internal components may include one or more optical element 485a, 485b, and one or more EMC element 490a, 490b. The internal components may be arranged so that light from the light source is directed through the doorframe assembly 422.

The internal components may be arranged so that each light source is self-contained. For example, light from one light source may not reach another light source directly and/or indirectly. The internal components may include drivers and/or power supplies for the light sources.

In some instances, a doorframe assembly 422 may be removable from the rest of the housing 420. For example, one or more connector of the doorframe assembly may be unscrewed. One or more light source may be removed and/or replaced once the doorframe assembly is removed and/or opened. In some instances, the light source may be removed and/or replaced without requiring the removal or adjustment of any other component. Alternatively, an EMC element, light component surface, and/or optical element may be removed and/or adjusted when removing and/or replacing the light source. In some instances, to replace a light source of an individual lighting component assembly, only that individual lighting component assembly may be adjusted or removed, without affecting other lighting component assemblies.

In some instances, a quick disconnect assembly may be provided, which may permit tool-free lamp replacement, thereby permitting ease of maintenance. For example, a light source may be easily electrically and/or physically disconnected, thereby permitting simplified replacement.

The lighting fixture may be contained within a compact form provided by the housing. The lighting fixture may have a relatively small footprint (e.g., such as the dimensions described earlier), which may advantageously reduce windloading. The lighting fixture may or may not have an aerodynamic shape.

In some embodiments, the lighting units and fixtures in FIGS. 3A-3D and 4A-4B may be adapted for containing a single light source. Such configurations may include, for example, locating a single light source (e.g., the light source 480b) and corresponding heat sinks (e.g., the heat sinks 370a, 470b and 470c) symmetrically (i.e., along the same axis of symmetry) with respect to a connection interface (e.g., the connection interface 305). The lighting fixture may further include an EMC element (e.g., the EMC cover 490b) and/or a doorframe assembly (e.g., the doorframe assembly 422) centered on the single light source. One or more of the structural fasteners, mounting arrangements and/or other lighting fixture components shown in FIGS. 3A-3D and 4A-4B may be moved, adapted or otherwise transformed in the single light source configuration. One or more additional components may also be provided. For example, heat sinks may be provided along the side walls of the lighting fixture housing (e.g., the housing 420) in addition to the heat sinks 470b and 470c, allowing heat sinks to be located along all four side walls of the housing. Such a configuration may be advantageously used to achieve, for example, higher heat transfer rates in single lighting fixtures with higher heat flux light sources.

Figure 5A:
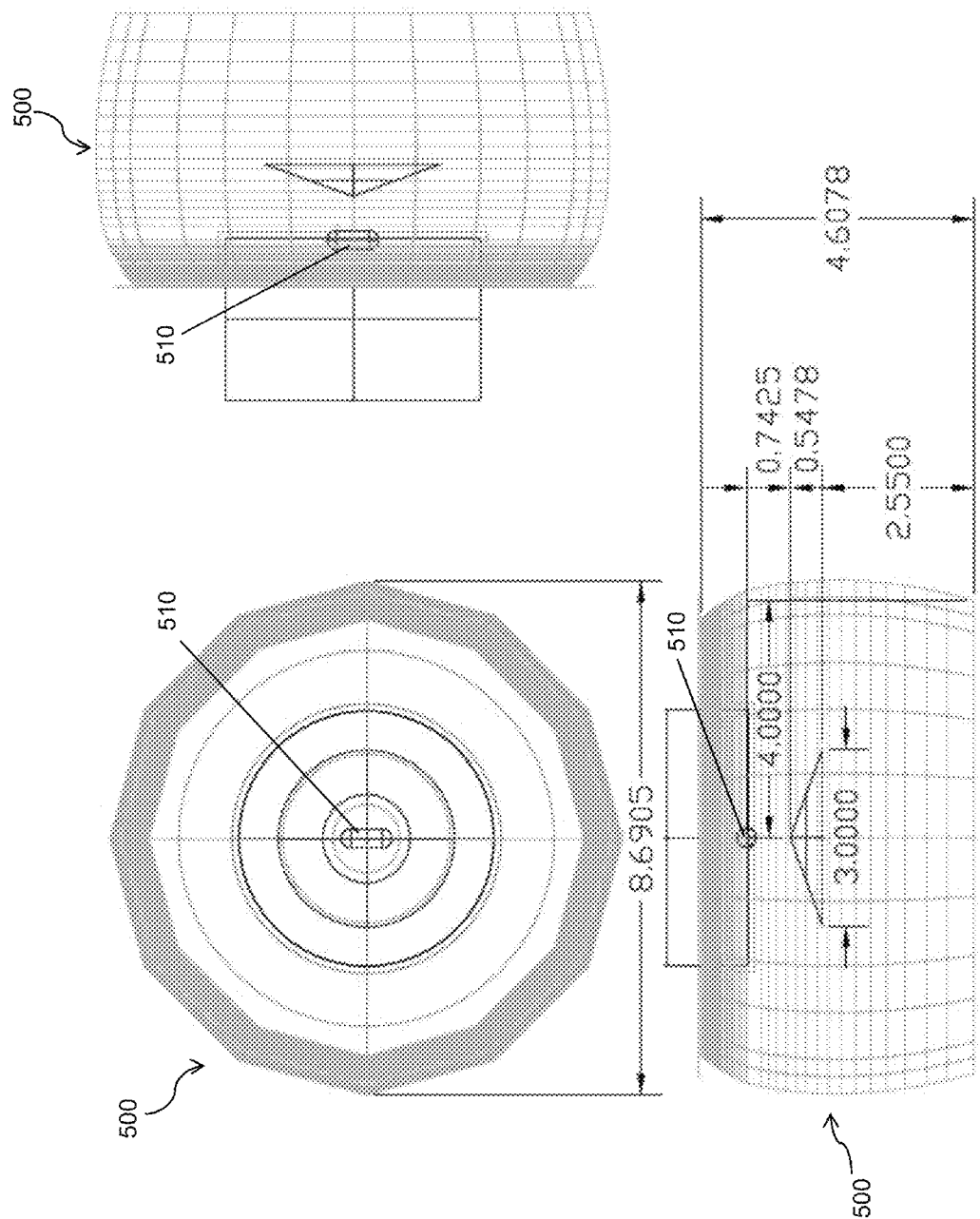

FIG. 5A shows an example of an optical element provided for the lighting unit. The optical element may be a reflector 500, which may have a polygonal shape. For example, the reflector may have a regularly polygonal cross-sectional shape, such as a circle, triangle, square, pentagon, hexagon, heptagon, octagon, nonagon, decagon, hendecagon, dodecagon, or any other polygon having any number of sides (e.g., 3 or more, four or more, five or more, six or more, eight or more, 10 or more, 12 or more, 16 or more, 20 or more, 25 or more, 30 or more, or 40 or more sides). The reflector may be symmetric, or asymmetric. The optical element may be a reflector of contiguous curvature. The optical element may be composed of any number of sections of contiguous curvature, facets, polygonal shapes, and/or any combination of these elements.

An optical element may have any size. For example, the optical element may have a dimension (e.g., length, width, height, diagonal, diameter) that may be greater than, less than, or equal to about one or more of the following, or fall between two or more of the following: about 0.5 inches, 1 inch, 1.5 inches, 2 inches, 2.5 inches, 3 inches, 3.5 inches, 4 inches, 4.5 inches, 5 inches, 5.5 inches, 6 inches, 7 inches, 8 inches, 8.5 inches, 9 inches, 10 inches, 11 inches, 12 inches, 13 inches, 15 inches, 17 inches, 20 inches, 25 inches, 30 inches, or 40 inches. The optical element may have a greater cross-sectional dimension than a height. For example, the ratio of the cross-sectional area to the height may be about 5:1, 4:1, 3:1, 2:1, 8.7:4.6, 3:2, 4:3, 5:4, or any other ratio.

The optical element may have any number of facets. One or more facet of the optical element may be flat, curved, or any combination thereof. The facets may correspond to the number of sides of optical element. The number of facets may correspond to a whole number multiplier of the number of sides of the cross-sectional shape of the optical element. For example if the optical element has twelve sides along its cross-sectional shape, there may be 12 facets, 24 facets, 36 facets, 48 facets, or any other number of facets.

A side profile of an optical element may provide an overall curve in the shape of the optical element. One or more curve may be provided at a top portion of the optical element profile. In some instances, one or more curve may be provided at a bottom portion of the optical element profile. In some instances, the top curve and bottom curve may be in the same direction. For example, both curves may occur inward toward the interior of the optical element. In some instances, the overall degree of curvature of the top curve may be about the same as the overall degree of curvature of the bottom curve. In other embodiments, the curvature at the top curve may be greater than the curvature of the bottom curve, or vice versa.

In some embodiments, a greater area density of facets may be provided at a top portion of the optical element than at a bottom portion of the optical element. In some instances, a greater density of facets may be provided where the optical element has a greater degree of curvature. In some instances, the optical element have a greater density of facets closer to a light source.

An optical element may be formed from a reflective material, thereby forming a reflector. In some instances, the optical element may have a shiny or mirrored surface. In some instances, the optical element may be composed of physical vapor deposited (PVD) aluminum substrate with specular or diffuse characteristics. In some instances, the optical element may include a metal or be formed from a metal. For example, an optical assembly may include a specular enhanced aluminum panel. In another example, the optical element may include formed aluminum reflectors with anodized finish. The optical element may have a smooth or rough surface. The optical element may or may not be optically transmissive. Light may or may not pass through the optical element. In some instances, the optical element may reflect the light to provide it in a desired direction.

An optical element may be assembled from multiple components, such as, for example, from individual facets and/or other corresponding segments or parts. The facets and/or other segments or parts (collectively referred to as "optical element components" herein) may be assembled without being permanently joined together. In one example, facets or other optical element components may form a compound shape by being held or pressed together mechanically ("sandwiched") in a predetermined configuration between two or more plates or other support members (e.g., between the support 400 and a corresponding support member). In the absence of the mechanical stress holding the optical element components together, the optical element components may fall apart. In some cases, the plates and/or support members may include grooves, clips, ribs, non-slip surfaces, stops, pins, ridges, and/or other structural features to hold the optical element components in place in a desired configuration. Alternatively, the optical element components may be permanently joined together (e.g., using adhesive, melting or welding of seams, or any other connection means known in the art).

The optical elements may be separately formed and assembled together to form a compound shape. In some cases, one or more of the optical element components may be formed together. Alternatively, each optical element component may be formed separately. Furthermore, each optical element component may itself be a compound or hybrid component. For example, each facet or other optical element component may comprise a first base layer and a second reflective layer that is coated or otherwise joined with the base layer. In yet another example, one or more optical element components may be integrally formed, and subsequently cut or separated into individual pieces to enable assembly into a compound shape. Combinations and/or variations of forming and assembling the compound/hybrid optical element components may be used. For example, first portions of two or more of the optical element components may be integrally formed and then cut or separated into individual pieces (e.g., a flat sheet of a flexible base layer may be cut into individual first portions). Second portions of the two or more optical elements may be individually joined with the first portions after the first portions have been separated (e.g., a stiffening reflective coating may be deposited after separation).

One or more light source 510 may be partially or completely surrounded by the optical element 500. The light source may be a radio frequency (RF) coupled electrodeless plasma light source, or any other type of light source described elsewhere herein. The light source package may have any shape or configuration. In one example, the light source may be pill-shaped. Alternatively, the light source package may be tubular, spherical, or have any other shape or configuration. Any light source may be used, which may include a radio frequency (RF) coupled electrodeless plasma light source, such as but not limited to LG Plasma Lighting System (PLS), Topanga Advanced Plasma Lighting (APL), Luxim Light Emitting Plasma (LEP), or Ceravision High Efficiency Plasma (HEP). These are provided by way of example only and are not limiting.

In some instances, the light source may have a small footprint compared to the optical element. For example, the ratio of the cross-sectional areas of the light source to the optical element may be greater than, less than, or equal to one or more of the following, or fall between two or more of the following: about 1:10,000, 1:5,000, 1:1,000, 1:700, 1:500, 1:300, 1:200, 1:100, 1:90, 1:80, 1:70, 1:60, 1:50, 1:40, 1:30, 1:20, 1:15, 1:10, 1:9, 1:8, 1:7, 1:6, 1:5, 1:4, 1:3, or 1:2.

The light source may be positioned within the optical element at any position. In some instances, the light source may be provided at the center of the cross-sectional area of the optical element. The center of the light source may be equidistant from the sides of a cross-sectional area of the optical element.

The light source may be positioned anywhere along the height of the optical element. In some instances, the light source may be positioned at or near the top of the optical element. For example, the center of the light source may be within the top 50%, 40%, 35%, 30%, 25%, 20%, 15%, 10%, 8%, 7%, 6%, 5%, 4%, 3%, 2%, 1% of the optical element. The light source may be positioned within about 0.1 inches, 0.3 inches, 0.5 inches, 0.6 inches, 0.7 inches, 0.8 inches, 0.9 inches, 1 inch, 1.2 inches, 1.5 inches, 1.7 inches, 2 inches, 2.5 inches, 3 inches, 2.5 inches, or 4 inches from the top of the optical element. In some instances, some distance may be provided between the light source and the bottom of the optical element. For example, the light source may be located at least about 0.1 inches, 0.5 inches, 1 inch, 1.5 inches, 2 inches, 2.5 inches, 3 inches, 3.5 inches, 4 inches, 5 inches, or 6 inches from the bottom of the optical element.

The optical element may be configured to cause light to be directed in a particular direction. For example, the optical element may provide a narrow range of illumination or a wide range of illumination. The optical element may cause the light to be emitted at any angle, including those described elsewhere herein. The light may be directed in a symmetrical or asymmetrical manner.

Figure 5B:
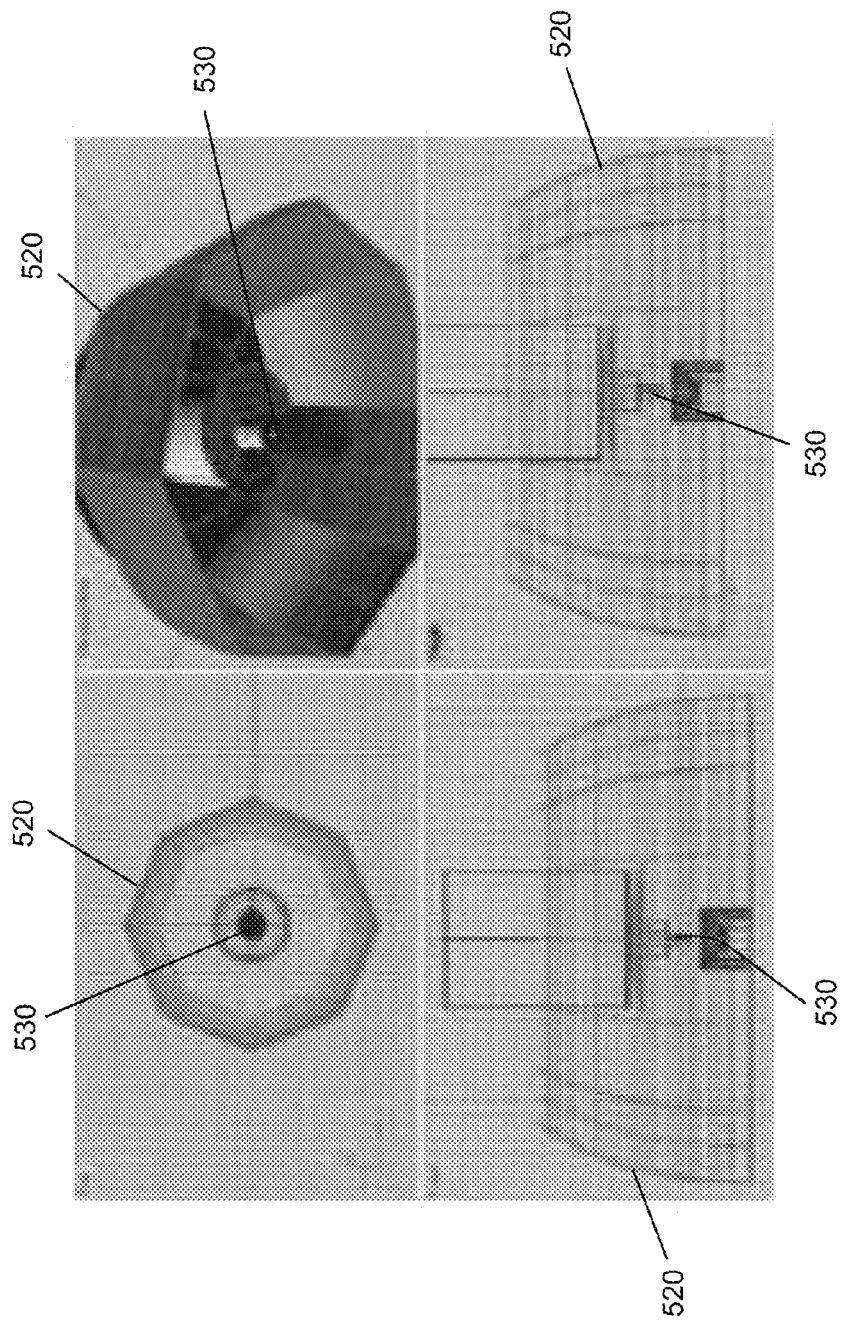

FIG. 5B shows an additional of an optical element 520 that may be provided for the lighting unit. The optical element may be a reflector. A light source 530 may be located within the optical element. The optical element may partially or completely surround the light source.

Figure 5C:
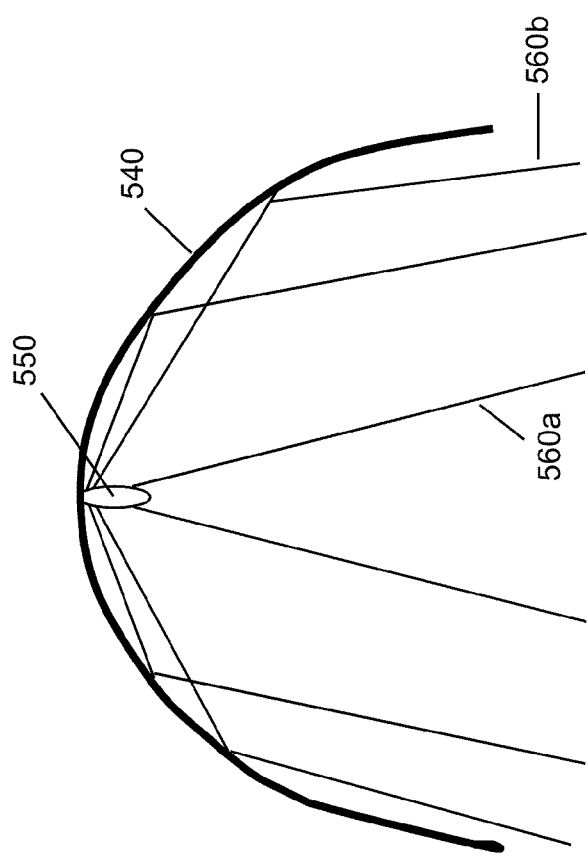

FIG. 5C provides a possible schematic of an optical element 540 used in a lighting unit. A light source 550 may be located at or near the top of the optical element. Light emitted by the light source 560a may directly travel in a direction of illumination, or may be reflected 560b from the optical element and may travel in a direction of illumination. The light source may be located at or near a top portion of the optical element. In some embodiments, light emitted by the light source may be directed primarily downward or in the direction of illumination. In some instances, not much light is directed upwards toward the optical element. In some instances, less than about 30%, 20%, 15%, 10%, 8%, 7%, 6%, 5%, 4%, 3%, 2%, 1%, 0.5%, or 0.1% of the light emitted by the light source may be directed upwards toward an optical element.

In some instances, the direction of the illumination may be toward a surface. In some instances, the direction of illumination may be downward, angled to the side, to the side, angled upward, or directly upward.

The optical element may be shaped to provide a desired pattern of illumination. The light may or may not reach a surface. A desired pattern of illumination may be provided to the surface. Characteristics of a desired pattern of illumination may include the shape of the illuminated area, the light intensity distribution over the illuminated area, and/or the wavelength of light provided at the illuminated area.

In some instances the optical element may be shaped to provide a desired pattern of illumination at a desired area of illumination, without causing much extraneous light to reach outside the desired area of illumination. The optical element may be shaped to focus the light at a desired area of illumination while minimizing or reducing the amount of light pollution in other directions. For example, the light may be directly primarily downward, and reduce the amount of light provided upwards or sideways.

In some examples, an optical element may be configured to provide a 2 fc average, 4 fc maximum, 1 fc minimum distribution of light. In another example, the optical element may be configured to provide 5 fc average, with a minimum of 3 fc in working areas and 1 fc in non-working areas, with a maximum of 18 fc. The optical element may provide greater than, equal to, and/or less than about 1 fc, 2 fc, 3 fc, 4 fc, 5 fc, 7 fc, 10 fc, 12 fc, 15 fc, 18 fc, 20 fc, or 25 fc. The optical elements may be configured to provide illumination to meet OSHA, or other governmental or private standards. This may occur for conditions, such as, for example, a 60-120 foot mounting height for the light fixture, with 225 to 450 foot spacing between poles. Such conditions are provided by way of example only and are not limiting.

Figure 5E:
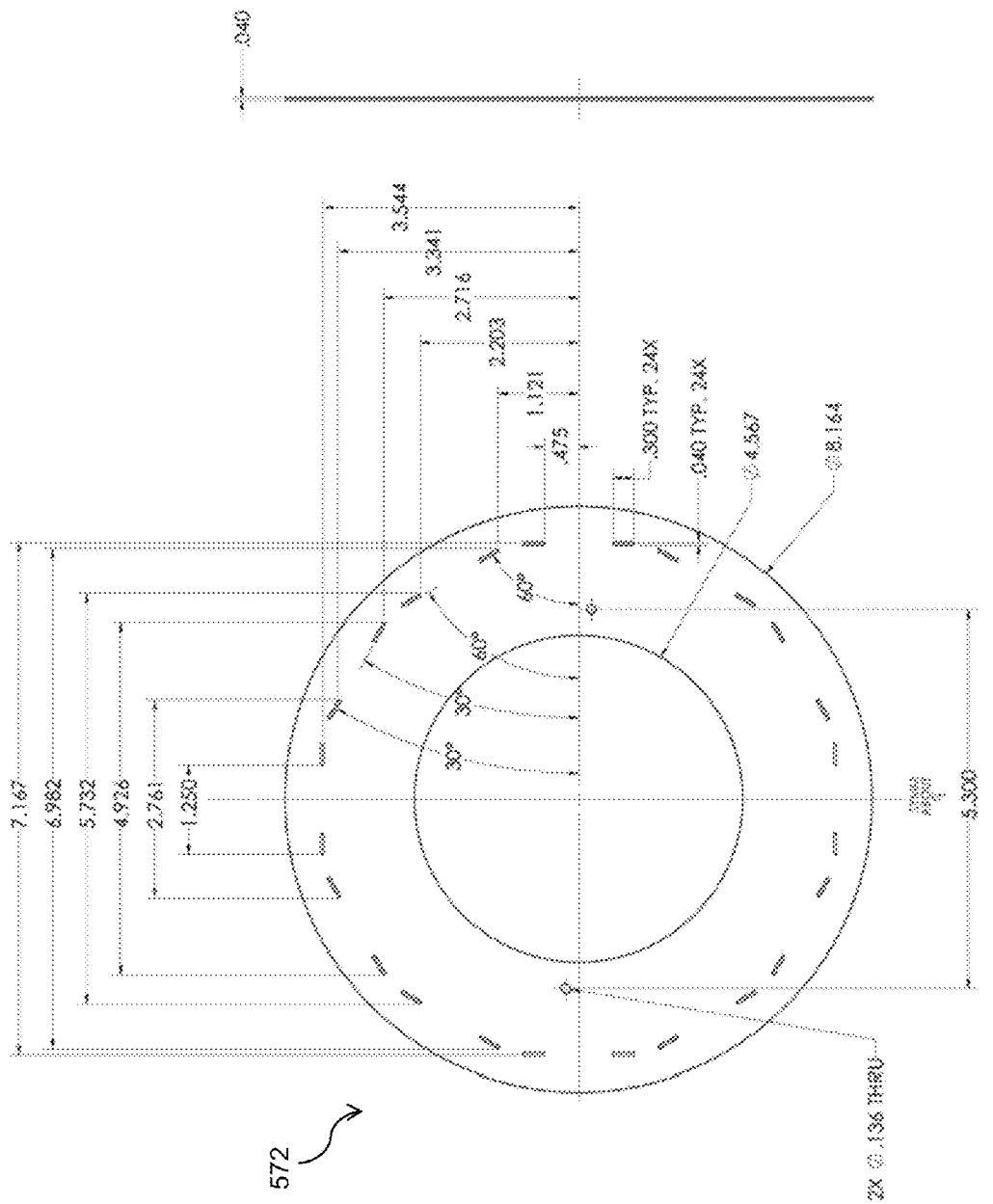
Figure 5F:
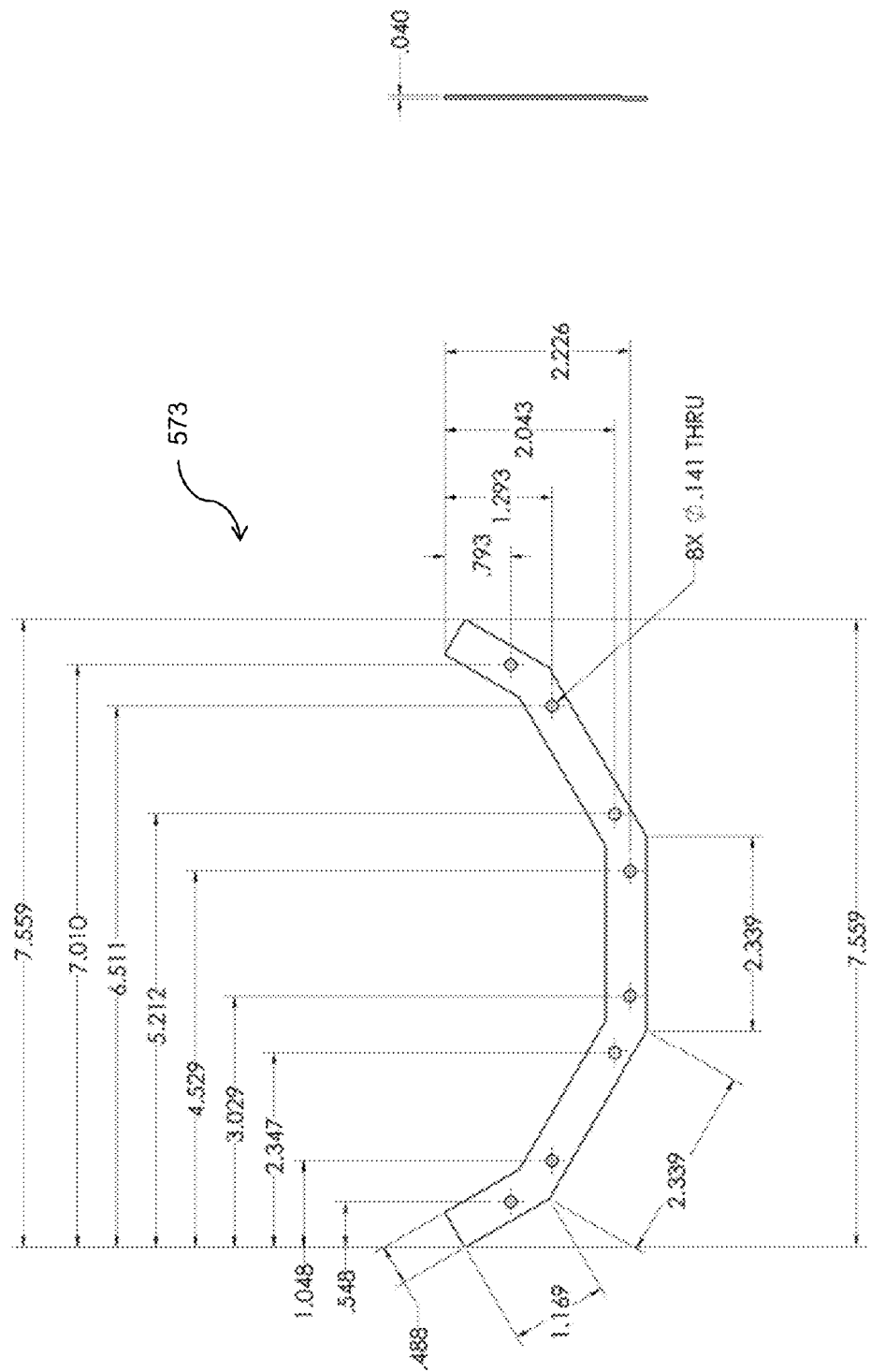
Figure 5G:
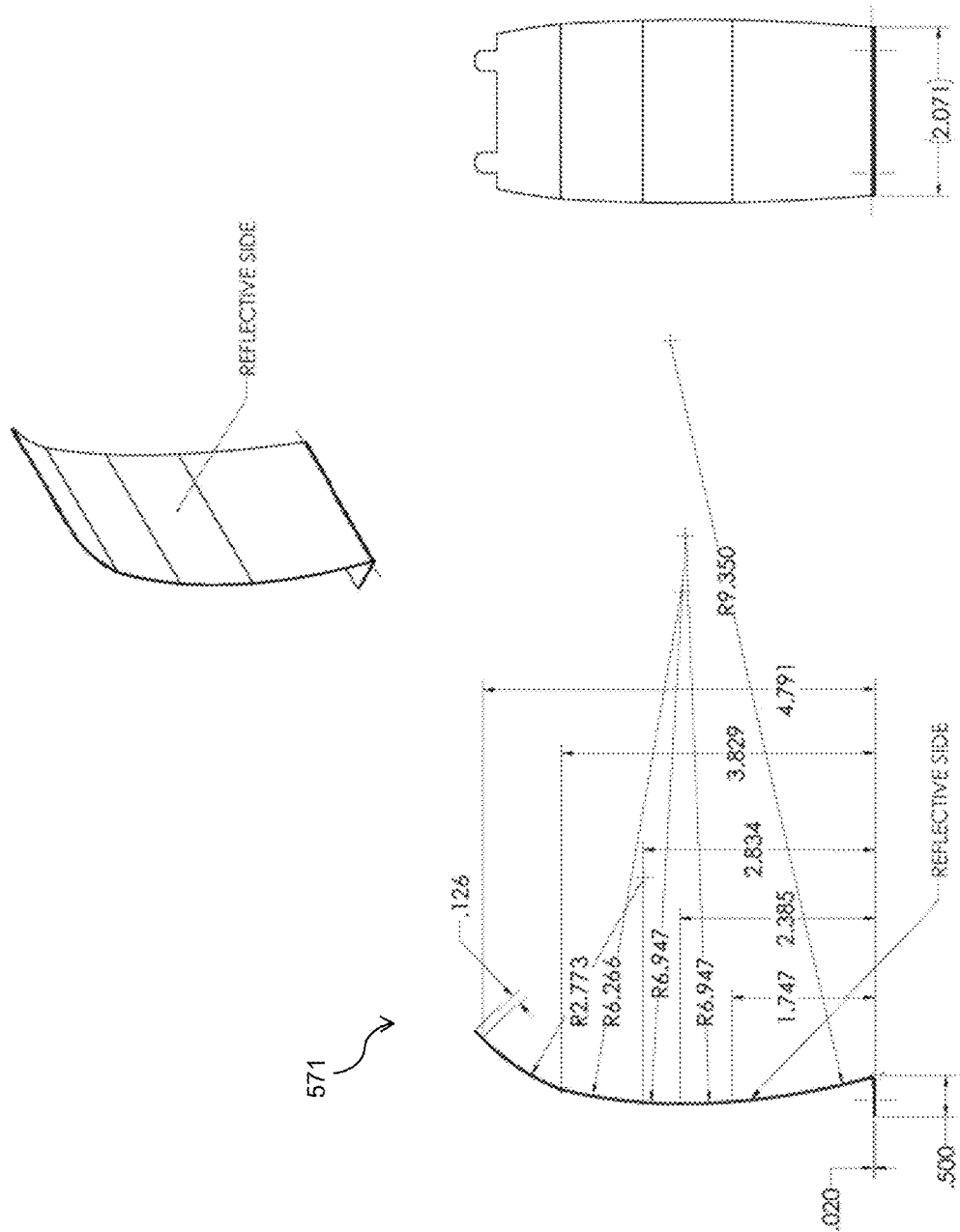
Figure 5I:
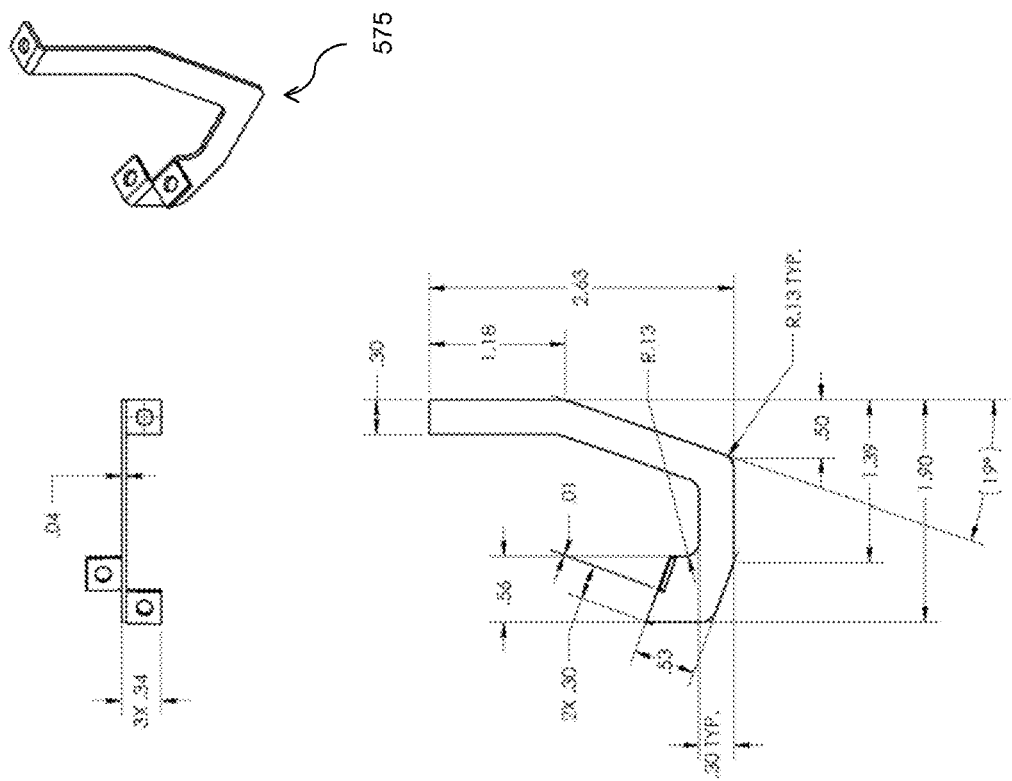

FIG. 5D shows an example of a reflector 500. The reflector may include a main reflector 571, a top reflector 572, a bottom reflector 573, a reflector cone 574, and a bracket 575 meeting the cone reflector. Optionally, the reflectors may be tabbed or bracketed reflectors. The description of the reflector cone is provided by way of example, and could be applied to any central optical element. FIG. 5E is an example of a top reflector 572. In some cases, the top reflector may be formed from aluminum. FIG. 5F is an example of a bottom reflector 573. In some cases, the bottom reflector may be formed from aluminum. FIG. 5G is an example of a main reflector 571. FIG. 5H is an example of a reflector cone 574. FIG. 5I is an example of a bracket 575 meeting a cone reflector. In some examples, the bracket may be formed from aluminum. Examples of possible dimensions of the reflectors in the foregoing figures are shown in inches. Lighting units of the disclosure may utilize one or more optics arrangements (e.g., one or more optical elements such as lenses, prisms and/or reflectors, covers and/or combinations thereof). One or more optics may be aimed, combined or arrayed to produce standard IES light distributions. For example, the lighting units may be configured with IES Type I, II, Type III, Type IV, Type V and/or Type VS optical systems. For example, the lighting units may utilize reflectors configured to offer one or more standard light distributions. For example, reflectors of the disclosure may provide Illuminating Engineering Society (IES) Type I, II, Type III, Type IV, Type V, and/or Type VS light distribution patterns. Standardized light distribution patterns may provide specific guidelines for precise light placement. Any standard or custom light distribution pattern may be provided. In some cases, a light distribution type may include square, round and/or other illumination configuration (e.g., round or square ground illumination patterns). In some cases, light distribution types may have a specific shape. Light distribution types or classifications may specify photometric properties, distance to half maximum candela trace, maximum candela value, lateral light distribution (e.g., lateral light distribution with regard to the lighted area width described as multiples of mounting height, width of half maximum candela trace within a longitudinal distribution range), vertical light distribution (e.g., based on where maximum intensity (candela value) points to on a grid) and/or other luminaire characteristics.

Figure 5J:
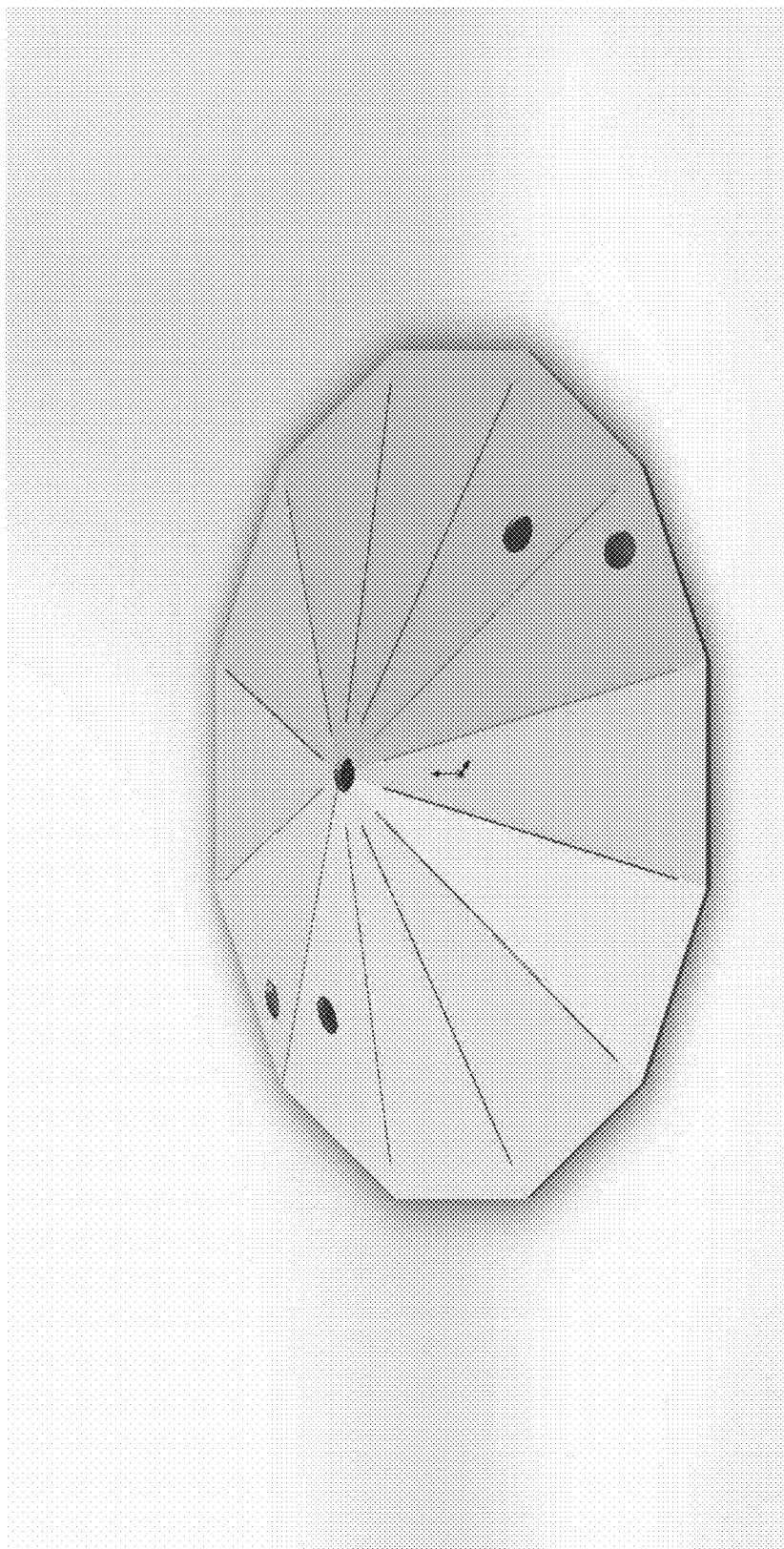

A central optical element may be provided for a primary optical assembly. For example, FIG. 5H provides an example of a central optical element. In some instances, a central optical element may be designed to increase or maximize reflectivity of light from a light source (e.g., RF electrodeless plasma light source) incident upon it. For certain optical coverage circumstances, it may be advantageous to create a central optical element that produces a weighted ratio of direct (i.e. un-reflected) light, and indirect (i.e. reflected or refracted) light. In one such embodiment, the faces of the central optical element can have varying degrees of reflectivity and/or diffusivity. In another embodiment, the central optical element can have intentional regions of transparency to the direct passage of light through the optical element. In one embodiment this transparency can be produced by introducing controlled porosity on the surface of the central optical element. In another embodiment the transparency can be produced by inserting optically transparent materials into the central optical assembly. In another embodiment, such as shown in FIG. 5J, this transparency is produced by introducing open holes through the reflecting or refracting surface(s) of the central optical element.

Different light distribution patterns may be suitable for various lighting applications. For example, IES Type I and/or Type II light distributions may be suitable for narrow areas, roadways, and walkways as a result of an asymmetrical wide lateral pattern. In another example, IES Type III light distributions may be suitable for wide roadways, site/area perimeters and open areas (general site lighting) as a result of an asymmetrical pattern which produces both lateral and forward light throw. In a further example, IES Type IV light distributions may be suitable for perimeters where a forward throw light distribution is required. In one embodiment, FIG. 2F, the IES Type IV forward throw light distribution may be provided via an asymmetric optical element. In another embodiment, a forward throw light pattern may be derived via a housing equipped with external shields for maximum light control, FIG. 2C. In yet another example, IES Type IV, IES Type V and/or Type VS light distributions (e.g., square of round) may be suitable for large open area illumination (e.g., ports) as a result of being designed for lighting from the center out. Various light distribution patterns may be associated with a particular pole or mast spacing. For example, high mast lighting of the disclosure may be configured with IES Type IV, IES Type V (also "Type V" herein) and/or IES Type VS (also "Type VS" herein) optic. A Type V luminaire may have a distribution that has a circular symmetry, defined by the IESNA, which is substantially the same at all lateral angles around the luminaire. A Type VS luminaire may have zonal lumens for each of eight horizontal octants, and may be within plus or minus ten percent of the average zonal lumens of all octants. One or more high mast lighting units may be spaced apart (e.g., to provide zone lighting) in a manner suitable given the individual light distribution patterns of the one or more lighting units.

A lighting unit may have one or more light sources. In some embodiments, the light sources may be radio frequency (RF) coupled electrodeless plasma light sources. The radio frequency (RF) coupled electrodeless plasma light sources may provide a lambertian optical distribution, toroidal optical distribution, or other optical distribution. One or more radio frequency (RF) coupled electrodeless plasma light sources may be combined with one or more IES Type IV, IES Type V or Type VS optics. The radio frequency (RF) coupled electrodeless plasma light sources of the disclosure may provide light intensities, patterns and/or other illumination characteristics that may be advantageously combined with a Type IV, Type V or Type VS optic to enable the lighting systems of the disclosure. For example, a radio frequency (RF) coupled electrodeless plasma light source may provide a light pattern that is well-suited for providing an IES Type IV, IES Type V or IES Type VS light distribution, or a similar light distribution pattern (e.g., high mast lighting described herein). In some cases, lower optic configurations (e.g., Type I, Type II, Type III, or other) may not be suitable for providing high mast lighting using the radio frequency (RF) coupled electrodeless plasma light sources herein. For example, one or more lower optic configurations may provide a too narrow light distribution for large area high mast lighting systems herein. In some cases, the lower optic configurations may not adequately utilize one or more lighting characteristics of the radio frequency (RF) coupled electrodeless plasma light sources. Type IV, Type V and Type VS optics may include, for example, optical elements such as lenses, prisms, waveguides, and/or reflectors, covers and/or other lighting unit components described elsewhere herein. In some cases, Type IV, Type V and Type VS optics may include one or more other optical components.

Lighting units configured with radio frequency (RF) coupled electrodeless plasma light sources and Type IV, Type V or Type VS optics may illuminate an area to a desired or threshold degree of light intensity per area (e.g., expressed in footcandles, i.e., lumens/ft$^2$) as described in more detail elsewhere herein. A lighting unit may illuminate an area with a light intensity greater than or equal to about: 100 lumens, 200 lumens, 500 lumens, 1000 lumens, 2000 lumens, 3000 lumens, 4000 lumens, or 5000 lumens. For example, a radio frequency (RF) coupled electrodeless plasma light source with Type IV, Type V or Type VS optic may illuminate an area with a light intensity of about 4000 lumens. The light source may illuminate the ground area with greater than, equal to, and/or less than about 15,000 lumens, 23,000 lumens, 30,000 lumens, 46,000 lumens, or 90,000 lumens.

The lighting units configured with radio frequency (RF) coupled electrodeless plasma light sources and Type IV, Type V or Type VS optics may spread the light intensity and/or light pattern provided by each radio frequency (RF) coupled electrodeless plasma light source over an angle (e.g., to achieve a desired light distribution). For example, a portion of the radiant intensity and/or luminous intensity (e.g., candela value) from a radio frequency (RF) coupled electrodeless plasma light source may be spread over an angle, wherein the portion may be less than, greater than or equal to about: 5%, 10%, 20%, 30%, 40%, 50%, 60%, 70%, 80%, 90%, or 100%. The radiant intensity and/or luminous intensity may be spread over an angle. The angle may be defined with respect to an axis of symmetry in the direction of illumination. Alternatively, the angle may be defined as an angle between two directions at different angles with respect to the axis of symmetry. For example, for a lighting unit with axially symmetric illumination, the radiant intensity and/or luminous intensity from an radio frequency (RF) coupled electrodeless plasma light source may be spread over a two-dimensional angle of less than, greater than or equal to about: 1°, 5°, 10°, 15°, 20°, 30°, 45°, 60°, 90°, 125°, or 180° in a side view of the lighting unit. In some cases, the radiant flux or luminous flux (e.g., lumen value) may be uniformly distributed in the direction of illumination over the spreading angle. Alternatively, the radiant flux and/or luminous flux may be distributed unevenly (e.g., in accordance with a desired light distribution or illumination pattern). For example, 80% of the radiant intensity and/or luminous intensity from an radio frequency (RF) coupled electrodeless plasma light source may be spread over an angle of less than about 10° with respect to an axis of symmetry in the direction of illumination, 15% may be spread over an angle of greater than about 10° but less about 15° with respect to an axis of symmetry in the direction of illumination, and 5% may be spread over an angle of greater than about 15° with respect to an axis of symmetry in the direction of illumination. More generally, the radiant intensity and/or luminous intensity from an radio frequency (RF) coupled electrodeless plasma light source may be spread over a three-dimensional angle of less than, greater than or equal to about: $\pi/10$, $\pi/9$, $\pi/8$, $\pi/7$, $\pi/6$, $\pi/5$, $\pi/4$, $\pi/3$, $\pi/2$, $\pi$, $1.2\pi$, $1.4\pi$, $1.6\pi$, $1.8\pi$, or $2\pi$ steradians. In some cases, a portion of light may be spread over an angle of up to $4\pi$ steradians.

Figure 6:
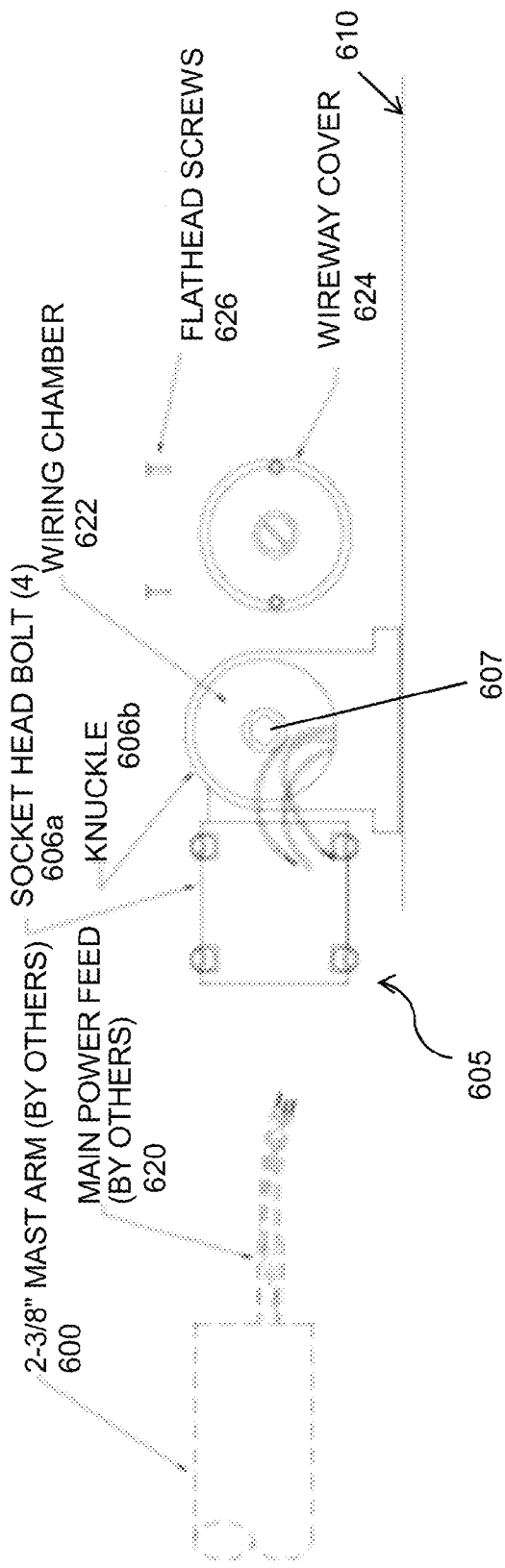
FIG. 6 shows an example of a retro-fit connection of a lighting fixture to a support.

FIG. 6 shows an example of a retro-fit connection of a lighting fixture 610 to a support assembly 600. Alternatively, such a connection may be used for a new support assembly which need not be a retro-fit. A connection interface 605 may be used to connect the lighting fixture to the support assembly. In some instances, the support assembly may be a pre-existing structure. For example, the support assembly may be a pre-existing pole, mast, tower, or any other support assembly or support described elsewhere herein. The pre-existing support assembly may have been used for other types of lighting units, or for other purposes. The support assembly may be retro-fitted to support a lighting fixture as described herein. The retro-fit may occur via the connection interface.

In some instances, the connection interface 605 may include a socket head bolt 606a and a knuckle 606b. The knuckle may be connected to the lighting fixture. For example, the knuckle may be affixed to a housing of the lighting fixture. The knuckle may be connected to the lighting fixture in any manner, including mechanical fasteners, adhesives, soldering, welding, or any other connection mechanisms described elsewhere herein.

The socket head bolt 606a may be connected to the knuckle 606b. The socket head bolt may have a fixed position relative to the knuckle. Alternatively, the socket head bolt may be movable relative to the knuckle. In one example, a pivot 607 may be provided. The pivot may permit the socket head to rotate about the pivot point with respect to the knuckle. The socket head bolt and knuckle may be arranged at various angles with respect to one another. For example, the socket head bolt and the knuckle may be orthogonal to one another. In some instances, they may be arranged at any angle from 0 to 180 at a continuous spectrum. In other embodiments, they may be arranged at any angle from 0 to 180 at discrete angles along the spectrum. In some instances a single pivot is provided, permitting rotation about a single axis of rotation. Alternatively, two or more pivots may be provided, which may permit rotation about two or more axes of rotation. In some instances, a ball and socket joint may be provided, which may permit rotation in multiple directions.

The socket head bolt 606a may connect to the support 600. In some instances, the socket head bolt may be adjustable to accept various configurations or sizes of the support. For example, if the support is an extended shape, such as a cylinder or prism, the socket head bolt may have one or more adjustable features that may accept a variety of sizes and/or shapes. Alternatively, the socket head bolt may be selected to fit a particular support size and/or shape.

A support 600 may include a main power feed 620. The main power feed may provide power from a power source. The power source may be a utility, energy storage system (e.g., battery or ultracapacitor), or energy generation system (e.g., such as a renewable energy generation system such as a photovoltaic system, wind generation system, geothermal system, hydroelectric system). The power source may be provided with the pre-existing support.

The knuckle 606b may include a wiring chamber 622 which may be capable of receiving the main power feed 620. For example, the main power feed may be provided as one or more wires. The one or more wires may go into the wiring chamber. In some instances, a wireway cover 624 may be provided for the wiring chamber. The wireway cover may prevent the interior of the wiring chamber from being exposed. The wireway cover may prevent the wiring within the wiring chamber from being exposed. The wireway cover may be connected to the wiring chamber via one or more fastener, such as flathead screws 626 or any other fastening mechanism.

The lighting fixture 610 may be mechanically and electrically connected to the support 600. The mechanical connection may be provided via the socket head bolt 606a and the knuckle 606b. The electrical connection may be provided via the main power feed 620 which may be housed in portions of the connection interface 605. The main power feed may be electrically connected to one or more internal components of the lighting fixture. For example, the main power feed may be electrically connected to the driver, light source, controller, communication unit, and/or any other components of the lighting fixture.

The support assembly 600 may be retro-fitted with the lighting fixture 610 as described. In some instances, the connection interface 605 may already be connected to the lighting fixture when the socket is connected to the support assembly. For instance, the knuckle 606b may already be connected to the lighting fixture. Alternatively, the connection interface may be connected to the support assembly prior to being connected to the lighting fixture. For example, the socket head bolt 606a may be connected to the support assembly before the knuckle is connected to the lighting fixture.

Figure 7:
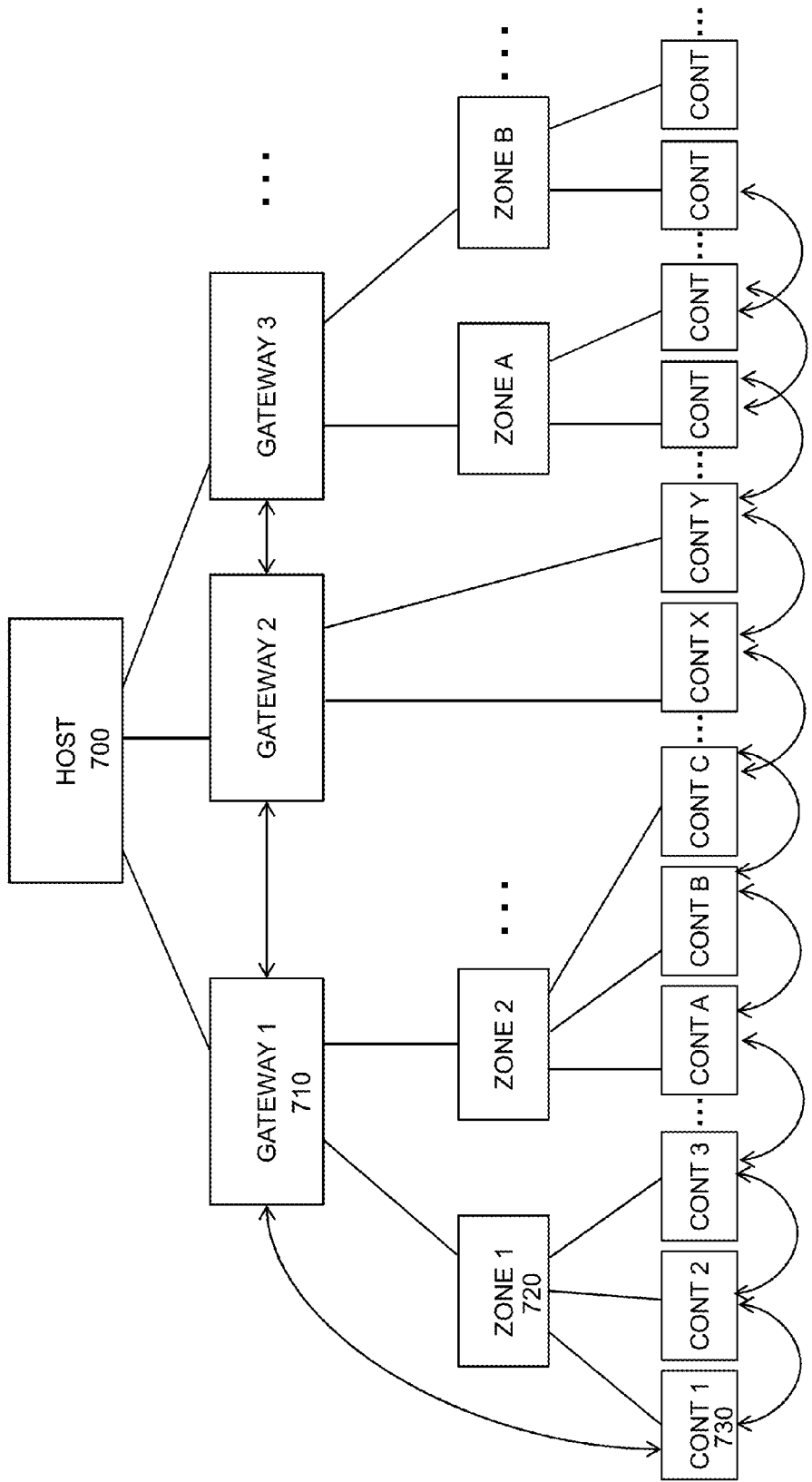
FIG. 7 shows an example of a control hierarchy in accordance with an embodiment of the invention.

FIG. 7 shows an example of a control hierarchy in accordance with an embodiment of the invention. One or more host 700 may be provided in accordance with an embodiment of the invention. The host may be used to manage a lighting system. The host may communicate with one or more gateways 710. A gateway may link one or more lights to the host. In some instances, a gateway may control one or more zone 720. In some instances, one or more controller 730 which may be mounted to one or more light fixture may be provided. One or more controller may be provided in a zone. The gateway may communicate with one or more controller directly without concern for zones, or the controllers may be organized into zones.

In additional alternative embodiments, the various components may communicate with each other. For example, a top-down approach need not be employed. A mesh networking architecture may be provided where devices at the same level may communicate with one another. For example, gateways, zones, and/or individual controllers may communicate with one another. Communications may occur between a device and another device at the same level, lower level, and/or higher level. Controls or decisions need not be made only at the top level, but the lower levels may provide input that may affect other devices at the same level, lower level and/or upper levels.

The host 700 may receive one or more sensor readings. The sensors may be provided as part of a lighting unit or may be provided separately from the lighting units. For example, one or more sensors may be provided at a location to be illuminated by a lighting unit, to determine the level of light intensity provided at the area. The sensors may include information (e.g., a plurality of sensor information) including, but not limited to, energy consumed by one or more lighting unit, characteristics of light provided by the lighting unit, temperature of the lighting unit, errors detected, sound, motion detection, vibration information, security and visual data, and/or light-life information. Examples of characteristics of light may include one or more of: color temperature, color rendering index (CRI), or luminosity. This information may be sent to the host via a communication unit of a lighting unit. In some instances, information may be sent directly from a sensor without going through a lighting unit communication unit. Sensor data may include data relating to the light source (e.g., power factor, voltage, current, characteristics of light, etc.). Sensor data may include data relating to the environment (e.g., ambient light, ambient temperature, etc.). Sensor data may include data relating to the lighting unit and/or the lighting system (e.g., energy consumption, characteristics of light, temperature of lighting unit, errors detected, motion detection, vibration, sound, security and visual data, light-life information, ambient light, ambient temperature, power quality, power and functioning, non-functioning including status of neighboring lighting units, etc.). Examples of power quality may include one or more of: voltage transients, ring wave behavior, or brown out conditions. In some cases, any given type of sensor data may relate to one or more of the light source, the environment, the lighting unit and the lighting system.

The host 700 may use collected data to assist with managing the lighting system. In some instances, a user may input one or more desired parameter for one or more zones, or one or more lighting units. As previously described, a host may permit individual lights to be grouped together into virtual zones. The zones may be independently controllable. Individual lights within a zone may or may not be independently controllable. Zones may be used with strategies to decrease energy usage and increase safety.

Data may be used along with standard or custom control applications, which may optimize or improve energy usage and safety. On demand status and maintenance reports, which may be viewed locally or remotely, can be generated. Energy data management reports may be provided, which may look at total energy usage per lighting unit, per zone, or for a network (e.g., an entire network, or any given portion of a network such as, for example, a portion of the network other than a zone). The energy data management reports may provide such information within a selected time window. For example, the energy data management report may look at energy usage from a particular date or time to another particular date or time. Energy data management reports may also look at illumination provided on a per lighting unit, zone, or network (e.g., entire network) basis. Energy efficiency for one or more lighting unit, one or more zone, and/or one or more network may be calculated. The energy data management report may also show the illumination provided at a desired illumination area. In some instances, the energy data management report may also show the illumination provided at undesired areas (e.g., light pollution).

The host 700 may be provided on a device, such as a server, personal computer, laptop computer, tablet, mobile device (e.g., smartphone, cell phone, personal digital assistant), or any other networked device. The host may have one or more processor and a memory. The memory may store data and/or non-transitory computer readable media, which may include code, logic, or instructions for performing one or more step. For example, the tangible computer readable media may include instructions for performing a calculation and/or determination as provided herein, or generating a report as provided herein. A processor may be used to carry out one or more step as described herein. A host may be accessed by a user via a device, such as a device described herein. The host may be provided on a cloud-computing type infrastructure. Host may be accessible on clients network, using an appliance or their network hardware. Host may also be accessible via a virtual private server, platform as a service (PaaS), or software as a service (SaaS), or host as a service (HaaS). One or more processing component for the host and/or memory for the host may be distributed over a cloud-computing infrastructure.

The host 700 may communicate with one or more gateways 710. In some instances, the host may communicate with multiple gateways, such as two or more, three or more, four or more, five or more, ten or more, 15 or more, 20 or more, 30 or more, 40 or more, 50 or more, 100 or more, 150 or more, 200 or more, 300 or more, or 500 or more gateways. The host may communicate with the one or more gateways over a network, such as any type of network described elsewhere herein. The host may communicate directly with one, two or more gateways. The host may communicate with the gateways wirelessly or over a wired connection. In other instances, the host may communicate over a cellular, fiber optic, or satellite connection. For example, 3G or 4G cellular connections may be used for a gateway device. Satellite communications may also be applicable. Any communications at any of the levels described herein, or between any devices may be wireless or wired. Any communications may be directly between devices, through peer-to-peer arrangements, via one or more additional devices, over a network, or using a cloud-computing infrastructure.

In some embodiments, each gateway 710 may link a plurality of lights to the host 700, providing a backhaul Ethernet link. Any number of lights may be connected via a gateway. In one example, up to 10 lights, 50 lights, 100 lights, 250 lights, 500 lights, or 1000 lights may be connected per gateway. Multiple gateways can be connected to manage a large number of lights with or without zone configurations. In some instances, multiple gateways can be connected to manage thousands of lights with multiple zone configurations.

One or more controllers 730 may be provided per lighting unit. For example, a controller may be mounted internally or externally on each lighting fixture. The controller may be contained within a housing of the lighting fixture. The controller may be embedded internally and have an internal or external antenna. The controller may permit remote control of on/off/dimming functions while monitoring energy usage and other parameters of the lighting fixture. Some examples of other parameters may include temperature, lamp status, humidity, sound, vibration, motion detection, light level, power quality (e.g., voltage transients, frequency drift, voltage drops, power factor). In some instances, a plurality of light sources may be provided within the lighting fixture. The controller may permit independent remote control of on/off/dimming functions of each light source in the plurality. In some instances, a plurality of controllers may be provided for independent dimming of each light source (e.g., one per light source, or per multiple light sources). Such remote control may be generated automatically based on one or more parameters, or may be inputted by a user. In one example, a communication unit of a lighting unit may receive a wireless signal, which may be sent to the controller, which may provide one or more instructions to a driver to turn on, turn off, dim, or brighten one or more light sources of the lighting fixture. Such communication with the controller may be provided via a communication unit of the lighting unit, which may permit wired or wireless communications via the gateway.

One or more light source may be individually addressable and/or controllable. The light sources may be controlled independently of one another. In some instances, each light source may be independently controlled and/or groups of light sources may be controlled together independently of other groups.

The controller may permit monitoring of the lighting unit. The controller may monitor watts, KWHrs and lifetime usage stats for the lighting unit. Such monitoring may occur on a per lighting unit basis, or on a per light source basis. Additionally, diagnostic capabilities may be provided for indicating light failure or inefficiency. Such failure or inefficiency may be determined on a per lighting unit basis or a per light source basis. For example, a controller may determine that a particular light source of a plurality provided in the lighting unit has a potential failure. The alert may be sent via the gateway to the host, which may provide an alert about which particular light source needs to be replaced or checked.

Various examples of a control hierarchy is provided. Any of numbers of levels of control or groupings may be provided. A host 700 may communicate with a gateway (e.g., GATEWAY 1), which may manage a plurality of zones (e.g., ZONE 1, ZONE 2), which may each have a plurality of controllers (e.g., CONT 1, CONT 2, CONT 3, . . . , CONT A, CONT B, CONT C, . . . ) provided with lighting units. In another example, a host 700 may communicate with a gateway (e.g., GATEWAY 2), which may directly communicate with a plurality of controllers (e.g., CONT X, CONT Y, CONT Z, . . . ) provided with lighting units, without regard to any sort of zone.

The host, gateway, and/or controllers may be located at remote locations relative to one another. For example, a controller may communicate with a gateway which may or may not be remote from the controller. The gateway may communicate with the host which may or may not be remote from the gateway. The host and/or controller may or may not be at remote locations relative to one another.

In some embodiments, the communication unit may be capable of communicating as a host, as a gateway, and/or as a controller (e.g., internal controller). In some embodiments, the communication unit may be capable of communicating with a host, a gateway, and/or a controller (e.g., internal controller or external controller) provided separately from the communication unit. Thus, the communication unit may serve as a hub for enabling implementation of control hierarchies herein.

In some embodiments, an external control system (e.g., comprising one or more external controllers) and internal control system (e.g., comprising one or more internal controllers) may be used in concert. The external control system and the internal control system may be bridged (e.g., the two systems may interact, e.g., via the communication unit). For example, the external control system and the internal control systems may be bridged using either wired or wireless communication across a network (e.g., any network herein). In an example, the external control system may comprise a security system that generates an event. Optionally, the external control system may comprise a supervisory control and data acquisition (SCADA) system, which may provide control of remote equipment. In another instance, the external control system may comprise an enterprise resource planning/enterprise resource management (ERP/ERM) system, which may collect, store, manage and interpret data from many business activities. The event may be communicated with the internal control system, and vice versa. In some implementations, the external and/or internal control systems may be part of the management software system.

For example, the external and internal control systems may communicate within the framework of the management software system.

Figure 8:
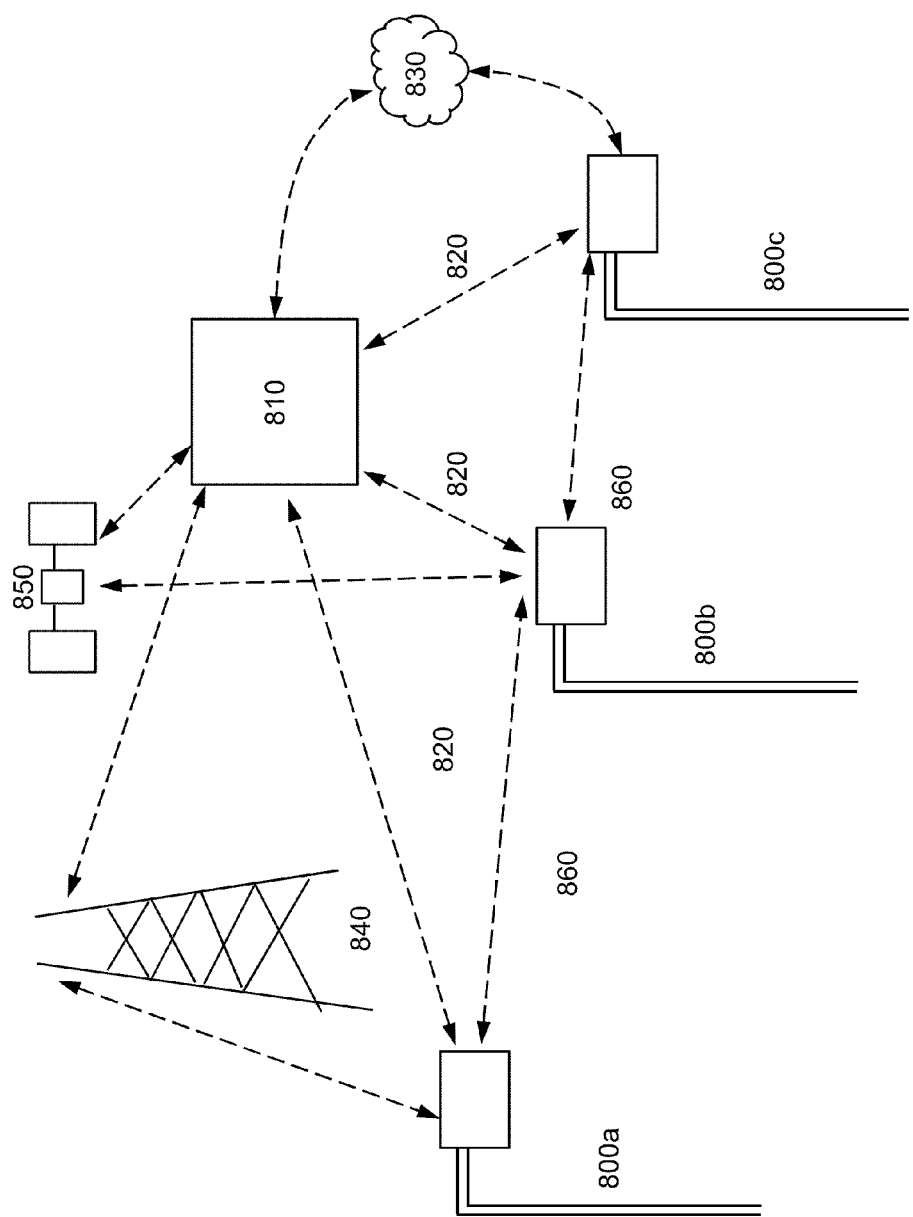
FIG. 8 provides examples of various communication mechanisms between lighting units and controllers.

FIG. 8 provides examples of various communication mechanisms between lighting units and external devices. In one example, a plurality of lighting units 800a, 800b, 800c may be provided. The lighting units may communicate with an external device 810. The external device may be a host, gateway, or another lighting unit. Any description of an external device may refer to a single device, plurality of device, or cloud-computing type infrastructure. Host may be accessible on clients network, using an appliance or their network hardware. Host may also be accessible via a virtual private server, platform as a service (PaaS), or software as a service (SaaS), or host as a service (HaaS).

The lighting units may have a communication unit therein. The communication unit may be capable of sending and/or receiving communications from an external device. The lighting units may communicate with the external device via the communication unit.

In some embodiments, the lighting units may communicate directly 820 with the external device. Such direct communications may occur via receivers and/or transmitters of the lighting units and external device which may permit direct communications. Such communications may occur via any frequency, e.g., radio frequency. Alternatively, or additionally, such communications may occur through wired and/or optical landline networks, e.g., power-line communication. Such communications may occur without requiring intervention by other devices and/or networks.

The lighting units may also communicate with the external device via a network 830. Such networks may be local area networks, or wide area networks, such as the Internet. Such networks may be telecommunication networks.

A tower 840 or other structure may aid in the communication of the lighting unit with an external device. Such a structure may receive a signal from a lighting unit and relay the signal to the external device. Similarly, such a structure may receive a signal from the external device and relay the signal to the lighting unit. In some instances, such signals may be relayed via one tower or intermediary structure. Alternatively, they may be relayed via a plurality or series of towers and/or other structures. The tower or other intermediary structures may have receivers and/or transmitters that may permit direct communications with the lighting units, external device, and/or other intermediary structures.

In some instances, communications may be provided via a satellite 850 or other intermediary device. The satellite may receive a signal from a lighting unit and relay the signal to the external device. Similarly, a satellite or other intermediary device may receive a signal from the external device and relay the signal to the lighting unit.

In some instances, the lighting units may be able to communicate directly 860 with one another. Such direct communications may occur via receivers and/or transmitters of the lighting units which may permit direct communications. Such communications may occur via any frequency, e.g., radio frequency. Alternatively, or additionally, such communications may occur through wired and/or optical landline networks, e.g., power-line communication. Such communications may occur without requiring intervention by other devices and/or networks. In other examples, the lighting units may communicate with one another via one or more intermediary structure or device, or over a network.

Peer-to-peer communications may be provided between the lighting units. In some instances, peer-to-peer communications may be provided without requiring a centralized host. The functions of the host may be performed by a lighting unit, or by a distributed set of lighting units. The distributed set of lighting units may form a cloud or mesh network type infrastructure.

In some instances, a master-slave organization may be set up, where a master lighting unit may provide instructions to one or more slave lighting unit. In some instances, the master lighting unit may generate or determine the instructions to the provided to the slave lighting units. The master lighting unit may function as a host. Alternatively, the master lighting units may receive instructions from a host. The master lighting unit may provide instructions to the slave lighting units based on instructions from the host. In one example, the master lighting unit may be a gateway and a slave lighting unit may be a lighting controller or vice versa.

One or more, or any combination of communication techniques and/or control techniques described herein may be used.

In some instances, an external wireless control may be provided mounted on a light fixture housing. In another example, the wireless controller assembly may be mechanically and electrically connected to, or contained in, each fixture at manufacturing and/or assembly as an integral part of the fixture. In one embodiment the lighting controller defaults to a bypass state where the controller does not provide active fixture control or metrology, but instead lies dormant until some point at which the customer decides to activate the light fixture via the wireless control and/or utilize the metrology functionality. In one possible embodiment, the controller's function and presence can be completely transparent to the customer, and in the absence of wireless lighting control engagement can provide a light fixture that turns on fully when external power is applied, and turns off fully when external power is removed. In another possible embodiment the absence of wireless lighting control engagement provides a light fixture that will not emit light, independent of the external power state.

A controller may have the capability of ongoing wireless connectivity to other wireless control elements, including wireless gateways, other components of a wireless mesh network, cellular (e.g. GSM, CDMA, TDMA, GPRS) and/or satellite networks. As a result of this ongoing connectivity, the controller may be wirelessly activated to provide control and metrology functionality expediently at any point in time. The controller may be awakened by any wireless assembly or method mentioned above.

Various command and control elements exist to manage the customer's activation and operation of the wireless control. Such following command and control schemes are provides by way of example only and are not limiting. Command and control also facilitates the lighting controller's metrology functions. In one embodiment, the command and control can be managed by the physical presence of an active control gateway. In another embodiment, enabling the command and control logic occurs via physical alphanumeric entry on the gateway unit. In another embodiment, command and control logic is enabled via physically restricting gateway connectivity to the host software via mechanical action and/or network routing action. In another embodiment command and control is enabled via password/hash/salted hash/symmetric key exchange/asymmetric key exchange or other authentication methods between the gateway and the host software, or vice versa. In another embodiment command and control is enabled via password/hash/salted hash/symmetric key exchange/asymmetric key exchange or other authentication methods with the gateway and the lighting controller, or vice versa. In another embodiment command and control is enabled via password/hash/salted hash/symmetric key exchange/asymmetric key exchange or other authentication methods with the light controller and the host software, or vice versa. In another embodiment command and control is enabled via password/hash/salted hash/symmetric key exchange/asymmetric key exchange or other authentication methods between the light controller and another light controller, or vice versa. In another embodiment command and control is enabled via password/hash/salted hash/symmetric key exchange/asymmetric key exchange or other authentication methods with the gateway and another gateway, or vice versa. In another embodiment command and control is enabled via password/hash/salted hash/symmetric key exchange/asymmetric key exchange or other authentication methods with the one local, remote, or cloud-based instance of the host software and another local, remote, or cloud-based instance of the host software, or vice versa. In another embodiment command and control is enabled via password/hash/salted hash/symmetric key exchange/asymmetric key exchange or other authentication methods with authentication occurring between one, any, or all of the gateway(s), light controller(s), local host software instance(s), remote host software instance(s), and cloud-based host software instance(s) in any possible combination. In another embodiment command and control is enabled via authentication, with the host software instance(s), gateway(s), lighting controller(s) in one, any, or all combinations, of a portable electronic device, phone, smart phone, phablet, tablet, laptop, e-reader, embedded hardware, or other computing device connected via any wired, wireless, mechanical, or the means to one, any, or all light controller(s), gateway(s), or host software instance(s). In another embodiment command and control is enabled via authentication, with the host software instance(s), gateway(s), lighting controller(s) in any combination, of a portable electronic device, phone, smart phone, phablet, tablet, laptop, e-reader embedded hardware, or other computing device via geographical proximity to the light controller, gateway, and/or other mesh network element. Proximity can be established through geolocation via cellular wireless network, wireless data network, GPS, differential GPS, other satellite-based location system (e.g. GLONASS), and/or transponder/transceiver based locator system (e.g. LORAN). Proximity can also be established by having sufficient locality to communicate wirelessly directly with the mesh network comprised of lighting controller(s), gateway(s), and host software instance(s). In another embodiment command and control is enabled via password/hash/salted hash/symmetric key exchange/asymmetric key exchange or other authentication methods between the light controller(s), gateway(s), and/or host software software instance(s) and any third party software including enterprise resource planning (ERP) systems, managed operating systems, MEP control/automation systems, sensing software, and/or supervisory control and data acquisition (SCADA) software. In another embodiment command and control is enabled via password/hash/salted hash/symmetric key exchange/asymmetric key exchange or other authentication methods between the light controller(s), gateway(s), and/or host software instance(s) and any third party hardware devices including biometric analysis, external switchgear, relays, breakers, high/low logic controls, pulse width modulated (PWM) duty cycle, radio frequency ID (RFID), near field communication (NFC), Bluetooth, ZigBee or other mesh network protocols, secondary lighting control networks (e.g. DMX, Artnet, ESP), automation control (e.g. Crestron, AMX), SCADA hardware, MEP control/automation hardware, photo sensors, motion sensors, camera-based motion detection, ultrasonic sensing, inductive loop sensors, hall effect sensors, temperature sensors, pressure sensors, humidity sensors, carbon monoxide sensors, residual gas analyzer, partial pressure sensors, vacuum sensors, giant magnetoresistive (GMR) sensing, and/or other sensing methods.

Lighting communications and/or control of the lighting unit(s) by lighting controller(s), gateway(s) and/or the host may utilize a user interface provided, with the aid of a processor, to one or more users. The user interfaces may allow the user(s) to interact with lighting systems provided herein. For example, one or more communication and/or control steps, responses, statuses, user inputs, system outputs and/or any other indicators (collectively "data" or "lighting system data" herein) of lighting system events may be presented at a user interface. A user interface may be displayed across a network such as the Internet. For example, an implementation may include a client computer comprising a video display with at least one display page comprising the lighting system data and any associated interfacing data (e.g., machine data). In some embodiments, such data may be collected from one or more measurement or sensing devices at one or more lighting units, motion sensors, cameras, beacons or beacon receivers, controllers, user terminals, drivers, communication units and/or any other lighting system components herein (e.g., as described with reference to communications mechanisms of FIG. 8, control hierarchy of FIG. 7, lighting unit components of FIGS. 2A-2F, etc.). The data may be retrieved/collected manually, collected automatically (e.g., periodically, or near-continuously), or a combination thereof.

In some cases, one or more user interfaces may be graphical user interfaces. The user interface(s) may be displayed on a video display and/or display page. A server and/or client computer may have access to lighting management software (also "management software," "lighting system management software" and "lighting management software system" herein). A user interface may be used to display or provide access to lighting system data. For example, a user interface may be provided for a web page or for an application. An application may be accessed remotely or locally. A user interface may be provided for a software program, gadget, widget, tool, plug-in, or any other type of object, application, or software. For example, a user at a client computer may be able to access a display page for a lighting system management software program. The lighting system management software may provide functionality for monitoring, reporting, controlling and/or interacting with a lighting system.

A display page may comprise well known features of graphical user interface technology, such as, for example, frames, windows, tabs, scroll bars, buttons, icons, menus, fields, and hyperlinks, and well known features such as a "point and click" interface. Pointing to and clicking on a graphical user interface button, icon, menu option, or hyperlink also is known as "selecting" the button, icon, option, or hyperlink. Additionally, a "point and gesture" interface may be utilized, such as a hand-gesture driven interface. Furthermore, a touchscreen interface may be utilized, where touching a visual object may constitute selecting the object. Any other interface for interacting with a graphical user interface may be utilized. A display page according to the invention also may incorporate multimedia features. User interfaces and/or communications/controls provided herein may be implemented using one or more computer systems (e.g., client computer). The computer system system(s) may include a memory location, a communications interface, a display interface and, in some cases, a data storage unit, which are all operatively coupled to a processor, such as a central processing unit (CPU). The memory location may include one or more of flash memory, cache and a hard disk. In some situations the memory location may be read-only memory (ROM) or random-access memory (RAM), to name a few examples.

The computer system(s) may be embodied in programming. Various aspects of the technology may be thought of as "products" or "articles of manufacture" typically in the form of machine (or processor) executable code and/or associated data that is carried on or embodied in a type of machine readable medium. Machine-executable (also "computer-executable" herein) code may be stored on an electronic storage unit, such as one or more memory (e.g., ROM, RAM) or one or more hard disks. Examples of hard disks may include magnetic and solid state recording media. "Storage" type media may include any or all of the tangible memory of computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air links. The physical elements that carry such waves, such as wired or wireless links, optical links or the like, also may be considered as media bearing the software. As used herein, unless restricted to non-transitory, tangible "storage" media, terms such as computer or machine "readable medium" may refer to any medium that participates in providing instructions to a processor for execution.

Figure 9:
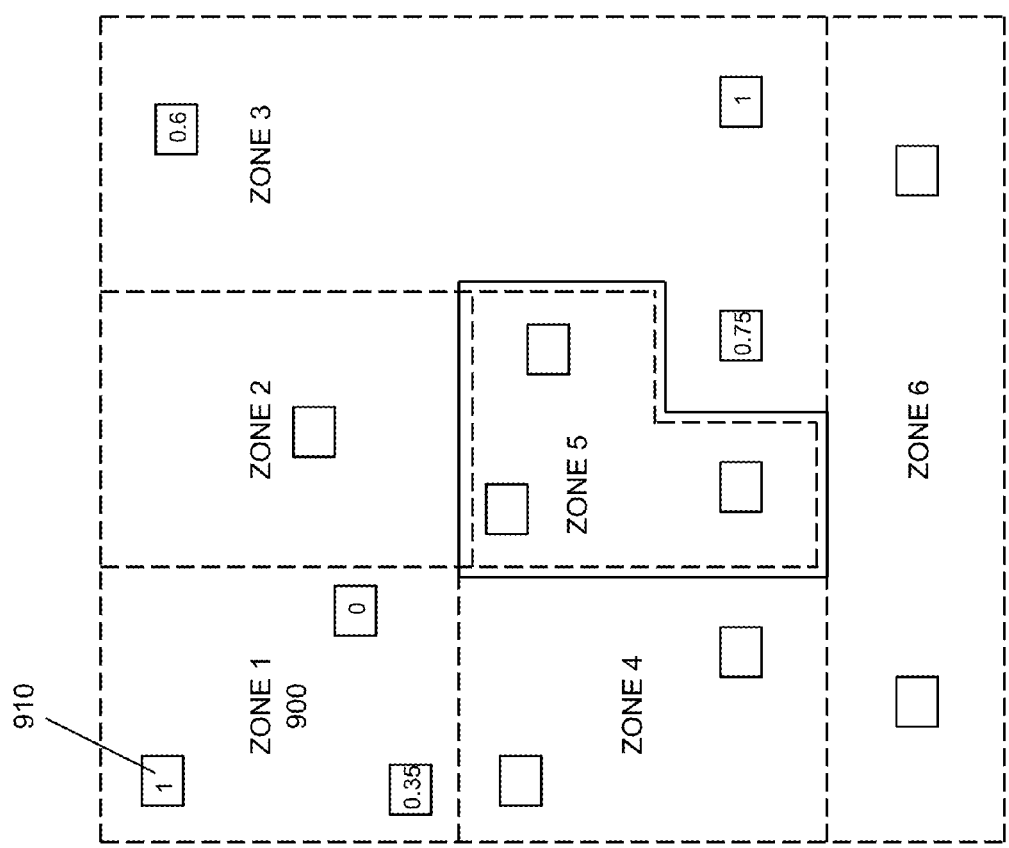
FIG. 9 provides an example of lighting control zones in accordance with an embodiment of the invention.

FIG. 9 provides an example of lighting control zones in accordance with an embodiment of the invention. The zones may cover various geographic locations or areas. For example, a geographic area may be divided into one or more zones. The zones may have the same size (e.g., area) and/or shape. Alternatively, the size and/or shape of the zones may vary. The zones may have the same number of lighting units therein. Alternatively, the zones may have different numbers or distributions of lighting units.

In some instances, the zones may form a grid pattern and/or array. Alternatively, the zones may include irregular shapes. The zones may fit together like puzzle pieces. In some instances, zones may be determined based on geographic landmarks or features. For example, a zone may have a border where there is a ridge or mountain. A zone may have a border defined by one or more natural or man-made structure. For example, the interior of a building (e.g., Zone 5) may be a zone. A zone may also be determined based on usage. For example, a portion of land that may require certain light characteristics may form a zone, while an adjacent portion of land which has different light characteristics may form another zone. In one example, a parking lot may be adjacent to an unused field. In some instances, it may be desirable to keep the parking lot more well-lit than the field. In some instances, zones may overlap on a map.

For example, a multi-floor structure may be provided. Each floor of the structure may be its own zone. Alternatively, the entire structure may belong to a single zone.

Lighting units 910 may be located anywhere in a zone 900. In some embodiments, the lighting units may be high-mast lighting units. The lighting units may utilize radio frequency (RF) coupled electrodeless plasma light sources, or any other light sources described elsewhere herein.

The lighting units may be distributed in any manner to provide a desired pattern of illumination. In some instances, the lighting units may be provided in rows, columns, and/or arrays. The number and/or distribution of lighting units may be selected per zone to provide a desired degree (e.g., intensity) and/or pattern of illumination. Some zones may require brighter light than other zones. Some zones may require greater illumination at different times than other zones.

The lighting units may be at any distance from one another. In some instances, providing lighting units capable of providing a greater degree and/or area of illumination may require fewer poles per area. In some instances, the lighting units may be spaced apart to any density. For example, the lighting units may be n times the support height from each other, where n is a whole number (e.g., 1, 2, 3, 4, 5, 6, or more). For example, the lighting units may be 3 times a pole height from one another. If a lighting unit is mounted on a 100 foot pole, the lighting units may be about 300 feet from one another.

In some instances, the lighting units are distributed in a zone so that there is not much variation in between the brightest and darkest areas of the zone. For example, the maximum variation between brightest and darkest may be about 10:1, 8:1, 6:1, 5:1, 4:1, 3:1, 2:1, 1.5:1, or about 1.1:1.

Lighting within each zone may be independently controlled. For example lighting units within each zone may be controlled together to provide a desired degree of illumination based on a desired schedule. For example, at a facility, a certain degree of brightness may be desired during hours at which people will likely be around the facility or performing functions at the facility. A lesser degree of brightness may be desired during off-hours when nobody is supposed to be around the facility, or the functions that are performed do not require as high a brightness. According to such schedules, the lights of the lighting units may be turned on, turned off, dimmed or brightened correspondingly. In some embodiments, each of the lighting units within the zone may be controlled according to the same schedule. For example, they may all be dimmed the same amount at the same time. The lighting units within the same zone may not be controlled independently. An example of a facility may include but is not limited to a warehouse or any other structure or location described herein.

In other examples, each of the lighting units within the same zone may be independently controlled. For example, an illumination schedule may note that at a particular time, one part of the zone may require greater illumination, while at another time, another part of the zone may require greater illumination. The lighting units within the zone may be controlled to provide the desired degrees of illuminations to the various parts of the zones in accordance with the illumination schedule. For example, at a particular zone (e.g., Zone 3), a lighting unit may be provided at a north end of the zone, while two lighting units may be provided at a south end of the zone. According to an illumination schedule, the light at the north end may be turned off at midnight, while the two southern lighting units are dimmed to 50%. Then at 3 am, the light at the north end may be turned on to 70% if there is anticipated activity at the northern end at that time, and the two southern lights may be dimmed further to 20%. At 5 am, if all areas are expected to have full activity, all three lights may be turned on to 100%.

One or more lighting unit may be controlled to compensate for another lighting unit within the same zone to provide a desired degree of illumination. For example, it may be desired for a zone to have an overall degree of illumination. However, certain greater intensities of light may be desired at various portions of the zones at different times. The individual lighting units within the zone may be dimmed and brightened correspondingly.

In another example, an error may be detected at one or more lighting unit with a zone. If the error is detected, the lighting unit may be turned off. Other surrounding lights may be turned on or brightened in order to compensate for the off light. In an example, a lighting unit may compensate for lights (e.g., one or more light sources within a neighboring lighting unit, an entire lighting unit) turned off, malfunctioning, or experiencing lumen degradation. In some cases, the lighting unit may increase its brightness (e.g., by adjusting the light source) to compensate for a neighboring unit that malfunctions or has a lamp burned out, a neighboring unit that reaches end of life, etc.

Such controls may be provided in accordance with a pre-determined illumination schedule. The illumination schedule may be predetermined by the host according to one or more standard or customized parameters. The illumination schedule may be manually determined by a user of the system. For example, an operator of a facility may interact with a user interface of the host, and determine that they want certain lights on, off, or at a certain dimmed value at various times. The schedule may be determined on a daily basis, weekly basis (e.g., certain schedules may apply to Wednesdays, and certain different schedules may apply to Fridays), monthly basis, or seasonal basis (e.g., more light may be required earlier in the winter, when it becomes darker faster). The schedules may be altered as needed.

In some instances, a pre-determined illumination schedule may be generated based on energy usage and/or cost savings. For example, certain peak hours may have a greater cost of electricity. If not much illumination is needed at those times, the lights may be dimmed. The lights may be brightened when electricity is cheaper. The lights may be dimmed and/or brightened also in accordance with illumination need.

A pre-determined illumination schedule may be action-driven. For example, the pre-determined illumination schedule may tell the lighting units to operate in a specific manner at a specific time (e.g., be on/off at specific times, or dimmed to certain levels at certain times). Regardless of the outcome (e.g., how bright or the light distribution pattern), the lighting units may operate as directed. Sensors or measurements may not be required in order for the action-driven schedule. Sensors may optionally be provided to provide confirmation that the lighting units are operating properly.

In some instances, such illumination schedules may not be predetermined but may be generated on the fly in response to one or more sensed condition. For example, one or more standardized or customized parameters may be provided (e.g., having a particular area at a desired brightness). One or more sensor may be provided to determine if the parameters are being met, and lighting units may be adjusted accordingly. For example, one or more light sensors may be provided at an area to determine the intensity of light at that area. If the area is too dimmed, the surrounding lighting units may be brightened accordingly. If the area is overly bright, the surrounding lighting units may be dimmed or turned off. This may allow the lighting units to compensate for weather or daily conditions. For example, if throughout the year, it is desired to keep a particular area lit to a certain degree until 7 pm, the amount of assistance for lighting the area from the lighting units may depend on when the sun goes down.

One or more calculations/rules may be provided that may accept one or more sensed conditions and one or more desired parameters. The signals to be provided to the lighting units and/or control illumination by the lighting units may be generated by the calculations/rules. The signals may be distributed by light controllers, hosts, software, processors, computing platforms, or any combination thereof.

The on-the-fly illumination schemes may be results-driven. For example, the on-the-fly illumination schemes may cause the lighting units to operate in a manner to achieve a particular result (e.g., desired illumination pattern and/or degree, desired energy usage, desired energy cost thresholds). One or more sensed conditions or measured conditions may be required to provide feedback to the system in order to achieve the desired result. These sensed conditions may derive from one or a plurality of inputs (e.g., distributed inputs), including, for example, integrated sensors, standalone sensors, light controllers, hosts, software, processors, and/or computing platforms.

A host may provide a pre-determined illumination schedule and/or the on-the-fly illumination scheme. The host may receive information from one or more lighting unit and/or additional sensors. The host may provide instructions to the one or more lighting units. Such instructions may be provided on a zone by zone basis, or on an individualized lighting units basis. Such instructions or may or may not be individualized to the level of each light source within the lighting units. The lighting units may turn on, turn off, dim, brighten, or maintain the light sources within the lighting units in accordance with the instructions.

Illumination may occur in response to one or more event. Such a response may be delayed or in real-time. In some examples, a pre-determined illumination schedule may be overridden by a detected event. In some instances, the pre-determined schedule may or may not be overridden depending on the type of event detected. In some instances, an individual controller, gateway, or host can override the predetermined schedule based on the detected event.

In some embodiments, lighting units of the disclosure may be used to illuminate ports, airports, highway interchanges, rail yards, train stations, subway stations, bus stations, intermodal facilities, and/or harbors. Vessels (e.g., cargo ships, tankers, cruise ships or any other water-borne vessels) may be moored in designated locations (also referred to as "berths" in ports and harbors), for example for the purposes of loading, unloading, servicing, fueling and/or other purposes. The berths may be designated by the management of a facility (e.g., port authority, harbor master). The vessels may be assigned to the berths by these authorities. The berths may be located alongside a quay or a jetty in large ports, or a floating dock in small harbors and marinas. The berths may be general or specific to the types of vessels that use them. The size of the berths may vary, for example, from about 5 to 10 m for a small boat in a marina to larger than about 400 m for a tanker. A port and/or harbor may contain any number of berths. For example, a port/harbor may contain less than 5, less than 15, less than 30, less than 50, less than 100, more than 100, more than 200, more than 500, or more than 1000 berths. The number of berths may depend on the size of vessels moored in the port/harbor.

A site, such as, for example, a port, may comprise one or more zones, which may or may not be illuminated. Each zone may include one or more berths. For example, each zone may correspond to a berth, or to multiple berths. Alternatively, each berth may include multiple zones. For example, a berth may include 1, 2, 3, 4, 5, 10, 15 or more zones (e.g., a large ship may need illumination in multiple locations and/or from multiple directions, which may define zones, including along the sides of the ship, near the water surface, at the bow, at the stern, on the deck etc.). Any description of ports (e.g., layout and/or architecture) herein may also be functionally applied to sites including, for example, harbors, airports, highway interchanges, rail yards, and intermodal facilities. A zone (e.g., zone 900 in FIG. 9) may include any number of lighting units, as described elsewhere herein. Each lighting unit may illuminate a berth, a portion of a berth, a zone, a portion of a zone, or any other part of a site. For example, a zone may include a plurality of lighting units 910, wherein each lighting unit may illuminate a site, or section of a site. In another example, more than one of the plurality of lighting units 910 may illuminate a site. In yet another example, one or more of the plurality of lighting units may illuminate a portion of a site. Alternatively, the lighting units may illuminate one or more berths or portions thereof, or any other part of the site without being organized in zones.

The area illuminated by each lighting unit or lighting fixture 910 may have a dimension with illuminated area d or any other area, as described in greater detail elsewhere herein. In some cases, the area illuminated by one or more lighting units or lighting fixtures may correspond to a berth, a portion of a berth, a zone, a portion of a zone, or any other part of the site.

The lighting units may be organized in lighting control zones described, for example, with reference to FIG. 9. The lighting control zones may or may not correspond to berths and/or specific parts of the port. One or more dimensions of a lighting control zone may be a fraction or a multiple of an illuminated area dimension d. For example, a zone may be a couple of football fields wide or long, and may include any number of lighting units. For instance, a length, width, diagonal, and/or circumference of a zone may be greater than or equal to 50 meters, 75 meters, 100 meters, 125 meters, 150 meters, 200 meters, 250 meters, 300 meters, 400 meters, 500 meters, 700 meters, or 1000 meters. The lighting units may each illuminate an area with dimension d as described elsewhere herein, and may be distributed in the zone such that the illuminated areas are adjacent to each other without overlapping, such that the illuminated areas overlap and/or a combination thereof. The lighting units may be independently controlled. For example, the lighting units may turned on (e.g., value of 1), off (e.g., value 0), or set to any dimmed setting in a continuous or discrete range between 0 and 1. This is shown, for example, in zones 1 and 3 in FIG. 9, where some of the lighting units 910 are on (indicated by 1), some are off (indicated by 0), and some are dimmed (indicated by, for example, 0.35, 0.6 and 0.75).

Adequate illumination may be an important security measure, such as, for example, for homeland security considerations. Furthermore, controlled illumination is an important factor in energy efficiency. In some embodiments, one or more sensors may be provided as described elsewhere herein. The sensors may include, but are not limited to, photosensors determining the intensity of light provided by one or more lighting units, motion sensors, beacons or receivers of beacon signals (also "beacon receivers" herein) and/or other sensors. Furthermore, sensors may include or be in communication with one or more cameras or a camera network. The sensors may communicate, control and/or be controlled by lighting units or components thereof through any communication means described herein (e.g., via communication means described with reference to FIGS. 7-9). For example, the sensors, lighting units or lighting/monitoring system components may communicate over a network. The sensors and sensor communications of the disclosure may enable various port lighting configurations and responses.

In some embodiments, collected sensor data (e.g., collected from sensors on lighting units or from sensors anywhere else within the lighting system) may be relayed (e.g., communicated via analog, digital, wireless or other signal or data transfer) by an external controller (e.g., controller disjoined from the lighting unit). The controller may be in communication with multiple lighting units.

Sensors may include motion sensors, which may respond to motion in a predetermined zone, part of a zone, lighting area and/or any other part or section of a site. In some cases, the motion sensors may be provided on the lighting units (e.g., captive to the lighting units). In some cases, the motion sensors may be free standing (e.g., provided separately from the lighting units). The sensors may relay data via light controllers, hosts, software, processors, computing platforms, or any combination thereof. The motion sensors may enable lighting to be turned on and off as needed in response to motion a sensed area. One or more lighting units, zones or any other lighting areas herein may be monitored by one or more motion sensors. When no motion is detected by the motion sensors, a lighting configuration may include a default lighting configuration (e.g., lighting off, low intensity lighting, night lights, or any other predetermined configuration of dimmable lighting units). When motion is detected by the motion sensors, a lighting configuration may include turning on one or more lighting units, which may be organized in zones, to illuminate the lighting area where motion was detected and/or nearby lighting areas. In one example, a site may have limited or no illumination (e.g., the quay, jetty or dock may be illuminated by night lighting, ground lighting such as red ground lighting, limited or dimmed high mast lighting, no lighting), and high mast lighting may be triggered in areas where motion is sensed (e.g., motion along the quay along the side of the ship may cause the side of the ship to be illuminated, and may also cause one or more other parts of the ship or other lighting zones to be illuminated, including the entire ship, nearby ship, multiple zones of the port, the whole port etc.).

The motion sensors may be organized in a motion sensor network. The motion sensor network may communicate with one or more lighting units of the disclosure, with a camera network, with a host, with software, with one or more processors, with one or more computing platforms, or any combination thereof. The motion sensor network, the camera network and the lighting unit network may communicate with each other directly and/or by proxy. For example, the camera network may be in communication with the motion sensors, and the motion sensors may be in communication with the lighting units. Alternatively, the camera network may be in communication with the lighting units, and the motion sensors may be in communication with the camera network. In another example, the camera network and the motion sensor network may be in direct communication with the lighting unit network and/or with each other.

Examples of communications and responses may include activation of one or more high mast lighting units in response to a signal or signals received from one or more motion sensors, wherein the signal(s) may activate or control one or more cameras to monitor a given lighting area.

In some cases, photosensors or photodetectors of the disclosure may be sensors of light or other electromagnetic energy, and may include, for example, image sensors (e.g., CMOS), charge coupled devices (CCD), chemical detectors (e.g., photographic plates), light emitting diodes (LED) reverse-biased to act as photodiodes, optical detectors (e.g., quantum devices, thermometers), photoresistors or light dependent resistors (LDR), photovoltaic cells or solar cells, photodiodes, photomultiplier tubes, phototubes, phototransistors, quantum dot photoconductors or photodiodes etc. In some cases, the photosensors or photodetectors may include light sensing functionality only. In other cases, the photosensors or photodetectors may include other sensing functionality. For example, a photosensor which detects thermal energy may detect the presence of persons in a similar fashion to a motion detector. In another example, an image sensor may have light sensing capability and may also, or alternatively, record or transmit images of a lighting area similar to a video camera (e.g., a stream of captured images may provide visual or other sensor information similar to a recorded video stream). Thus, cameras and photosensors of the disclosure may have one or more common characteristics. The cameras may include video and/or any other image recording devices and media known in the art. Motion sensors of the disclosure may include, for example, infrared sensors, ultrasonic sensors, microwave sensors, tomographic detectors and/or other types of detectors.

Sensors may include beacons and/or beacon receivers, such as, for example, light or optical beacons, radio beacons, high frequency beacons, space and satellite radio beacons, infrared beacons, sonar beacons, marker beacons and/or other beacon signal types or frequencies. Beacons may be provided on vessels and received by beacon receivers in the port. In some cases, beacons may be provided in the port and received by beacon receivers on the vessels. For example, a beacon signal from a vessel (e.g., a ship) may be received at the port and an appropriate lighting configuration may be adapted in response to the beacon signal. For example, an illuminated pathway may be provided for the vessel to enter the port. The illuminated pathway may guide the vessel to an appropriate berth. The illuminated pathway may be provided through control of one or more lighting units of the disclosure and/or one or more lighting zones. In some cases, dedicated beacons and beacon receivers may used. In some cases, the beacons and beacon receivers may communicate with each other over a network (e.g., satellite network). Beacon communications may include communication/control of beacons and/or beacon receivers in ports by the vessels and/or communication/control of beacons and/or beacon receivers on vessels by the ports. For example, a vessel may be given a choice of multiple berths, and may communicate a selection to the port, wherein a particular illuminated pathway is provided at the port in response. In some cases, vessels and ports may be in electronic communication with each other in addition to beacon communications (e.g., wireless communications). Such communications may or may not complement beacon communications.

Beacon communications may be automatic. For example, a vessel may be provided with a beacon. The beacon may or may not be automatic. If an appropriate sensor or receiver is present in a port, the beacon signal may be picked up automatically. In response to the received signal, high mast lighting of the disclosure may be turned on to guide the way for the vessel entering or navigating the port. The high mast lighting may function as leading lights. Any description herein of a beacon may apply to any type of transponder. Examples of transponders may include, but are not limited to, beacons, RFID, Bluetooth, and/or other types of wireless technologies.

Further, illumination by lighting units herein may be scheduled and/or timed. For example, lighting may be powered up when vessels arrive. Lighting may be provided in response to communications received from the vessel (e.g., the vessel may communicate a delay, and lighting may be scheduled or rescheduled accordingly). Lighting may be timed (e.g., one or more lighting areas may be illuminated automatically at sunset, illuminated pathways and/or motion sensor activated illumination may remain on for a predetermined amount of time before being turned off or returned to a default setting), Thus, lighting may be provided in real-time (e.g., in direct response to vessels arriving at the port), according to one or more schedules and/or according to one or more timers. The lighting may be provided automatically (e.g., without requiring user input), manually (e.g., in response to vessel or port authority input), or a combination thereof. Illumination by lighting units of the disclosure may be automatic, sensor-controlled (e.g., automatic or manual response to beacon signals, motion sensors and other controls), manual, timed and/or otherwise configured (e.g., combinations of the above).

In some instances, lighting may be controlled in communication with memory that may store information about events. For example, an electronic calendar or manifest scheduler may be provided which may include information about the schedules of one or more incidents (e.g., arrivals or departures of ships or other conveyances, expected activity). Based on the schedule, lighting may be timed. For example, if a linked calendar indicates that a ship is scheduled to arrive at midnight at a particular berth, the lighting units in the proximity of the berth may be illuminated a little prior to midnight. Updating the calendar may result in updating the lighting schedule automatically. Lighting may be controlled in accordance with other peripheral information. For example, if a weather report comes in that if a storm is coming in that will likely affect the timing of arrivals or prevent arrivals altogether, the lighting schedule may be automatically adjusted or updated. The scheduling function (e.g., from the lighting management system) may be based on a calendar, shipping manifest, weather report, ship beacon, location data type, etc. In an example, one or more lighting characteristics of each light source in lighting unit(s) of a lighting system may be adjustable based on proximity to a beacon in communication with the lighting unit.

Figure 10:
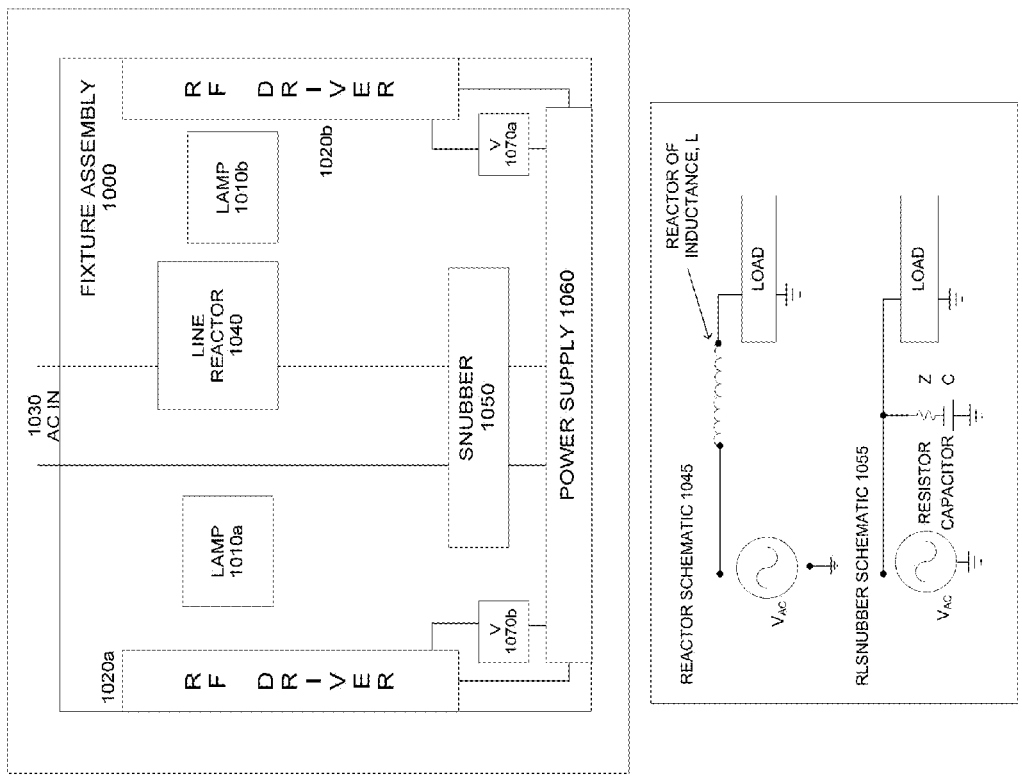
FIG. 10 provides an example of a reactor or snubber configuration, in accordance with an embodiment of the invention.

FIG. 10 shows an example of a line reactor or snubber configuration. Some environments, such as industrial facilities, are challenging electrical environments with varying phase to phase loads, low power factor, and/or transients caused from the combination of reactive elements connected to switches and/or contactors. Line reactors and snubbers (e.g., RC snubbers) may form the backbone of moderating transient electrical events in these kinds of environments. Those elements in traditional systems are placed in front of the lighting fixtures at the pole and/or panel level. Systems and methods provided herein may permit them to be integrated at the individual lighting fixture. In one possible embodiment, a line reactor (e.g., a series inductor) or an inductor can be in series with one or more power supplies (e.g., in electrical communication with one or more power supplies for the one or more light sources via, for example, the drivers 1020a and 1020b), and the snubber can be in parallel with the same power supplies. In one embodiment, the line reactor and snubber are co-located within the fixture housing adjacent to the power supply (e.g., in electrical communication with the power supply), and in another embodiment they are integrated into the same electronic assembly as the power supply. Any description herein of power supply may apply to any type of power supply (e.g., DC-to-AC converters, AC-to-AC converters, linear power supply, switch mode power supply, series resonant power supply, etc.).

FIG. 10 (top) shows a fixture assembly 1000. The fixture may have one or more lamp 1010a, 1010b. The one or more lamps may be the one or more light sources of a lighting fixture. One or more radio frequency (RF) drivers 1020a, 1020b may be provided in the fixture assembly. The RF drivers may correspond to the one or more lamps. In some instances, a one-to-one relationship may be provided between an RF driver and a corresponding lamp. Alternatively, a one-to-multiple relationship may be provided between an RF driver and multiple lamps, or multiple RF drivers and a lamp.

Alternating current (AC) 1030 may come into the fixture assembly. The AC may pass through a line reactor 1040 to a snubber 1050 and/or may pass directly to the snubber. In some instances, a line reactor and snubber may be provided in parallel, in series, or any combination thereof. The current may then pass to a power supply 1060 that may convert the alternating current to a direct current. The direct current may pass to the RF driver(s) 1020a, 1020b over a voltage (V) 1070a, 1070b.

Examples of a reactor schematic 1045 and snubber schematic 1055 are shown (bottom).

FIG. 11 shows an example of a redundant wireless lighting control power supply. In some embodiments, the wireless lighting controller assembly may rely on a single power source for performing measurement, logic, metrology, control, and transmit/receive functions. In other embodiments, the system may utilize two or more power supplies or sources, connected in an ORing fashion to provide redundancy. One possible embodiment utilizes ORing diodes or field effect transistors (FETs) configured to behave in an ORing fashion, and a voltage regulator to ensure stable supply voltage. In some embodiments, any wired or wireless controller herein may be in electrical communication with one or more power sources.

FIG. 11 (top) shows AC 1110 coming in to a first AC-to-DC converter 1120 and a second AC-to-DC converter 1130 in parallel. In some instances, any number of AC-to-DC converters may be provided (e.g., 1, 2, 3, 4, 5, 6 or more). Direct current (DC) from the converters may pass to an ORing circuit and regulator 1040 which may send current via $V_{DC}$ to a wireless light controller 1150.

An example of a possible board layout schematic 1060 is provided (bottom).

An integrated electromagnetic compatibility element (EMC) device may be provided in accordance with some embodiments of the invention. In some circumstances, it can be advantageous to introduce an assembly to attenuate radio frequency (RF) emissions from the RF electrodeless plasma light source. In some instances, a standalone assembly may be provided to attenuate the RF. Alternatively, the RF attenuation elements can be instead integrated into the primary reflective and/or refractive optical assembly. For example, the RF attenuating element can be a transparent conducting film. In another embodiment, the RF attenuating element is a RF waveguide operating below its cutoff frequency. Alternatively, the RF attenuating element may be a porous electrically conducting screen assembly. Optionally, the RF attenuating element may be a low-dimensional resonant assembly (e.g. ring assembly). The RF attenuating element can be a frequency selective surface (e.g. gangbuster surface) in accordance with another embodiment of the invention. In some implementations, the RF attenuating element can be applied, coated, patterned, or mounted on the surface(s) of the primary optical assembly. In one possible embodiment, the RF attenuating element may be integrated in the physical support structure of the primary optical element. The RF attenuating element may directly position and hold the geometric orientation of optical elements in mechanical alignment. The optical elements may perform the additional duty of active RF attenuation via one, more, or all of the embodiments discussed. The means of RF attenuation can be integrated between optical elements and/or integrated behind optical elements.

Systems and methods described herein may use an integrated wireless controller antenna(e) within the housing. In some instances, a wireless lighting controller may have an antenna(e) mounted externally to the light fixture housing. Alternatively, the wireless controller antenna(e) may be mechanically and/or electrically integrated within the surface of the fixture housing at manufacturing and/or assembly as an integral part of the fixture housing.

Figure 13:
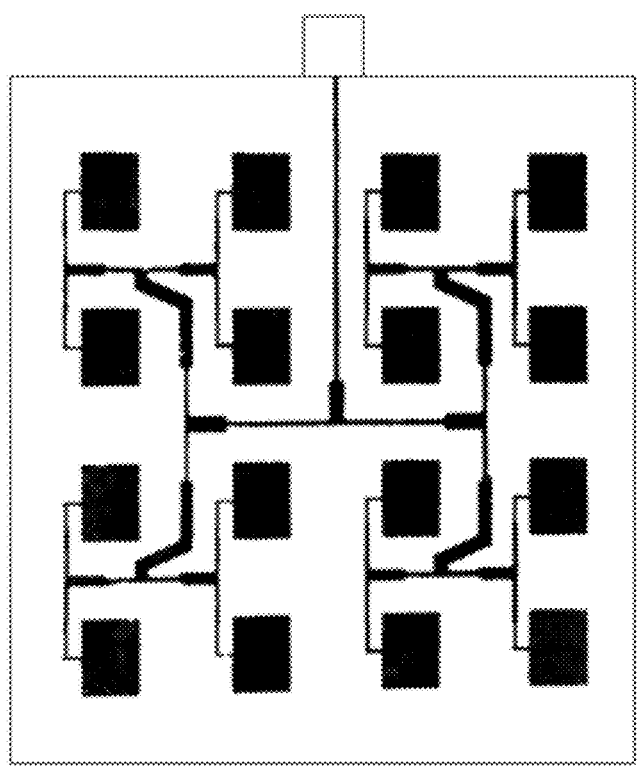
FIG. 13 shows an example of a surface integrated wireless controller antenna in accordance with an embodiment of the invention.

FIG. 13 shows an example of a surface integrated wireless controller antenna. In some embodiments, the antenna may be a microstrip antenna, sometimes called a "printed" antenna in the industry parlance. The antenna may be composed of a metallic surface on top of a dielectric layer, with a second, underlying metallic layer below the dielectric. The result may be a sandwiched dielectric structure. The underlying metallic layer may comprise, for example, the metallic surface of the lighting fixture housing. The dielectric layer and upper metallic layer may be applied via any number of methods, including, but not limited to, screen printing and/or lithography. In some embodiments, the integrated wireless controller may comprise a mechanism (e.g., a bypass mechanism) that enables non-wireless control of the lighting unit.

One or more characteristics, components, features, and/or steps known in the art may be incorporated and/or used. See, e.g., U.S. Pat. No. 6,676,279; U.S. Patent Publication No. 2010/0315252; U.S. Pat. No. 7,246,918; U.S. Pat. No. 3,660,650; U.S. Patent Publication No. 2010/0029268; U.S. Patent Publication No. 2011/0121734, which are hereby incorporated by reference in their entirety.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A high-mast lighting system to provide illumination for a large transportation yard or area with increased safety and security comprising:
a plurality of lighting units each of which comprising:
a plurality of radio frequency (RF) coupled electrodeless plasma light sources, each light source of said plurality being at least partially surrounded by an optical element, wherein the light source is configured to be rotatable along an axis parallel to a selected axis of the light source while the light source is providing illumination;
a high-mast support assembly configured to position the plurality of RF coupled electrodeless plasma light sources above a surface at a height of 60 feet or greater; and
a communication unit capable of communicating as a host, gateway, and/or controller with the plurality of RF coupled electrodeless plasma light sources; and
wherein the plurality of the lighting units are organized into a defined set of illumination zones for the large transportation yard or area, and each lighting unit or each RF coupled electrodeless plasma light source is independently controllable and/or adjustable based at least in part on a signal from one or more transponders provided on a pre-determined movable transportation object or vessel, wherein the signal from the one or more transponders automatically communicates a desired brightness level for a selectable subset of the plurality of the lighting units or the plurality of RF coupled electrodeless plasma light sources dependent upon the size or selectable requirements of the pre-determined movable transportation object or vessel for safety and security within one or more illumination zones selected from the defined set of illumination zones for an immediate or surrounding area in proximity to the pre-determined movable transportation object or vessel, and wherein the signal from the one or more transponders is received by a receiver located remotely from the plurality of lighting units positioned atop their corresponding high-mast support assemblies and in communication with the plurality of lighting units over a communication network.

2. The high-mast lighting system of claim 1, further comprising a removable modular optical assembly accessible from a bottom surface of the lighting unit, wherein the optical assembly contains the light source, wherein the light source is configured to be rotatable through a restricted range that includes the light source pointing directly downward towards nadir.

3. The high-mast lighting system of claim 1, wherein one or more lighting characteristics of each light source is adjusted based on software-generated signals or instructions from a controller, hardware-generated signals or instructions from a controller, or a combination thereof.

4. The high-mast lighting system of claim 3, wherein the software-generated signals or instruction are based on scheduling.

5. The high-mast lighting system of claim 3, wherein the hardware-generated signals or instructions are based on a real-time sensor reading.

6. The high-mast lighting system of claim 1, further comprising a housing having a bird deterrent assembly.

7. The high-mast lighting system of claim 1, further comprising a thermal management system comprising a venturi or orifice plate capable of promoting fluid flow driven by convection.

8. The high-mast lighting system of claim 1, further comprising a housing; and an electronic indicator or transducer on an external portion of the housing, the electronic indicator or transducer providing information about an operational status or identification of the lighting unit.

9. The high-mast lighting system of claim 1, further comprising an
integrated wireless controller having a mechanism that enables non-wireless control of the lighting unit, wherein the integrated wireless controller is configured to receive a remote signal to activate the integrated wireless controller and enter a state of wireless control.

10. The high-mast lighting system of claim 1, further comprising an integrated optical assembly configured to attenuate RF emissions from the plurality of light sources.

11. The high-mast lighting system of claim 1, further comprising a housing; and a wireless controller antenna mechanically integrated within the surface of the housing, wherein one or more lighting characteristics of each light source is adjustable based on a distance between a transponder in communication with the lighting unit and each light source.

12. The high-mast lighting system of claim 1, further comprises a plurality of sensors including at least one of the following: (1) a light sensor configured to collect sensor data relating to one or more characteristics or parameters relating to a light source, a lighting unit, the lighting system, environment, the lighting system, or any combination thereof, (2) the receiver comprising a radio frequency (RF) ID receiver in communication with the pre-determined movable transportation object or vessel, and (3) a motion sensor for detecting motion in proximity to the high-mast light system, wherein each sensor is associated with a pre-selected brightness level for the illumination zones.

13. The high-mast lighting system of claim 12, wherein the sensor data are relayed by an external controller disjoined from at least a portion of the plurality of lighting units.

14. The high-mast lighting system of claim 1, wherein an individual lighting unit is configured to compensate for an event in one or more neighboring lighting units, wherein the event includes one or more of: light unit turned off, light unit malfunctioning, and light unit experiences lumen degradation.

15. The high-mast lighting system of claim 1, further comprising a reserve light source, wherein the reserve light source provides reserve lumen capacity to compensate for desired light output.

16. The high-mast lighting system of claim 1, further comprising an internal control system, wherein the internal control system is bridged with an external control system, wherein the external control system comprises a security system, supervisory control and data acquisition (SCAD) systems, or enterprise resource planning/enterprise resource management (ERP/ERM) system.

17. A method for providing illumination for a large transportation yard or area with increased safety and security comprising:
providing a plurality of lighting units each of which comprising:
a plurality of radio frequency (RF) coupled electrodeless plasma light sources, each light source of said plurality being at least partially surrounded by an optical element, wherein the light source is configured to be rotatable along an axis parallel to a selected axis of the light source while the light source is providing illumination;

a high-mast support assembly configured to position the plurality of RF coupled electrodeless plasma light sources above a surface at a height of 60 feet or greater; and a communication unit capable of communicating as a host, gateway, and/or controller with the plurality of RF coupled electrodeless plasma light sources;

organizing the plurality of the lighting units into a defined set of illumination zones for the large transportation yard or area; and controlling each lighting unit or each RF coupled electrodeless plasma light source independently based at least in part on a signal from one or more transponders provided on a pre-determined movable transportation object or vessel, wherein the signal from the one or more transponders automatically communicates a desired brightness level for a selectable subset of the plurality of the lighting units or the plurality of RF coupled electrodeless plasma light sources dependent upon the size or selectable requirements of the pre-determined movable transportation object or vessel for safety and security within one or more illumination zones selected from the defined set of illumination zones for an immediate or surrounding area in proximity to the pre-determined movable transportation object or vessel, and wherein the signal from the one or more transponders is received by a receiver located remotely from the plurality of lighting units positioned atop their corresponding high-mast support assemblies and in communication with the plurality of lighting units over a communication network.

* * * * *